United States Patent
Knowles et al.

(10) Patent No.: US 11,245,593 B2
(45) Date of Patent: Feb. 8, 2022

(54) FREQUENCY-DOMAIN ANALYSIS OF DATA-CENTER OPERATIONAL AND PERFORMANCE METRICS

(71) Applicant: VMware, Inc., Palo Alto, CA (US)

(72) Inventors: Christopher Knowles, London (CA); Jeffery Crukley, Milton (CA)

(73) Assignee: VMware, Inc., Palo Alto, CA (US)

( * ) Notice: Subject to any disclaimer, the term of this patent is extended or adjusted under 35 U.S.C. 154(b) by 1235 days.

(21) Appl. No.: 15/138,102

(22) Filed: Apr. 25, 2016

(65) Prior Publication Data

US 2017/0310556 A1    Oct. 26, 2017

(51) Int. Cl.
*H04L 12/24* (2006.01)
*H04L 29/08* (2006.01)
*H04L 29/06* (2006.01)

(52) U.S. Cl.
CPC ........ *H04L 41/142* (2013.01); *H04L 67/1097* (2013.01); *H04L 67/38* (2013.01)

(58) Field of Classification Search
CPC ... H04L 67/1051; H04L 67/38; H04L 67/125; H04L 67/1097; H04L 67/2842; H04L 41/142; H04L 12/24; H04L 29/06; H04L 29/08; G06F 17/141; G06F 16/2477; G06F 17/14; G06F 17/5009; G06F 9/452; G06F 3/0601; G05B 23/0283; G01R 13/0236; A63F 13/00
USPC ...... 709/224; 702/184, 39, 58, 75, 183, 186; 708/207, 400; 345/419; 707/737
See application file for complete search history.

(56) References Cited

U.S. PATENT DOCUMENTS

| | | | | |
|---|---|---|---|---|
| 5,664,106 A | * | 9/1997 | Caccavale | G06F 11/32 709/224 |
| 6,691,067 B1 | * | 2/2004 | Ding | G06F 11/3447 702/186 |
| 2003/0033094 A1 | * | 2/2003 | Huang | G06F 17/14 702/39 |
| 2003/0110007 A1 | * | 6/2003 | McGee | G06F 11/3452 702/179 |
| 2003/0206178 A1 | * | 11/2003 | Hoppe | G06T 17/205 345/582 |
| 2004/0120561 A1 | * | 6/2004 | Goto | G06T 7/0012 382/128 |

(Continued)

OTHER PUBLICATIONS

Dodds SR. A study of the relative value of different time-series charts for proactive process monitoring. Journal of Improvement Science. 2012;3:1-8.*

*Primary Examiner* — James N Fiorillo

(57) ABSTRACT

The current document is directed to methods and systems for frequency-domain analysis of operational and performance metric values and other data generated and collected within computer systems, including large distributed computer systems and virtualized data centers. In one implementation, each set of time-ordered values for each metric in a set of metrics is partitioned into time intervals, transformed from the time domain to the frequency domain, and aligned to generate a metric surface in a frequency-time-amplitude space. The metric surfaces are then pairwise compared to identify related metrics. Transfer functions are generated for transforming metric surfaces into one another. The comparison values and transfer functions are used to produce graphs that encapsulate discovered relationships between metrics.

20 Claims, 47 Drawing Sheets

(56) References Cited

U.S. PATENT DOCUMENTS

| | | | |
|---|---|---|---|
| 2007/0198215 A1* | 8/2007 | Bonanni | G05B 23/0283 702/183 |
| 2008/0001777 A1* | 1/2008 | Gross | H04L 67/125 340/870.01 |
| 2008/0052335 A1* | 2/2008 | Gee | G01R 23/16 708/400 |
| 2008/0133982 A1* | 6/2008 | Rawlins | H03F 1/3294 714/699 |
| 2009/0078049 A1* | 3/2009 | Sinha | G01N 29/46 73/623 |
| 2009/0119035 A1* | 5/2009 | Younsi | G01R 31/1227 702/58 |
| 2009/0175543 A1* | 7/2009 | Nielsen | G06T 17/205 382/204 |
| 2009/0195536 A1* | 8/2009 | Louise | G06T 11/206 345/419 |
| 2009/0240472 A1* | 9/2009 | Winnebeck | G05B 23/0283 702/184 |
| 2011/0019697 A1* | 1/2011 | Seki | H04L 25/03343 370/480 |
| 2011/0153603 A1* | 6/2011 | Adiba | G06F 16/2477 707/737 |
| 2011/0267340 A1* | 11/2011 | Kraus | G06T 7/30 345/419 |
| 2012/0041994 A1* | 2/2012 | Smith | G06F 17/14 708/207 |
| 2012/0301105 A1* | 11/2012 | Rehg | G06K 9/00718 386/241 |
| 2013/0191062 A1* | 7/2013 | Smith | G06F 12/0207 702/75 |
| 2015/0142602 A1* | 5/2015 | Williams | G06Q 30/0631 705/26.7 |
| 2016/0055125 A1* | 2/2016 | Razavi | G06Q 10/067 703/2 |
| 2016/0070949 A1* | 3/2016 | Tunstall | G06K 9/0014 382/133 |
| 2017/0140288 A1* | 5/2017 | Pourshahid | G06N 5/022 |
| 2017/0294965 A1* | 10/2017 | Ashrafi | H04L 27/3405 |

* cited by examiner $y = f(x)$ ⟵ 127

$y = 5\cos(2\pi x) + 2\sin(2\pi x) + 10\cos(4\pi x) + 4\sin(4\pi x) + 3\cos(6\pi x) + 13\sin(6\pi x)$ ⟵ 126

128 $\begin{cases} f(0) = 5\cos(0) + 2\sin(0) + 10\cos(0) + 4\sin(0) + 3\cos(0) + 13\sin(0) \\ \quad = 5 + 10 + 3 \\ \quad = 18 \end{cases}$ 129 $\begin{cases} f(.06) = 5\cos(.12\pi) + 2\sin(.12\pi) + 10\cos(.24\pi) + 4\sin(.24\pi) + 3\cos(.36\pi) + 13\sin(.36\pi) \\ \quad = 4.649 + .736 + 7.29 + 2.738 + 1.278 + 11.76 \\ \quad = 28.45 \end{cases}$ 130 $\begin{cases} f(t) = \sum_{n=\infty}^{\infty} a_n \cos(2\pi n v_0 t) + b_n \sin(2\pi n v_0 t) \\ \quad = a_0 + a_1(2\pi v_0 t) + b_1 \sin(2\pi v_0 t) + a_2 \cos(4\pi v_0 t) + \ldots \end{cases}$

FIG. 1D $$f(t) = \sum_{n=-\infty}^{\infty} a_n \cos(2\pi n v_0 t) + b_n \sin(2\pi n v_0 t) \quad —150$$

152 $\begin{cases} f(t) = \dfrac{A_0}{2} + \sum_{n=1}^{\infty} A_n \cos(2\pi n v_0 t) + B_n \sin(2\pi n v_0 t) \\ \text{where } A_n = a_{-n} + a_n; \text{ and} \\ B_n = b_n - b_{-n}. \end{cases}$ 154 $\begin{cases} f(t) = \dfrac{A_0}{2} + \sum_{m=1}^{\infty} R_m \cos(2\pi m v_0 t + \phi_m) \\ \text{where } R_m \text{ is the amplitude of the } m^{th} \text{ harmonic; and} \\ \phi_m \text{ is the phase of the } m^{th} \text{ harmonic.} \end{cases}$ 156 $\begin{cases} f(t) = \sum_{-\infty}^{\infty} C_m e^{2\pi i m v_0 t} \\ \text{where } C_m \text{ is, in general, complex} \end{cases}$ 158 $\begin{cases} A_m = 2_{v_0} \int_0^{1/v_0} f(t) \cos(2\pi m v_0 t)\, dt \\ B_m = 2_{v_0} \int_0^{1/v_0} f(t) \sin(2\pi m v_0 t)\, dt \\ C_m = 2_{v_0} \int_0^{1/v_0} f(t) e \end{cases}$

FIG. 1F $$f(t) = \int_{-\infty}^{\infty} F(\upsilon) e^{-2\pi i \upsilon t} d\upsilon$$
$$F(\upsilon) = \int_{-\infty}^{\infty} f(t) e^{2\pi i \upsilon t} dt$$
$\qquad\qquad\qquad\qquad\qquad\quad$ } 202

$$\mathsf{F}_T(f(t)) = F(\upsilon)$$
$$\mathsf{F}_T(F(\upsilon)) = f(t)$$
$\qquad\qquad\qquad\qquad$ } 204

$$f(t) \rightleftarrows F(\upsilon) \qquad\text{—— 206}$$

$\qquad\qquad\qquad\qquad\qquad\qquad\qquad\qquad\qquad\qquad$ /208 convolution of $f_1(x)$ and $f_2(x) = C(x) = \int_{-\infty}^{\infty} f_1(x') f_2(x-x') dx' = f_1(x) * f_2(x)$ $$f_1(x) * f_2(x) = \mathsf{F}_T\left[\mathsf{F}_T(f_1(x)) \cdot \mathsf{F}_T(f_2(x))\right] \qquad\text{—— 210}$$

correlation of $f_1(x)$ and $f_2(x) = \int_{-\infty}^{\infty} f_1(x') f_2(x+x') dx' = f_1(x) \odot f_2(x)$
$\qquad\qquad\qquad\qquad\qquad\qquad\qquad\qquad\qquad\qquad\qquad\qquad$ } 212
$$f_1(x) \odot f_2(x) = \mathsf{F}_T\left[\mathsf{F}_T^*(f_1(x)) \cdot \mathsf{F}_T(f_2(x))\right]$$

$$f(x,y) = \int_{q=-\infty}^{\infty}\int_{p=-\infty}^{\infty} F(p,q) e^{-2\pi i(px+qy)} dp dq$$
$$F(p,q) = \int_{y=-\infty}^{\infty}\int_{x=-\infty}^{\infty} f(x,y) e^{2\pi i(px+qy)} dp dq$$
$\qquad\qquad\qquad\qquad\qquad\qquad\qquad$ } 214

$$f(x,y,z) = \int_{r=-\infty}^{\infty}\int_{q=-\infty}^{\infty}\int_{p=-\infty}^{\infty} F(p,q,r) e^{-2\pi i(px+qy+rz)} dp dq dr$$
$$\mathsf{F}(p,q,r) = \int_{z=-\infty}^{\infty}\int_{y=-\infty}^{\infty}\int_{x=-\infty}^{\infty} f(x,y,z) e^{2\pi i(px+qy+rz)} dx dy dz$$
$\qquad\qquad\qquad\qquad\qquad\qquad\qquad\qquad\qquad\qquad$ } 216

FIG. 2A $$220 \begin{cases} A[\text{N}] = \text{set of numbers } A_m, \text{where } 0 \leq m \leq \text{N-1} \\ a[\text{N}] = \text{set of numbers } a_n, \text{where } 0 \leq n \leq \text{N-1} \end{cases}$$

$$222 \begin{cases} A_m = \dfrac{1}{\text{N}} \sum_{0}^{N-1} a_n e^{2\pi i n m / \text{N}} \\ a_n = \sum_{0}^{N-1} A_m e^{-2\pi i n m / \text{N}} \end{cases}$$

/224

$$\begin{bmatrix} A(0) \\ A(1) \\ A(2) \\ A(3) \\ \vdots \\ A(N-1) \end{bmatrix} = \begin{bmatrix} 1 & 1 & 1 & \cdots & 1 \\ 1 & e^{2\pi i/N} & e^{4\pi i/N} & \cdots & e^{2(N-1)\pi i/N} \\ 1 & e^{4\pi i/N} & e^{8\pi i/N} & \cdots & e^{4(N-1)\pi i/N} \\ 1 & e^{6\pi i/N} & e^{12\pi i/N} & \cdots & e^{6(N-1)\pi i/N} \\ \vdots & \vdots & \vdots & \vdots & \vdots \\ 1 & \cdots & \cdots & \cdots & e^{(N-1)^2 2\pi i/N} \end{bmatrix} \begin{bmatrix} a(0) \\ a(1) \\ a(2) \\ a(3) \\ \vdots \\ a(N-1) \end{bmatrix}$$

FIG. 2B

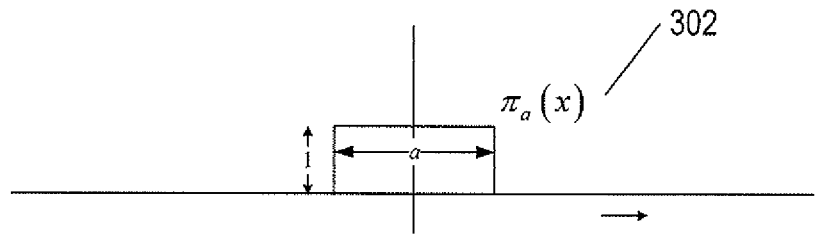
$$\pi_a(x) = \begin{cases} 0, & -\infty < x < -a/2 \\ 1, & -a/2 \leq x \leq a/2 \\ 0, & a/2 < x < \infty \end{cases} \Bigg\} 306$$
$$\left.\begin{aligned} F_T(\pi_a(x)) &= \int_{-\infty}^{\infty} \pi_a(x) e^{2\pi i p x} dx \\ &= \int_{-a/2}^{a/2} e^{2\pi i p x} dx \\ &= \frac{1}{2\pi i p} \left[ e^{\pi i p a} - e^{-\pi i p a} \right] \\ &= a \left[ \frac{\sin(\pi p a)}{\pi p a} \right] \\ &= a \operatorname{sinc}(\pi p a) \end{aligned}\right\} 308$$
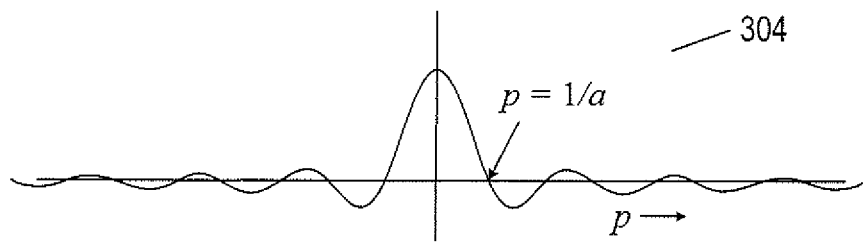
FIG. 3

FIG. 14B

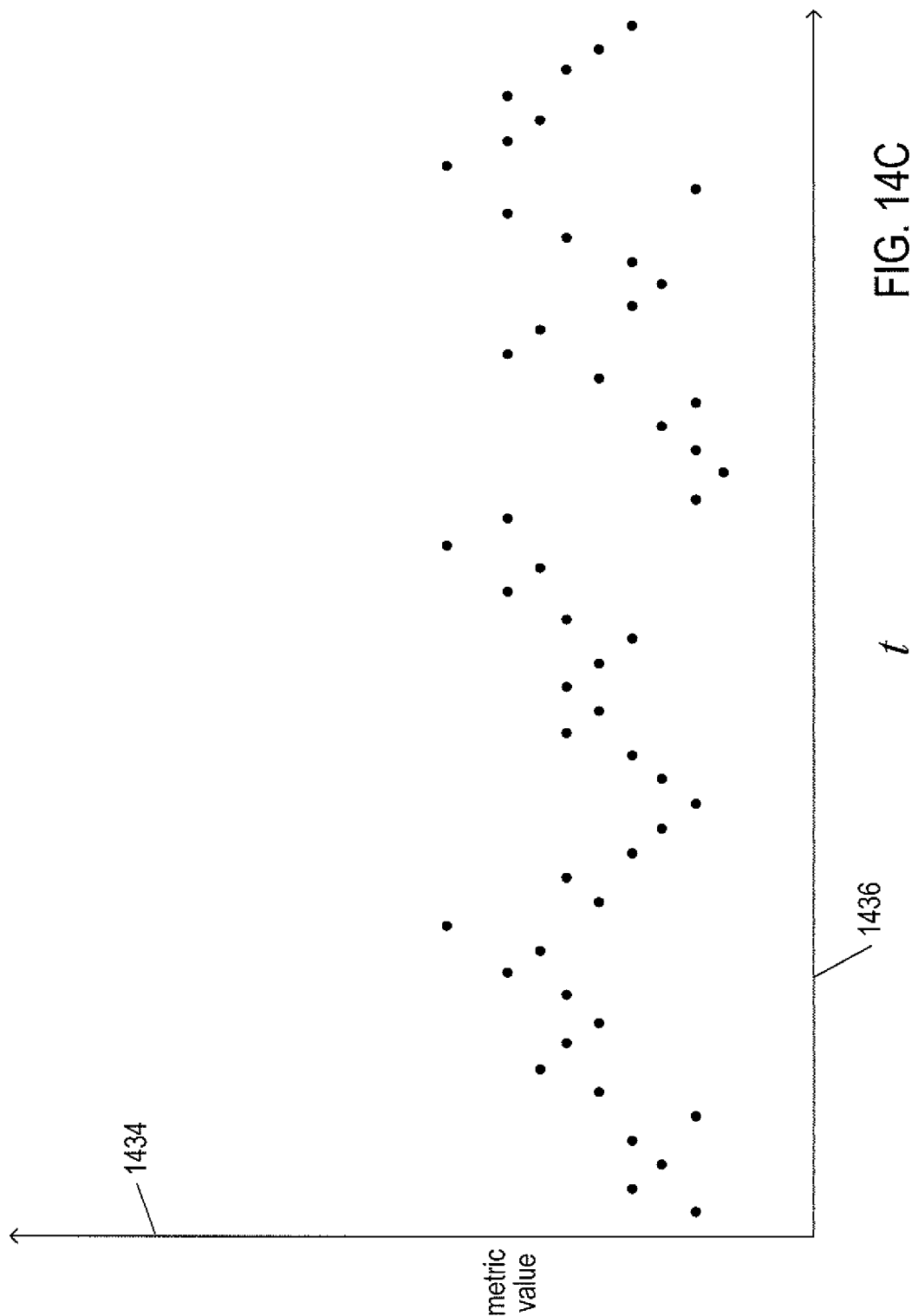

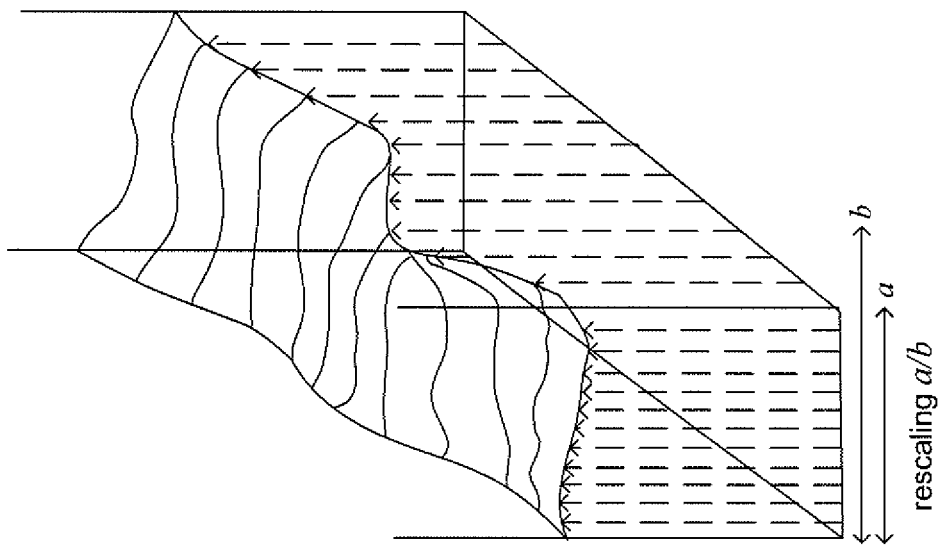
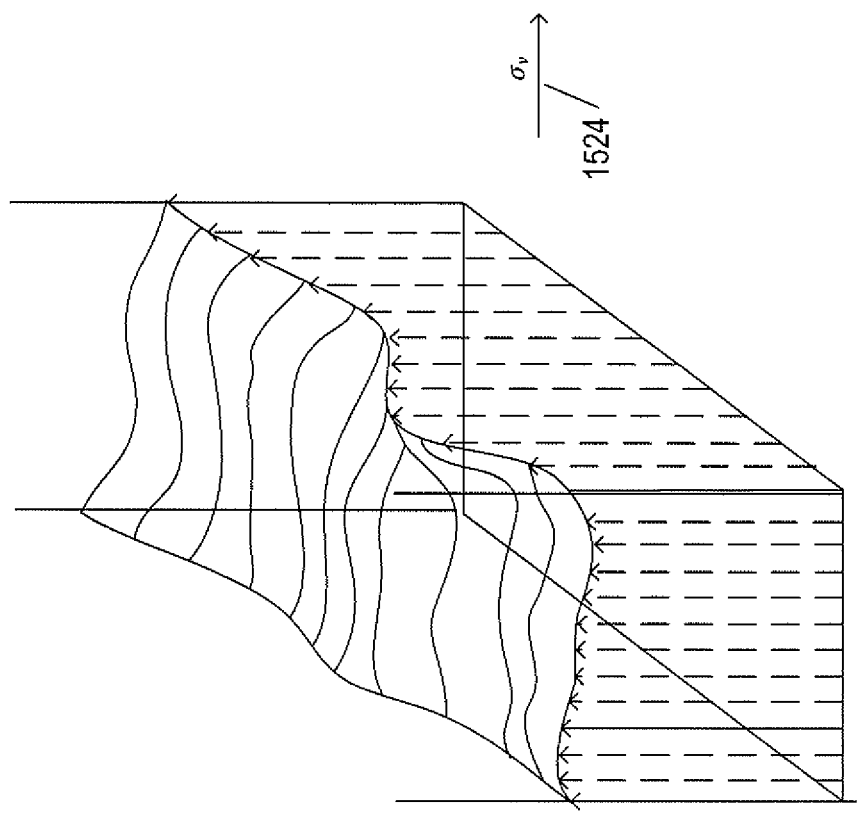
FIG. 15E

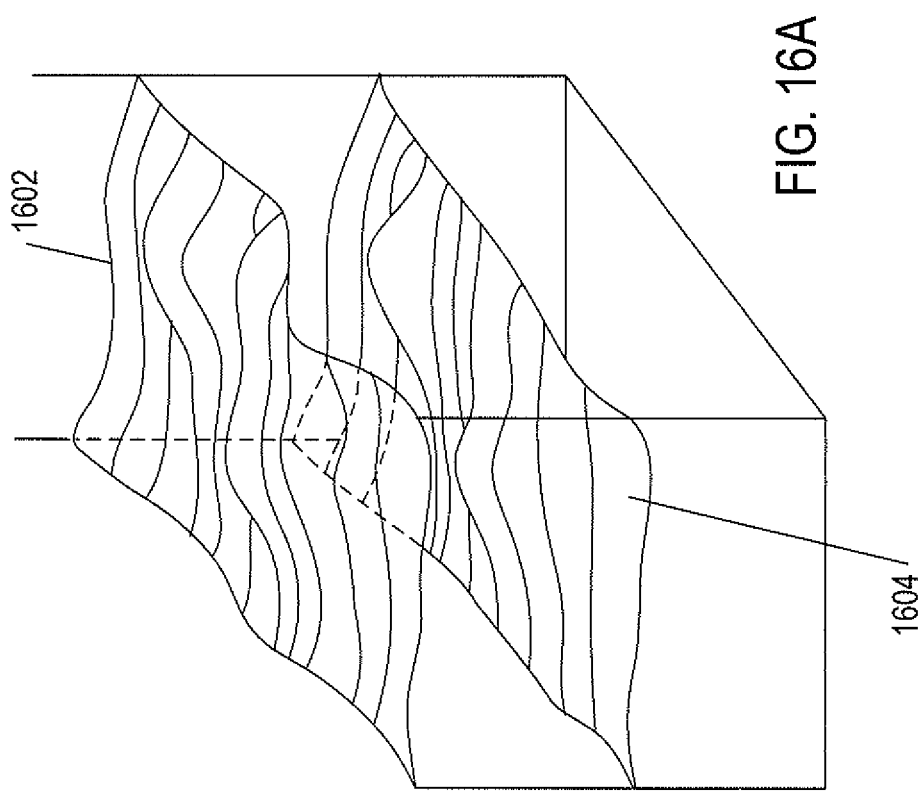

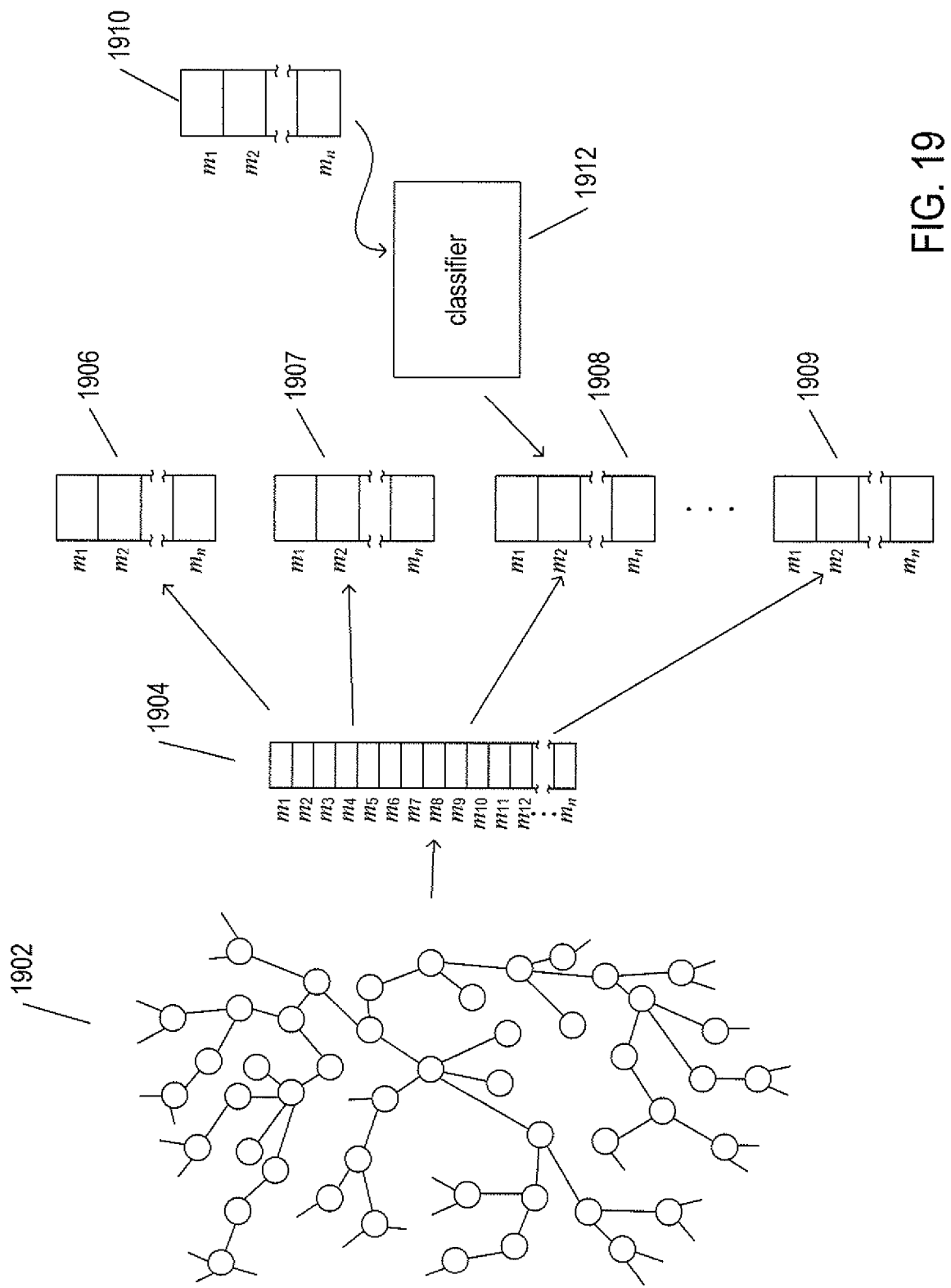

FREQUENCY-DOMAIN ANALYSIS OF DATA-CENTER OPERATIONAL AND PERFORMANCE METRICS

TECHNICAL FIELD

The current document is directed to automated computer-system administration and management as well as automated tools to facilitate human administration and management of computer systems and, in particular, to methods and systems for frequency-domain analysis of time-ordered operational and performance metric values within computer systems.

BACKGROUND

Initially, computers were large, monolithic, single-processor systems that sequentially executed programs, encoded on stacks of Hollerith cards, without the benefit of operating systems, communications networks, and programs compiled from modem computer languages. Over the past 60 years, computer systems have evolved to include a wide variety of system and device types, from hand-held smart phones and tablets, which provide computational bandwidths and data-storage capacities that are orders of magnitude greater than those provided by the initial computer systems of the mid-1950s, to vast, network-interconnected distributed computing systems that include thousands, tens of thousands, or more multi-processor servers, dedicated data-storage appliances, and communications networks. These distributed computing systems can each support multiple virtualized data centers, each comprising thousands, tens of thousands, or more virtual servers interconnected with virtual networks to support execution of very large numbers of virtual machines that each, in turn, support execution of one or more applications.

While the operational state of an early, 1950s single-processor computer system could be represented by numerical values stored in a handful of status registers, the operational state of a large, modem, distributed computing system or virtualized data center may currently be obtained only by automated and semi-automated processing of megabytes, gigabytes, or terabytes of accumulated data to produce a large derived data set that represents the system state. Modern, distributed computing systems and virtualized data centers include many different types of components at a variety of different hierarchical levels of organization, each of which may be, in part, characterized by a variety of different numerical and textural status values and descriptions as well as collected sets of time-ordered operational and performance metric values. The performance, behaviors, operational characteristics, and corresponding metrics and state representations for the various components may vary over sub-millisecond time intervals, as in the case of processors, to seconds, as in the case of network components, to days and longer periods of time, as in the case of data-storage capacities. For certain components, such as collections of executing application programs and operating-system routines that are referred to as workloads, the state of, and operational and performance metrics associated with, workloads may exhibit time behaviors over a range of time intervals from milliseconds to days, weeks, and longer time intervals. Thus, not only are the data sets from which derived data sets that represent system operational states and performance are obtained voluminous, but they additionally involve time-dependent behaviors that vary over vastly differing characteristic time intervals.

As a result of the complexity of current distributed computer systems, including virtualized data centers, and the enormous amount of data that must be processed and analyzed in order to understand the performance and operational characteristics of the distributed computing systems so that the distributed computing systems can be rationally managed and administered, management and administration of modem computing systems is necessarily evolving from manual methods and processes to fully automated management and administration. Even with fully automated management and administration, the computational bandwidth, data-storage capacity, and communications-network bandwidth needed for automated management and administration of modem distributed computing systems may represent a significant fraction of the total bandwidth and capacity of the distributed computing systems. Designers, manufacturers, and vendors of distributed computing systems, as well as users and, ultimately, clients of distributed computing systems, therefore continue to seek new, efficient automated tools for processing and analysis of data generated within distributed computing systems, including operational and performance metric values, in order to implement automated management and administration components of distributed computing systems and to facilitate performance of remaining semi-automated administration and management tasks.

SUMMARY

The current document is directed to methods and systems for frequency-domain analysis of operational and performance metric values and other data generated and collected within computer systems, including large distributed computer systems and virtualized data centers. In one implementation, each set of time-ordered values for each metric in a set of metrics is partitioned into time intervals, transformed from the time domain to the frequency domain, and aligned to generate a frequency-time-amplitude surface in a frequency-time-amplitude space. The frequency-time-amplitude surfaces are then pairwise compared to identify related metrics. In addition, in certain implementations, transfer functions are generated for transforming each of two surfaces corresponding to two metrics into the other of the two surfaces. The comparison values and transfer functions are used to produce graphs that encapsulate discovered relationships between metrics. These graphs can be used in automated administration and management systems for analysis of the operational and performance characteristics of the system, classification of system components, resource management and tuning, identification and diagnosis of problem states and anomalies, and for many other purposes.

BRIEF DESCRIPTION OF THE DRAWINGS

FIGS. 1A-G illustrate the decomposition of a complex waveform into component sinusoids, a frequency-domain discrete spectrum of the complex waveform, and a mathematical context for describing complex waveforms as the sum of component sinusoids.

FIGS. 2A-B show expressions for Fourier transforms and illustrate the convolution operation.

FIG. 3 illustrates a simple Fourier pair.

FIGS. 14A-H illustrate metric-value data sets and generation of metric surfaces in frequency-time-amplitude space.

FIGS. 15A-F illustrate several types of operations that are carried out on metric surfaces.

FIGS. 16A-C illustrate two of many possible approaches to computing a relatedness value, or comparison metric, between two metric surfaces.

FIG. 19 illustrates one approach to using frequency-domain data for classification.

DETAILED DESCRIPTION

The current document is directed to frequency-domain analysis methods and distributed-computing-system components that implement and facilitate automated and semi-automated system management and administration using frequency-domain analysis methods. In a first subsection, below, an overview of Fourier series and Fourier transforms is provided. In a second subsection, an overview of distributed computing systems and data centers is provided. A third subsection discusses the frequency-domain-analysis methods and frequency-domain-analysis-based systems to which the current document is directed.

Overview of Fourier Series and Fourier Transforms

Figure 1A:
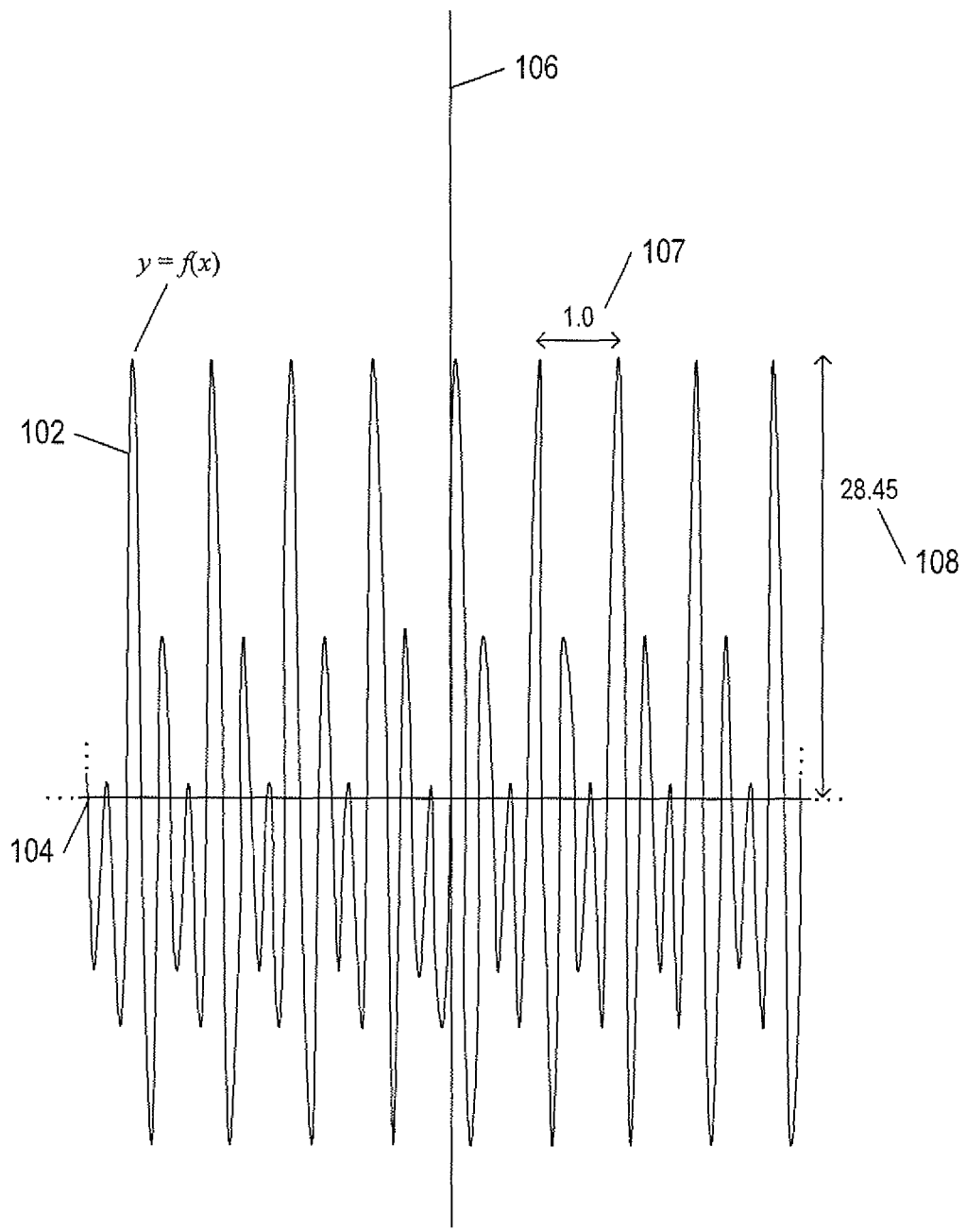
Figure 1B:
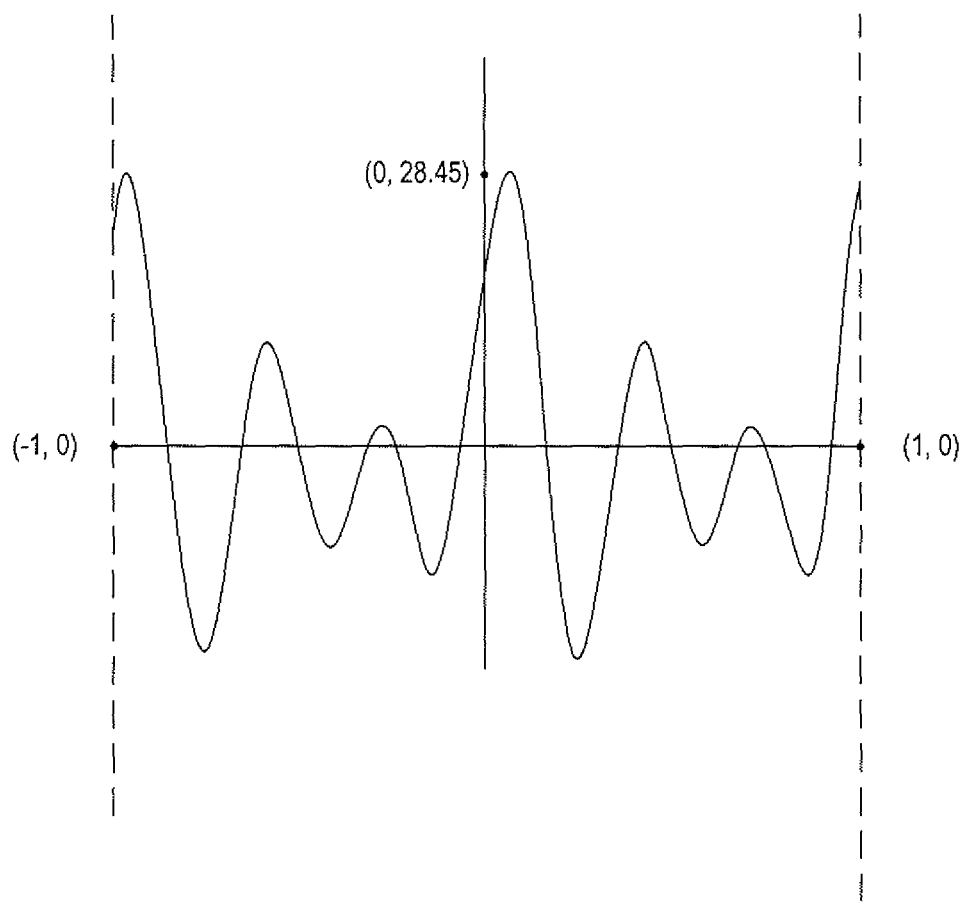

FIGS. 1A-F illustrate the decomposition of a complex waveform into component sinusoids, a frequency-domain discrete spectrum of the complex waveform, and a mathematical context for describing complex waveforms as the sum of component sinusoids. FIG. 1A shows a two-dimensional plot of a function y=ƒ(x) that represents an example complex waveform. The function 102 is plotted with respect to orthogonal x 104 and y 106 axes. The plotted function is clearly periodic, with a fundamental period 107 of 1.0 units with respect to the x axis. The maximum positive value obtained by the function is 28.45 (108 in FIG. 1A). Note that the x and y axes have different relative scales. FIG. 1B shows two periods of the complex-waveform function y=ƒ(x) with a different scaling. The function y=ƒ(x) repeats indefinitely in both the negative and positive directions along the x axis or, in other words, has a domain of $-\infty$ to $+\infty$.

Figure 1C:
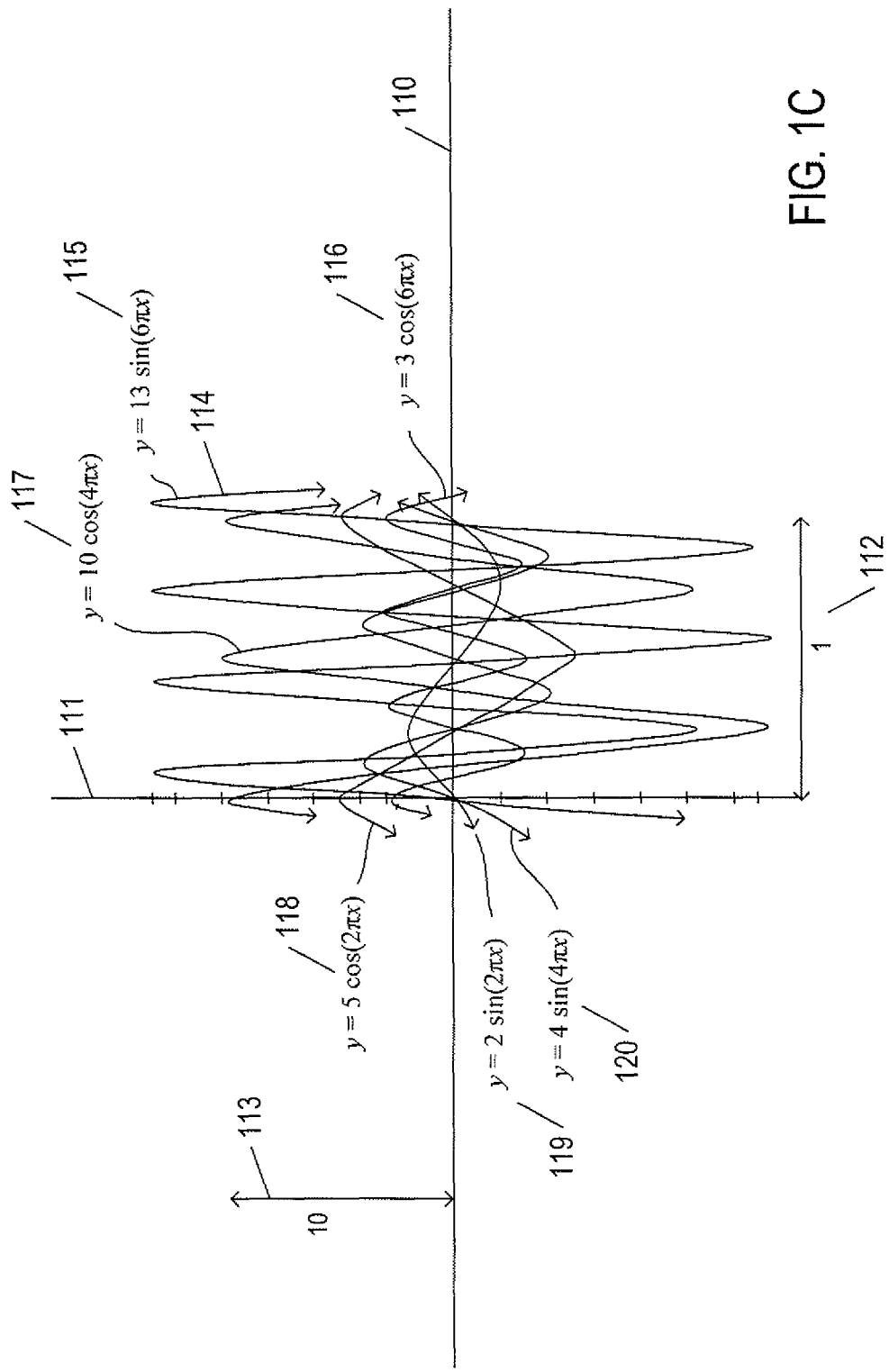

At first glance, the complex waveform shown in FIGS. 1A-B appears to be a perhaps complicated function, a closed-form expression for which might be difficult to determine. However, the complex waveform is simply the sum of six sinusoids. FIG. 1C shows the component sinusoids of the complex waveform shown in FIGS. 1A-B for a single period of the complex waveform. In FIG. 1C, portions of the component sinusoids are plotted with respect to the x 110 and y 111 axes, with the different scaling for the two axes indicated by the horizontal line segment 112 of length 1 and vertical line segment 113 of length 10. Expressions for the simple component sinusoids are also provided in FIG. 1C. For example, component sinusoid 114 is mathematically represented by expression 115. The component sinusoids include three cosine functions 116-118 and three sine functions 115 and 119-120.

FIG. 1D provides a mathematical representation of the complex waveform shown in FIGS. 1A-B in terms of the component sinusoids, portions of which are shown in FIG. 1C. The complex waveform is a simple function of one variable 126. The complex-waveform function can be expressed in terms of the six component functions as the sum of the six component sinusoid functions 127. The value of the complex function at x=0 is easily computed to be 18 (128 in FIG. 1D). The value of the complex-waveform function for x=0.06 is computed to be 28.45 (129 in FIG. 1D). In fact, the first maximum-valued peak in the first period of the positive portion of the complex waveform has the coordinates (0.06, 28.45).

While the complex waveform shown in FIGS. 1A-B was intentionally constructed, from the six simple sinusoids shown in FIG. 1C, it turns out that, according to Fourier theory, any periodic function ƒ(t) can be mathematically represented as the sum of the cosine and sine functions for the fundamental period of the function and cosine and sine functions for multiples of the fundamental period, as shown in the final expressions 130 in FIG. 1D. In these expressions, $v_0$ is the fundamental frequency, in an inverse time unit, such as $$\frac{1}{1 \text{ second}}.$$

The variable t may represent time, but may alternatively represent any many other continuous dimensions.

Figure 1E:
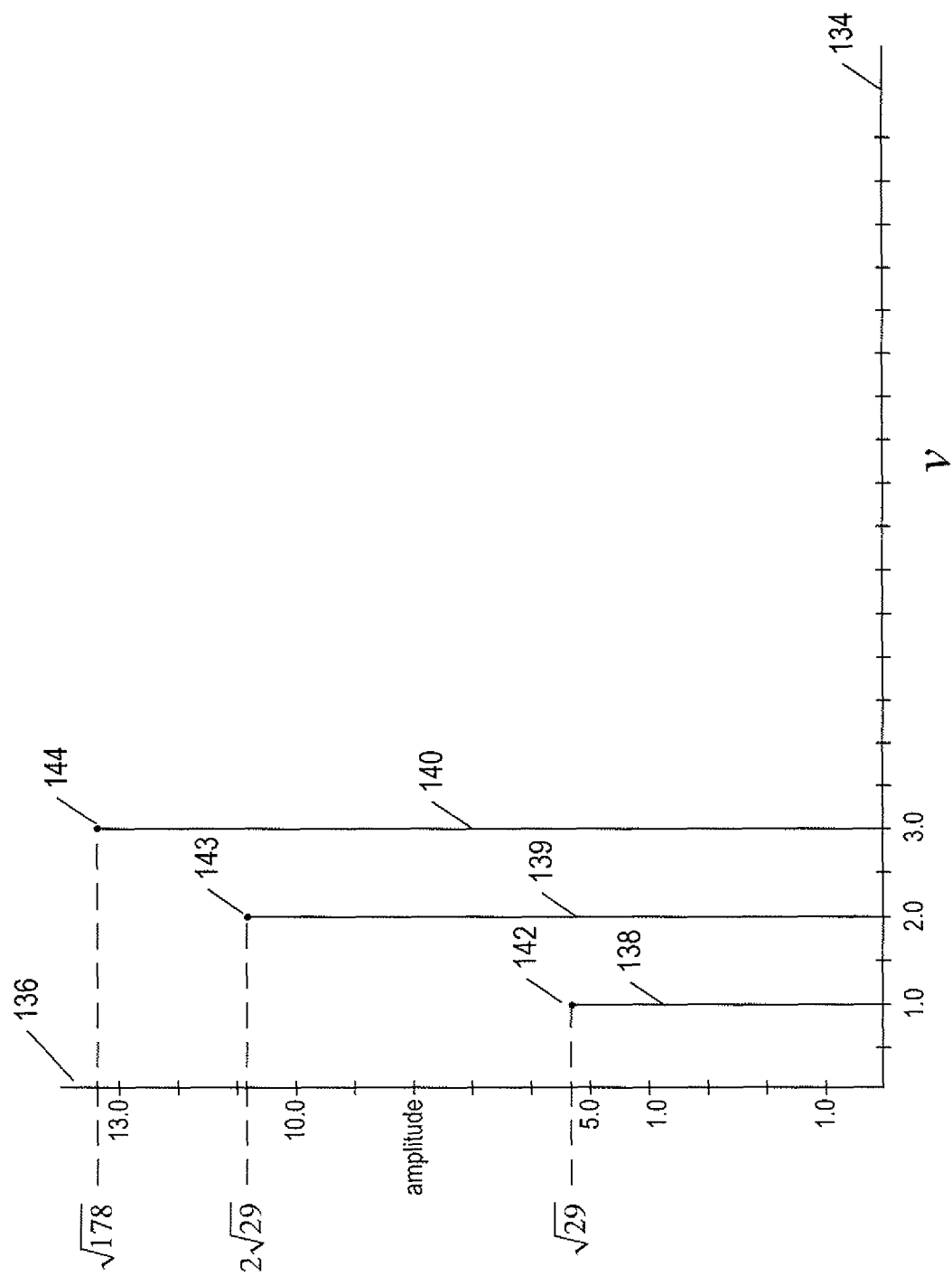

FIG. 1E shows a discrete frequency-domain spectrum of the complex waveform shown in FIGS. 1A-B. In FIG. 1E, the horizontal axis 134 represents frequency and the vertical axis 136 represents amplitude. The spectrum includes three vertical lines 138-140 or, equivalently, three points 142-144. The spectrum is related to the Fourier transform of the original complex waveform. The complex waveform is in the time or spatial domain, depending on the meaning of the independent variable x while the spectrum shown in FIG. 1E is in the frequency domain. Both the spectrum and the original plot of the complex waveform contain equivalent information.

FIG. 1F provides alternative mathematical representations of general periodic functions expressed as sums of component sinusoids or, in other words, as Fourier series. Expression 150 is the same expression shown in the pair of expressions 130 in FIG. 1D. An alternative form of this expression changes the limits of the summation by combining pairs of terms 152. Yet another form of the expression features a sum of terms that include the amplitude and phase of each of the harmonics 154. A final form of the expression 156, which is perhaps most generally useful in science and engineering, involves complex coefficients and complex exponents of the base of the natural logarithms, e.

When the amplitudes and frequencies of the component sinusoids of a complex waveform are known, the complex waveform $f(t)$ is readily computed using any of the forms of the expression for the complex waveform provided in FIG. 1F and discussed above. Conversely, when the complex-waveform function $f(t)$ is experimentally determined or observed, the coefficients for the terms in the Fourier series can be easily computed as indicated by the inversion formulas 158 shown in the lower portion of FIG. 1F. Thus, one can generate the Fourier series from an observed complex waveform and one can generate the functional expression for a complex waveform when the amplitudes and frequencies of the component sinusoids are known. Any periodic function can be expressed as the sum of one or more component sinusoids.

Figure 1G:
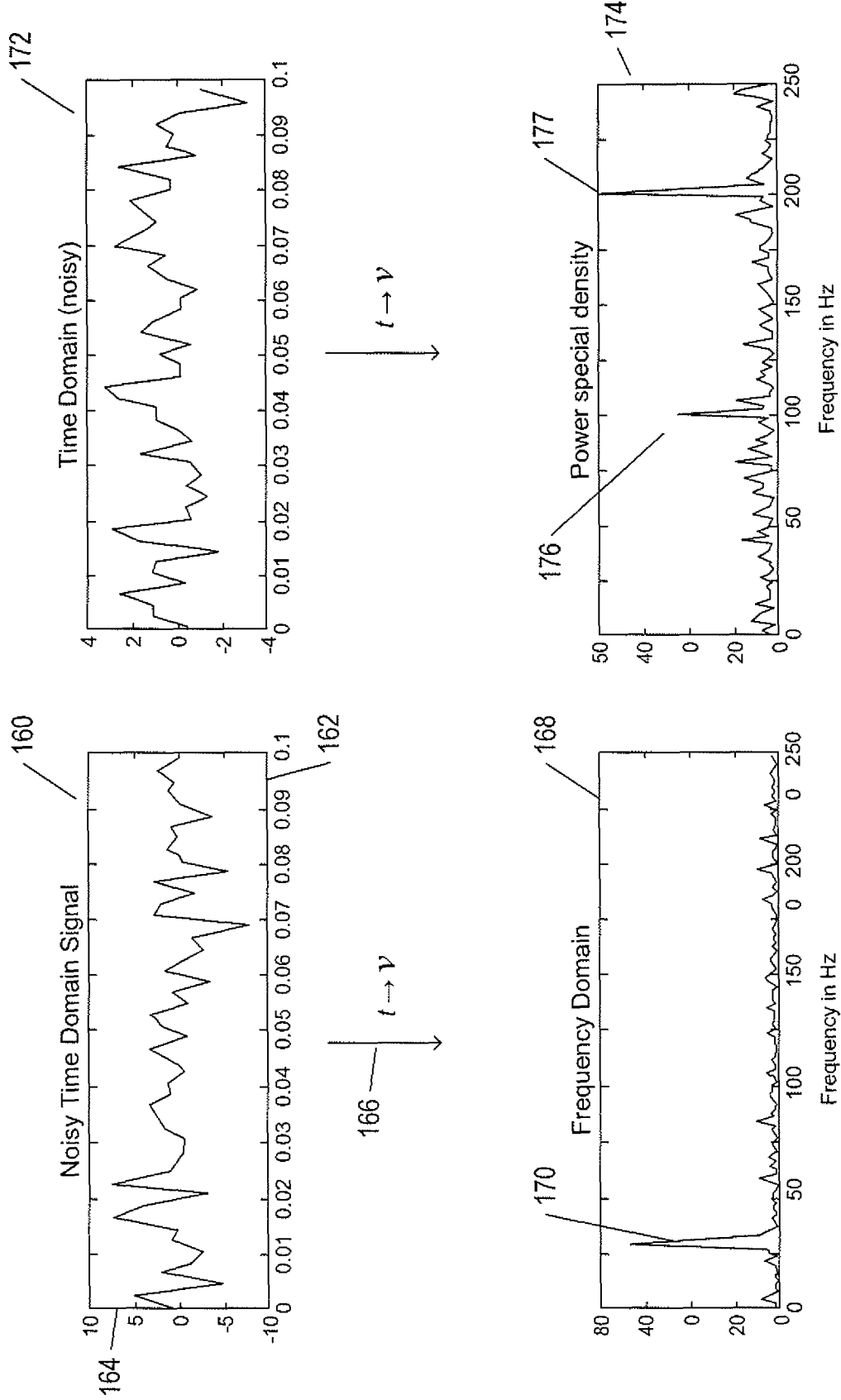

FIG. 1G shows simple examples of the usefulness of transforming time-domain metric information into corresponding frequency-domain metric information. In plot 160 shown in FIG. 1G, the time behavior of a performance metric, sampled by a distributed computing system, is shown, with the horizontal axis 162 represent time and the vertical axis 164 representing sampled performance-metric values. This plot contains considerable noise with little discernible pattern. However, when the time-domain plot is transformed 166 to a frequency-domain plot 168, the prominent peak 170 indicates that the time behavior of the performance metric has a strong periodicity at around 30 cycles per second. Information is lost when a time-domain signal is transformed to a frequency-domain signal and when a frequency-domain signal is transformed into a time-domain signal, other than a loss of a certain amount of precision when discrete computational transform processes are employed. However, quite often, signals that appear to contain little information or discernible patterns in one domain may, following transformation, exhibit clear patterns in another domain. Similarly, the noisy and seemingly random time-domain signal plotted in plot 172 in FIG. 1G, when transformed to the frequency domain 174, reveals two prominent peaks 176-177 that indicate strong periodicities at 100 and 200 cycles per second. Thus, domain transformations can often greatly facilitate interpretation and analysis of various types of data sets. Fourier transforms, including one-dimensional, two-dimensional, and higher-dimensional transforms, are used in many fields of science and engineering to extract information from data sets in temporal or spatial domains that would be otherwise difficult or impossible to analyze. In addition, many mathematical operations that are difficult to perform, or intractable, in one domain may be trivially carried out in another. One example is discussed below. Many image-processing methods employ Fourier transforms to transform images from the spatial domain to the frequency domain, where it is easy to apply various types of low-pass and high-pass filters in order to remove high-frequency noise and low-frequency intensity distortions. Three-dimensional Fourier transforms are used in x-ray crystallography to determine the electron density, and corresponding spatial positions of atoms within unit cells of crystals, from observed intensities of diffracted x-rays. Fourier analysis is fundamental to quantum mechanics, acoustics, and many other scientific and engineering fields.

FIGS. 2A-B show expressions for Fourier transforms and illustrate the convolution operation. Expressions 202 in FIG. 2A provide a formal mathematical statement of the Fourier transform. A function in the time domain, $f(t)$ can be expressed as the integral of a continuum of sinusoids, or harmonics, with frequencies ranging from $-\infty$ to $\infty$. The amplitude of the signal at a particular frequency v, F(v), is obtained by integrating over time. The two expressions can be thought of as forward and reverse transforms, with the forward transform from the time domain to the frequency domain and the reverse transform from the frequency domain to the time domain. Of course, it is arbitrary which transform is considered to be the forward transform and which transform is considered the reverse, or inverse, transform. Note that these expressions bear similarity to the expressions for a Fourier series and the expressions for computing the coefficients of the Fourier series, discussed above with reference to expressions 156 and the final expression in the set of expressions 158 of FIG. 1F. Expressions 204 represent the Fourier transform more succinctly, with the symbol $F_T(\ )$ representing the integrals in the previously discussed expressions 202. Expression 206 even more simply represents a Fourier-transform pair.

As one example of a function that is readily computed in one domain but difficult to compute in another domain, the convolution function is next discussed. The convolution of two spatial-domain functions $f_1(x)$ and $f_2(x)$ is shown as expression 208 in FIG. 2A. For each spatial value x, the value of the convolution for spatial value x, C(x) is computed by the integral shown in expression 208. Computation of the integral is difficult. However, as shown in expression 210 in FIG. 2A, the convolution of two spatial-domain functions is equal to the inverse Fourier transform of the product of the Fourier transforms of the two functions. Provided that the Fourier transforms and inverse Fourier transform are readily computed, it is far more computationally efficient to carry out the Fourier transforms of the two spatial-domain functions to the frequency domain, compute the product of these transform functions, and then carry out the inverse Fourier transform of the product back to the spatial domain in order to compute the convolution. This is but one example of many types of mathematical operations that are computationally easy in one domain but computationally difficult in another. Another example is the correlation function, expressions for which are provided in FIG. 2A as the set of expressions 212.

The above statement of the Fourier transform is for a one-dimensional case. Expressions 214 illustrate a two-dimensional Fourier pair and expressions 216 illustrate a three-dimensional Fourier pair.

While the expressions for Fourier transforms discussed above with reference to FIG. 2A are continuous, discrete Fourier transforms are also employed, particularly for computation by digital computers. As shown in FIG. 2B, two sets of numbers $A_m$ and $a_n$ 220 may be related by discrete Fourier transforms 222. The forward transform from the a domain to the A domain can be alternatively expressed as a matrix operation 224.

FIG. 3 illustrates a simple Fourier pair. A top-hat function $\pi_a(x)$ is shown in the x domain in plot 302. The Fourier transform of this top-hat function is shown in a second plot 304 in FIG. 3 in the p domain. A definition for the top-hat function is shown in expressions 306. The Fourier transform of this function is computed in expressions 308.

It should be noted that, unlike Fourier series, the expressions for the forward and reverse Fourier transforms are applicable not only to periodic functions but to arbitrary functions, provided that the arbitrary functions meet certain conditions, including that the functions are single-valued, square-integratable, piece-wise continuous, and bounded.

Overview of Computers and Distributed-Computing Systems

Figure 4:
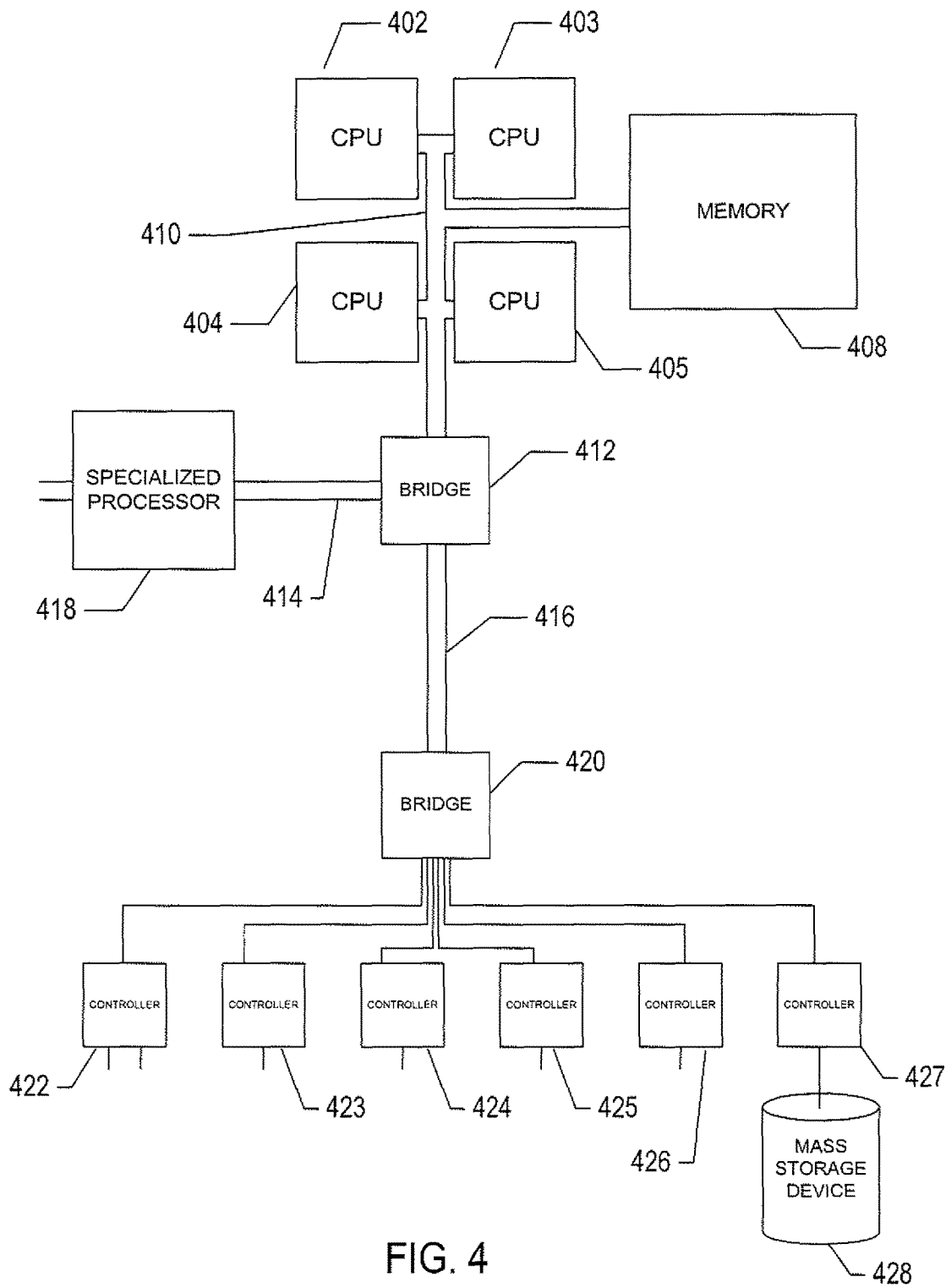
FIG. 4 provides a general architectural diagram for various types of computers.

FIG. 4 provides a general architectural diagram for various types of computers. The computer system contains one or multiple central processing units ("CPUs") 402-405, one or more electronic memories 408 interconnected with the CPUs by a CPU/memory-subsystem bus 410 or multiple busses, a first bridge 412 that interconnects the CPU/memory-subsystem bus 410 with additional busses 414 and 416, or other types of high-speed interconnection media, including multiple, high-speed serial interconnects. These busses or serial interconnections, in turn, connect the CPUs and memory with specialized processors, such as a graphics processor 418, and with one or more additional bridges 420, which are interconnected with high-speed serial links or with multiple controllers 422-427, such as controller 427, that provide access to various different types of mass-storage devices 428, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number and types of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 5:
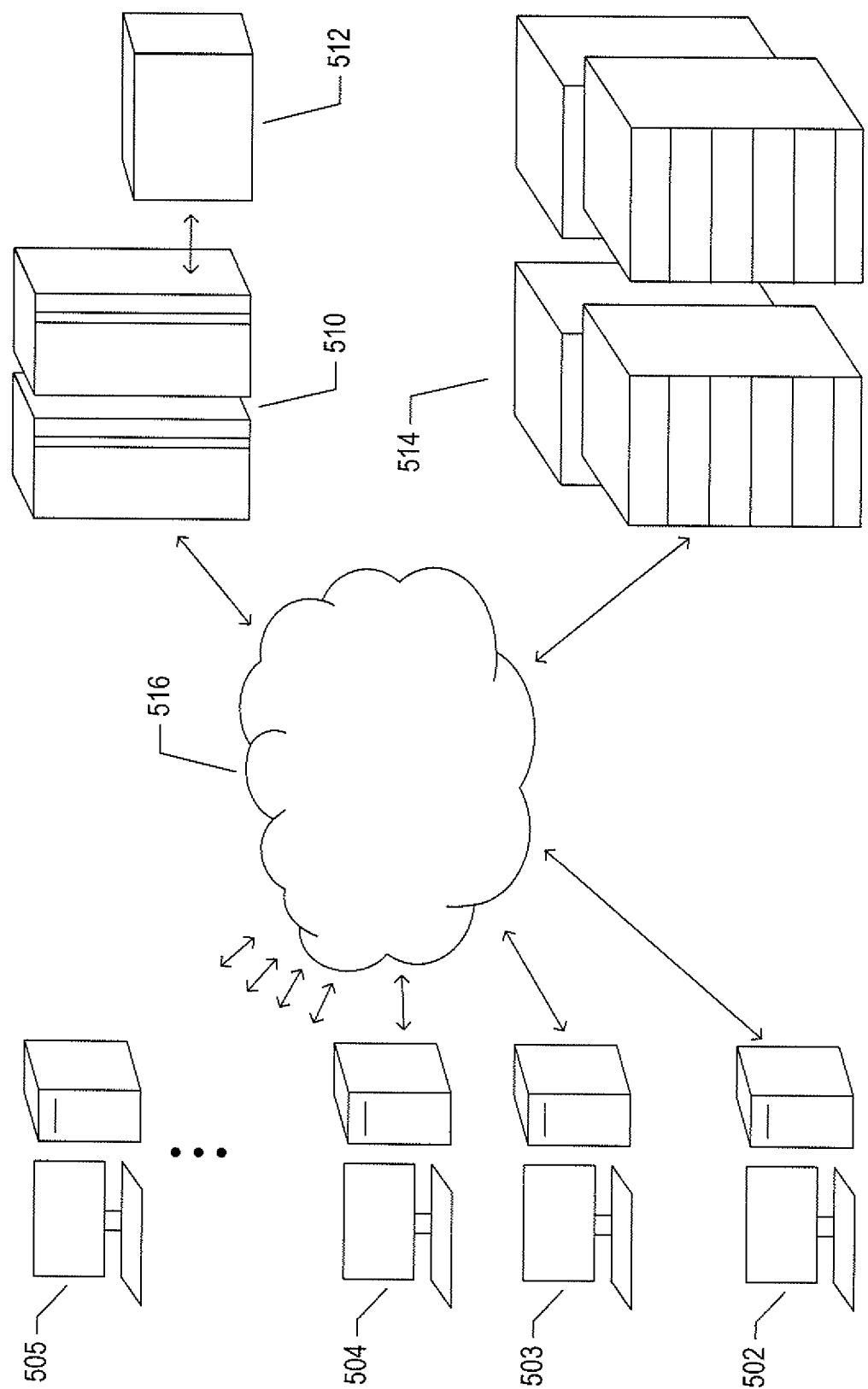
FIG. 5 illustrates an Internet-connected distributed computer system.

FIG. 5 illustrates an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 5 shows a typical distributed system in which a large number of PCs 502-505, a high-end distributed mainframe system 510 with a large data-storage system 512, and a large computer center 514 with large numbers of rack-mounted servers or blade servers all interconnected through various communications and networking systems that together comprise the Internet 516. Such distributed computer systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 6:
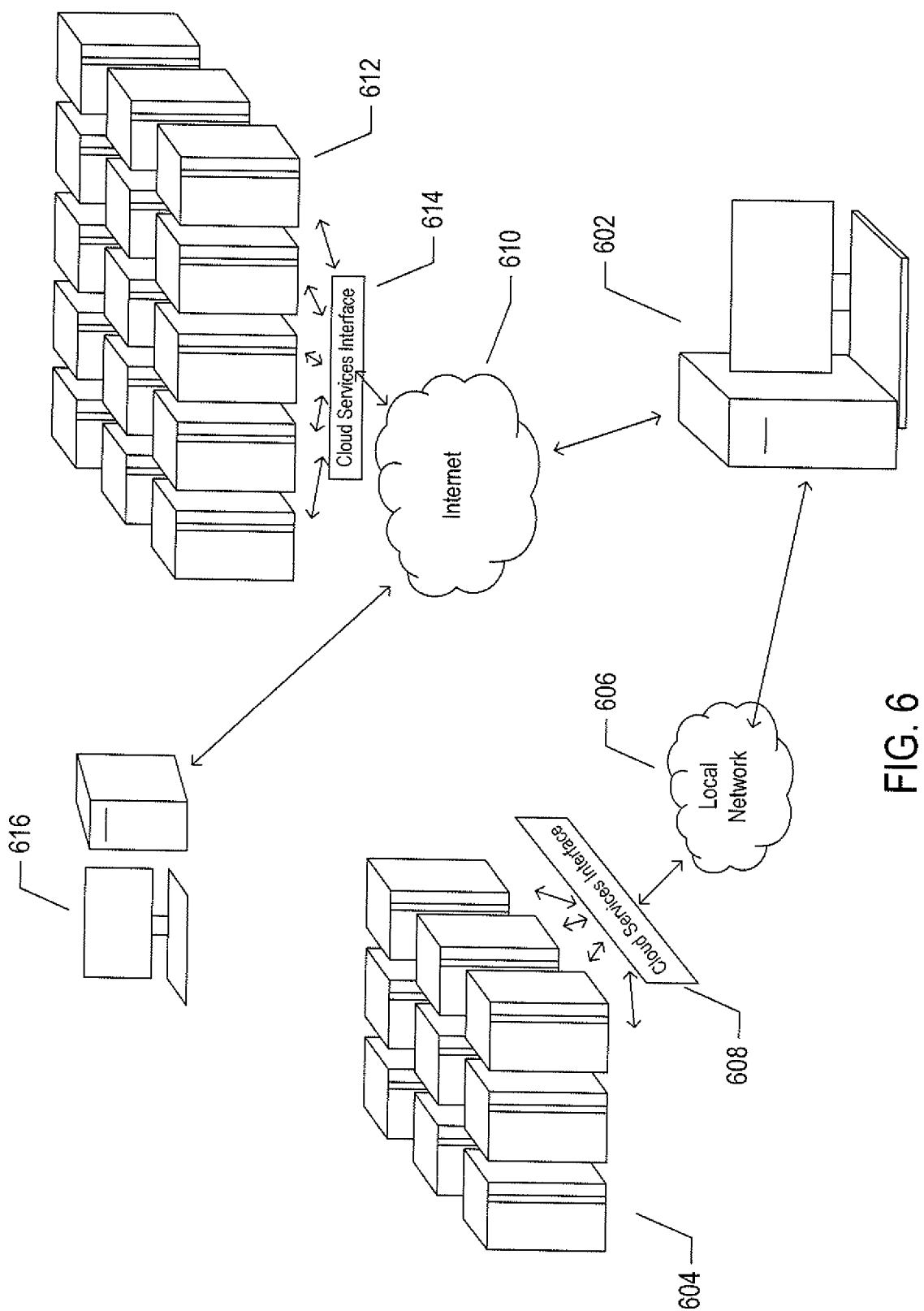
FIG. 6 illustrates cloud computing.

FIG. 6 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 6, a system administrator for an organization, using a PC 602, accesses the organization's private cloud 604 through a local network 606 and private-cloud interface 608 and also accesses, through the Internet 610, a public cloud 612 through a public-cloud services interface 614. The administrator can, in either the case of the private cloud 604 or public cloud 612, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 616.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades.

Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 7:
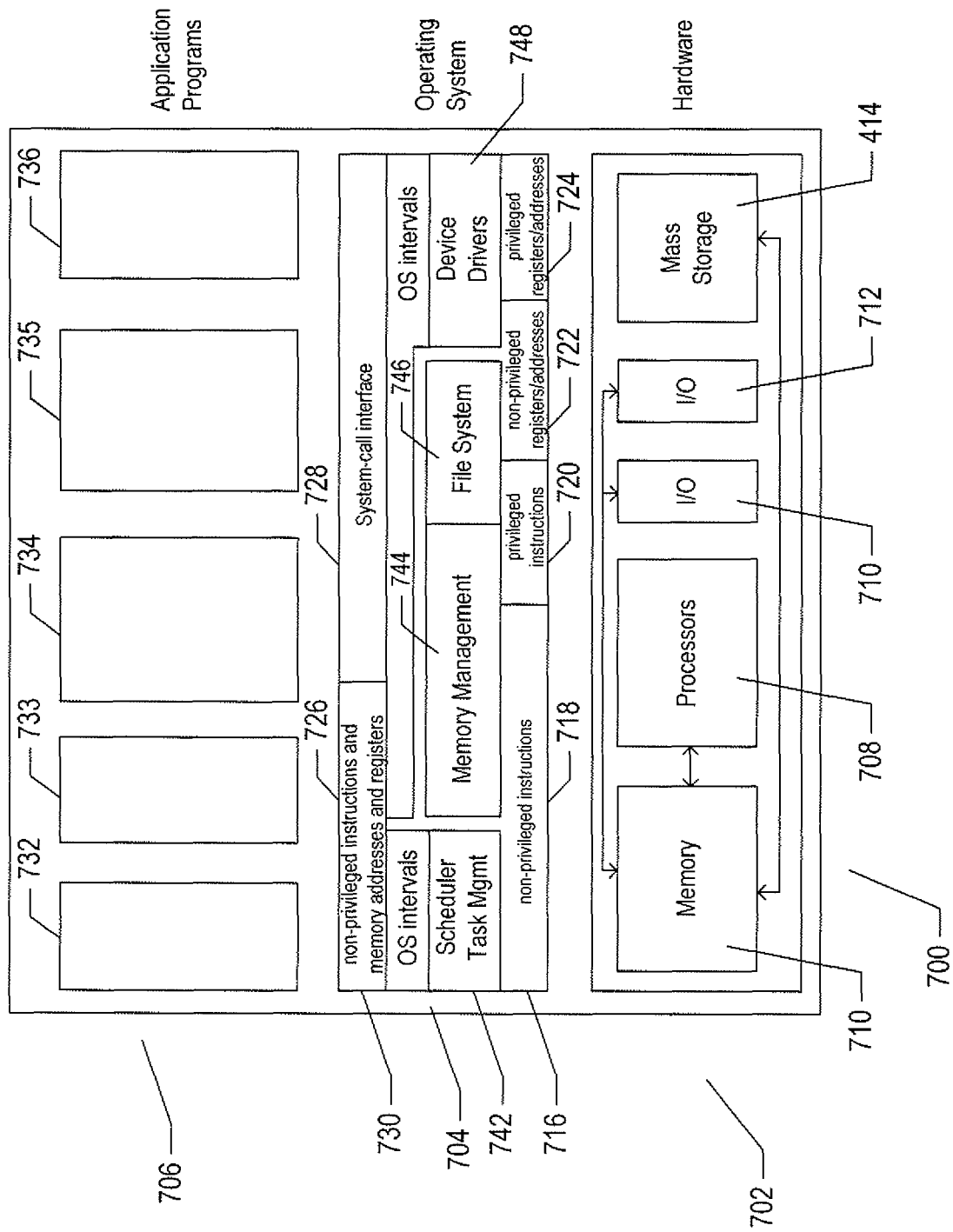
FIG. 7 illustrates generalized hardware and software components of a general-purpose computer system, such as a general-purpose computer system having an architecture similar to that shown in FIG. 4.

FIG. 7 illustrates generalized hardware and software components of a general-purpose computer system, such as a general-purpose computer system having an architecture similar to that shown in FIG. 4. The computer system 700 is often considered to include three fundamental layers: (1) a hardware layer or level 702; (2) an operating-system layer or level 704; and (3) an application-program layer or level 706. The hardware layer 702 includes one or more processors 708, system memory 710, various different types of input-output ("I/O") devices 710 and 712, and mass-storage devices 714. Of course, the hardware level also includes many other components, including power supplies, internal communications links and busses, specialized integrated circuits, many different types of processor-controlled or microprocessor-controlled peripheral devices and controllers, and many other components. The operating system 704 interfaces to the hardware level 702 through a low-level operating system and hardware interface 716 generally comprising a set of non-privileged computer instructions 718, a set of privileged computer instructions 720, a set of non-privileged registers and memory addresses 722, and a set of privileged registers and memory addresses 724. In general, the operating system exposes non-privileged instructions, non-privileged registers, and non-privileged memory addresses 726 and a system-call interface 728 as an operating-system interface 730 to application programs 732-736 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 742, memory management 744, a file system 746, device drivers 748, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 746 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 8A:
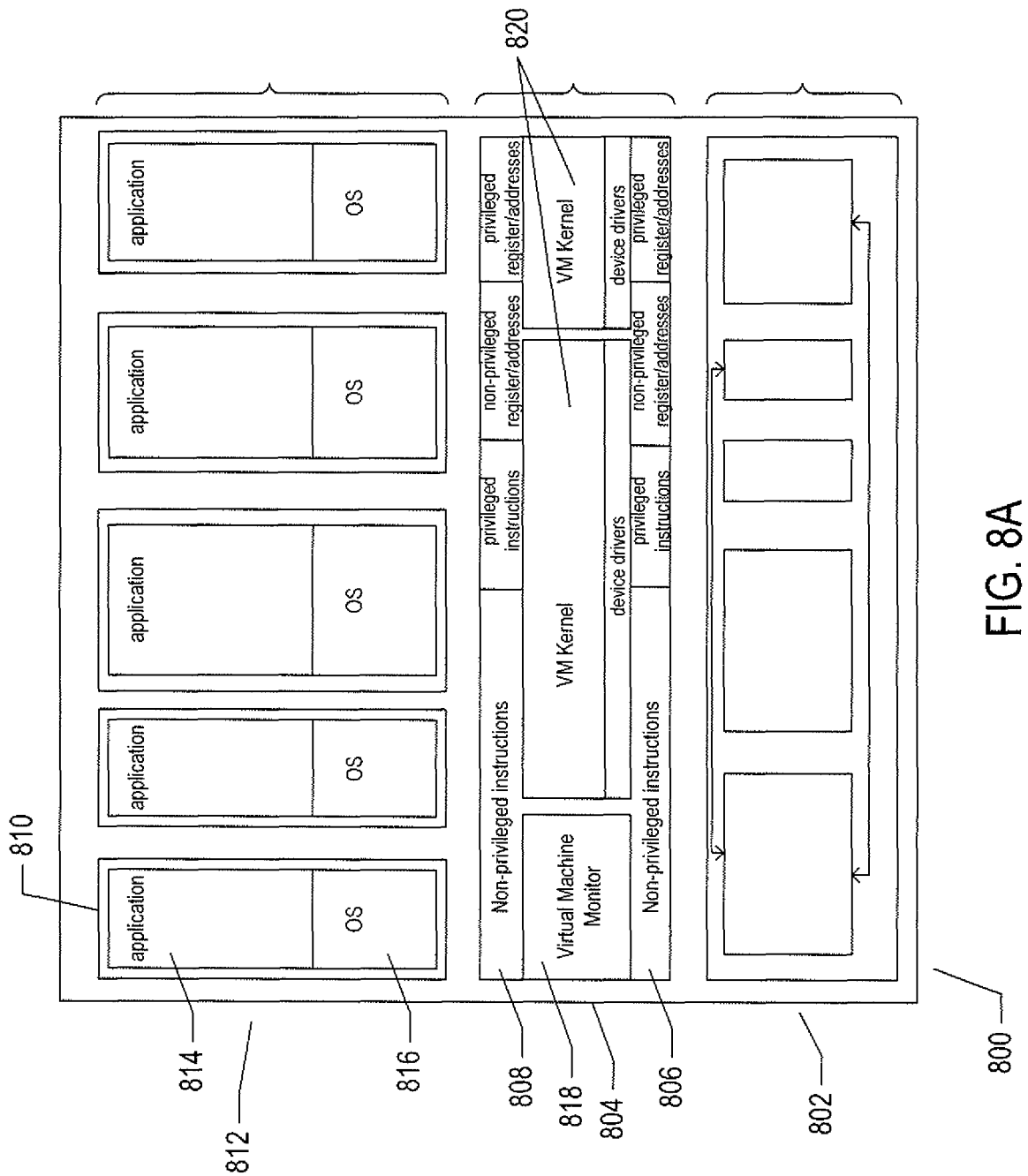
FIGS. 8A-D illustrate two types of virtual machine and virtual-machine execution environments as well as containers.
Figure 8B:
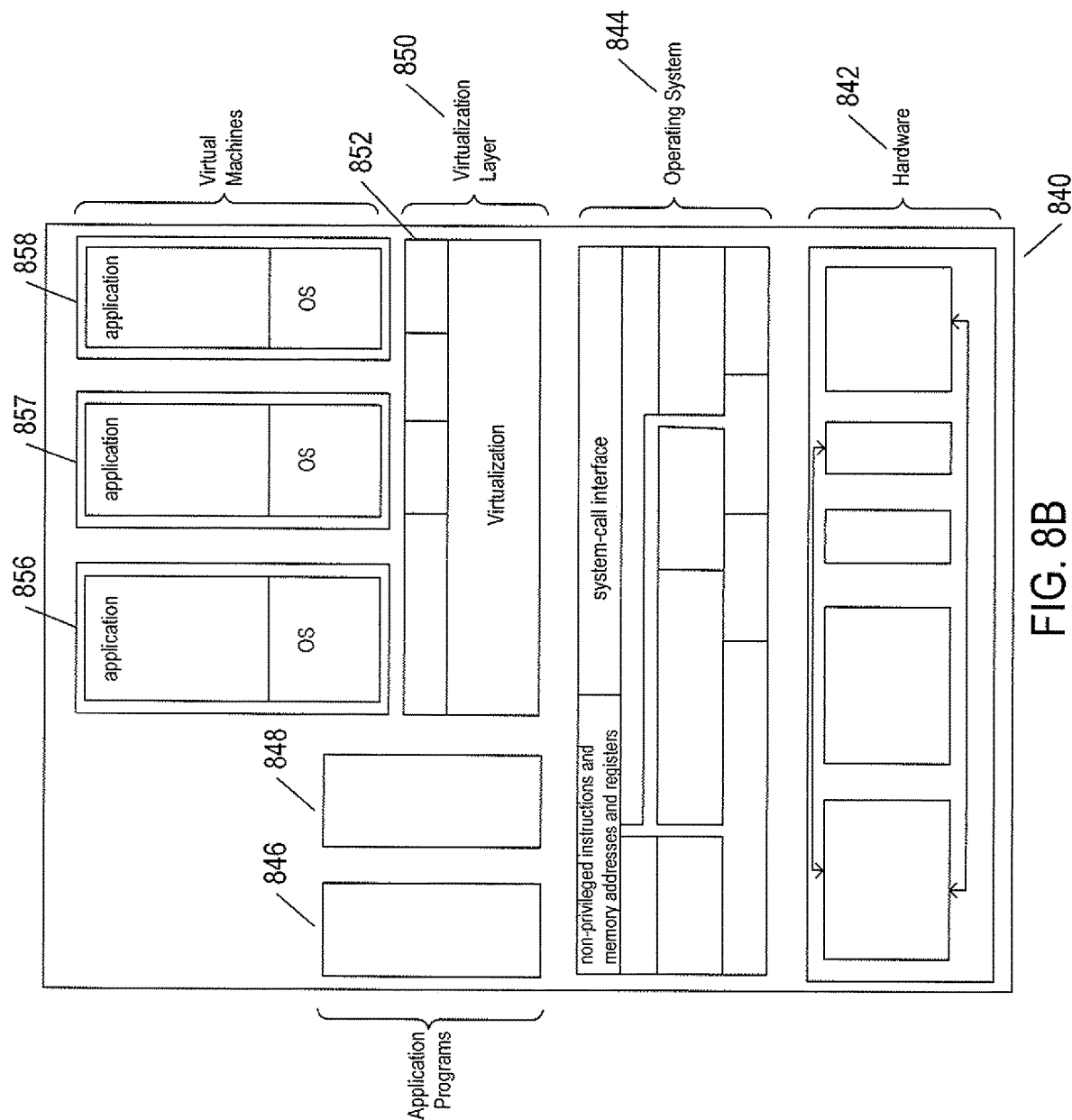

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 8A-D illustrate two types of virtual machine and virtual-machine execution environments as well as containers. FIGS. 8A-B use the same illustration conventions as used in FIG. 7. FIG. 8A shows a first type of virtualization. The computer system 800 in FIG. 8A includes the same hardware layer 802 as the hardware layer 702 shown in FIG. 7. However, rather than providing an operating system layer directly above the hardware layer, as in FIG. 7, the virtualized computing environment illustrated in FIG. 8A features a virtualization layer 804 that interfaces through a virtualization-layer/hardware-layer interface 806, equivalent to interface 716 in FIG. 7, to the hardware. The virtualization layer provides a hardware-like interface 808 to a number of virtual machines, such as virtual machine 810, executing above the virtualization layer in a virtual-machine layer 812. Each virtual machine includes one or more application programs or other higher-level computational entities packaged together with an operating system, referred to as a "guest operating system," such as application 814 and guest operating system 816 packaged together within virtual machine 810. Each virtual machine is thus equivalent to the operating-system layer 704 and application-program layer 706 in the general-purpose computer system shown in FIG. 7. Each guest operating system within a virtual machine interfaces to the virtualization-layer interface 808 rather than to the actual hardware interface 806. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 808 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 818 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 808, the accesses result in execution of virtualization-layer code to simulate or emulate the privileged resources. The virtualization layer additionally includes a kernel module 820 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 8B illustrates a second type of virtualization. In FIG. 813, the computer system 840 includes the same hardware layer 842 and operating-system layer 844 as the hardware layer 702 and operating-system layer 704 shown in FIG. 7. Several application programs 846 and 848 are shown running in the execution environment provided by the operating system. In addition, a virtualization layer 850 is also provided, in computer 840, but, unlike the virtualization layer 804 discussed with reference to FIG. 8A, virtualization layer 850 is layered above the operating system 844, referred to as the "host OS," and uses the operating system interface to access operating-system-provided functionality as well as the hardware. The virtualization layer 850 comprises primarily a VMM and a hardware-like interface 852, similar to hardware-like interface 808 in FIG. 8A. The virtualization-layer/hardware-layer interface 852, equivalent to interface 716 in FIG. 7, provides an execution environment for a number of virtual machines 856-858, each including one or more application programs or other higher-level computational entities packaged together with a guest operating system.

Figure 8C:
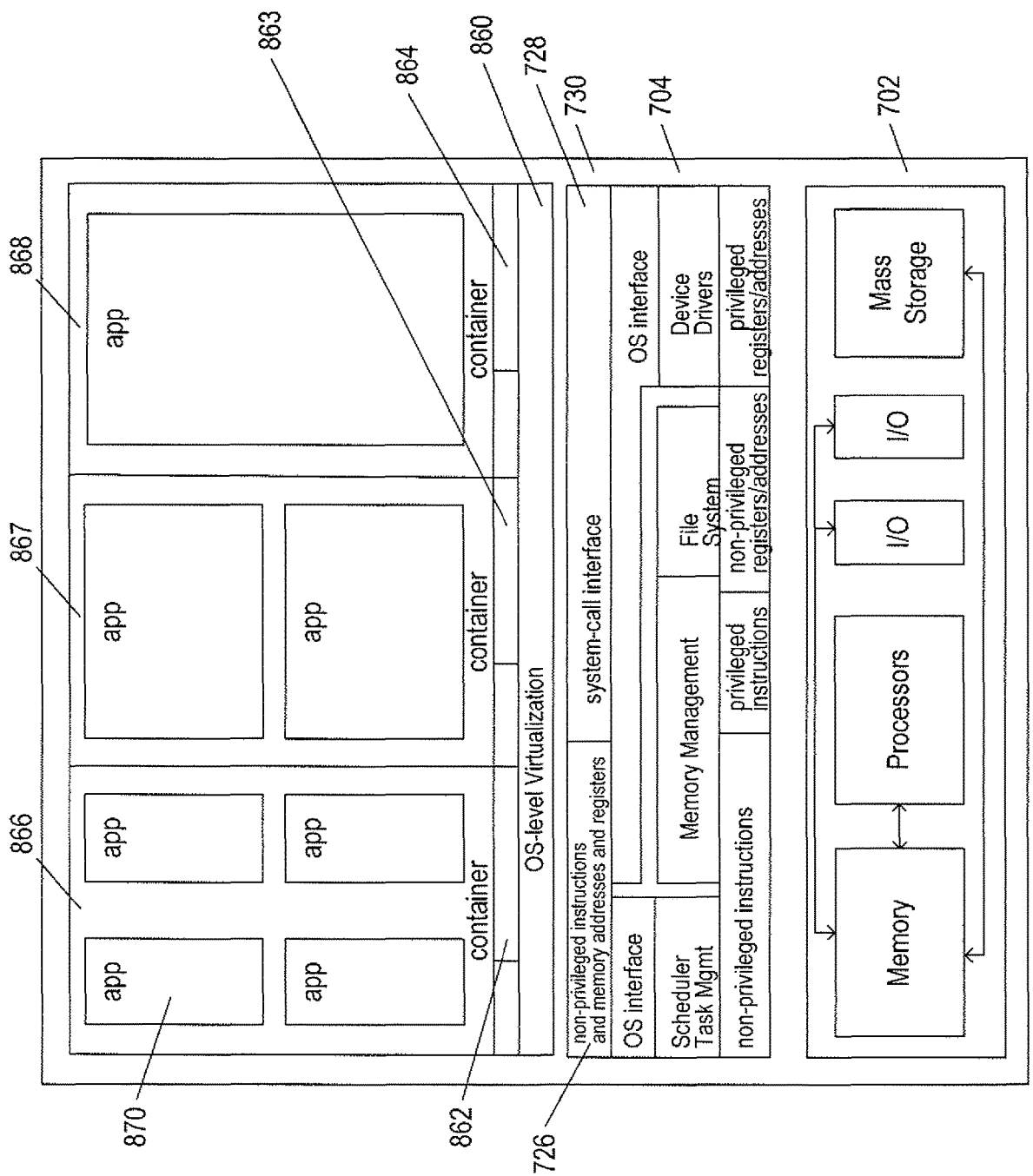

While the traditional virtual-machine-based virtualization layers, described in the previous subsection, have enjoyed widespread adoption and use in a variety of different environments, from personal computers to enormous distributed computing systems, traditional virtualization technologies are associated with computational overheads. While these computational overheads have been steadily decreased, over the years, and often represent ten percent or less of the total computational bandwidth consumed by an application running in a virtualized environment, traditional virtualization technologies nonetheless involve computational costs in return for the power and flexibility that they provide. Another approach to virtualization is referred to as operating-system-level virtualization ("OSL virtualization"). FIG. 8C illustrates the OSL-virtualization approach. In FIG. 8C, as in previously discussed FIG. 7, an operating system 704 runs above the hardware 702 of a host computer. The operating system provides an interface for higher-level computational entities, the interface including a system-call interface 728 and exposure to the non-privileged instructions and memory addresses and registers 726 of the hardware layer 702. However, unlike in FIG. 8A, rather than applications running directly above the operating system, OSL virtualization involves an OS-level virtualization layer 860 that provides an operating-system interface 862-864 to each of one or more containers 866-868. The containers, in turn, provide an execution environment for one or more applications, such as application 870 running within the execution environment provided by container 866. The container can be thought of as a partition of the resources generally available to higher-level computational entities through the operating system interface 730. While a traditional virtualization layer can simulate the hardware interface expected by any of many different operating systems, OSL virtualization essentially provides a secure partition of the execution environment provided by a particular operating system. As one example, OSL virtualization provides a file system to each container, but the file system provided to the container is essentially a view of a partition of the general file system provided by the underlying operating system. In essence, OSL virtualization uses operating-system features, such as name space support, to isolate each container from the remaining containers so that the applications executing within the execution environment provided by a container are isolated from applications executing within the execution environments provided by all other containers. As a result, a container can be booted up much faster than a virtual machine, since the container uses operating-system-kernel features that are already available within the host computer. Furthermore, the containers share computational bandwidth, memory, network bandwidth, and other computational resources provided by the operating system, without resource overhead allocated to virtual machines and virtualization layers. Again, however, OSL virtualization does not provide many desirable features of traditional virtualization. As mentioned above, OSL virtualization does not provide a way to run different types of operating systems for different groups of containers within the same host system, nor does OSL-virtualization provide for live migration of containers between host computers, as does traditional virtualization technologies.

Figure 8D:
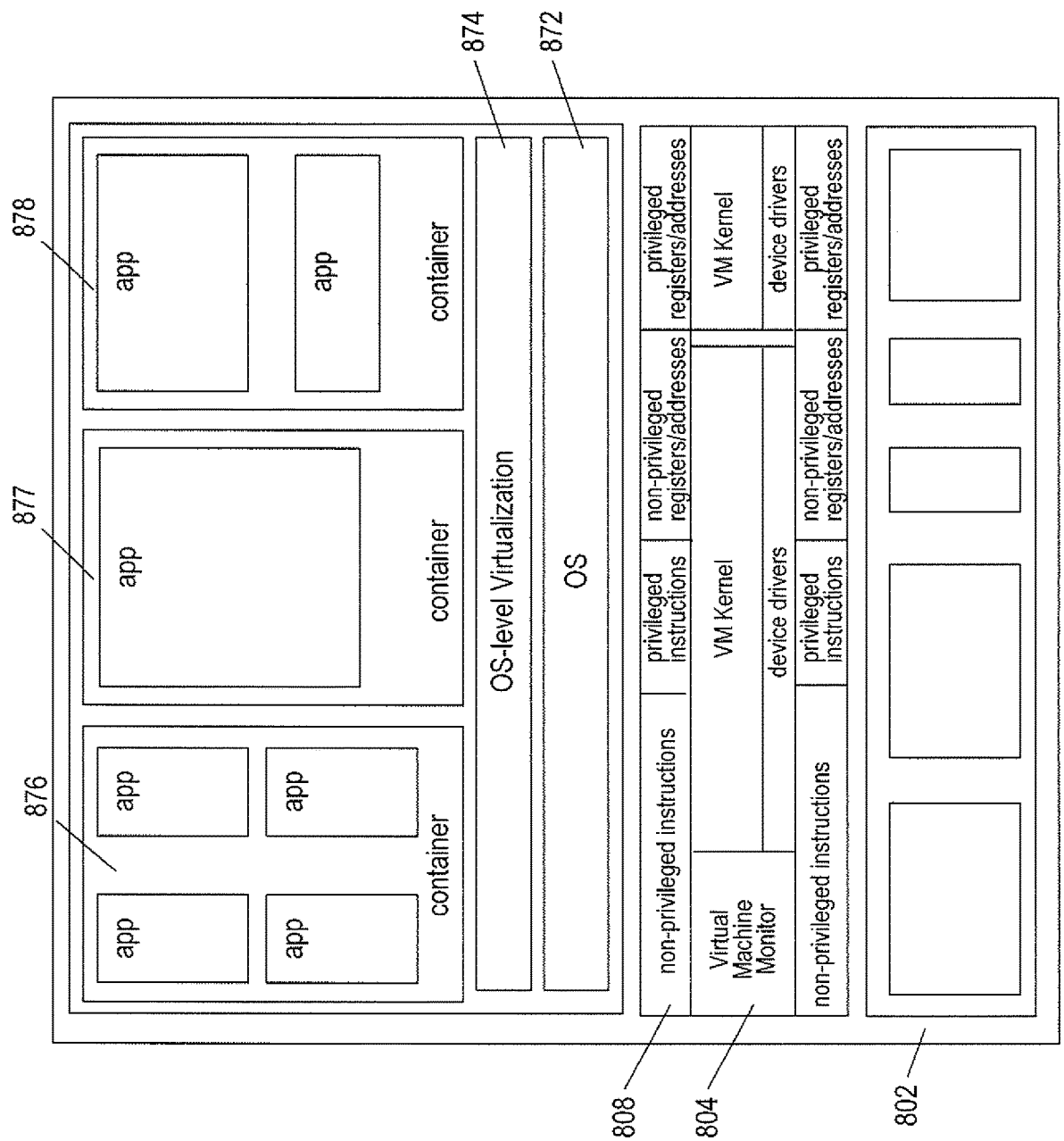

FIG. 8D illustrates an approach to combining the power and flexibility of traditional virtualization with the advantages of OSL virtualization. FIG. 8D shows a host computer similar to that shown in FIG. 8A, discussed above. The host computer includes a hardware layer 802 and a virtualization layer 804 that provides a simulated hardware interface 808 to an operating system 872. Unlike in FIG. 8A, the operating system interfaces to an OSL-virtualization layer 874 that provides container execution environments 876-878 to multiple application programs. Running containers above a guest operating system within a virtualized host computer provides many of the advantages of traditional virtualization and OSL virtualization. Containers can be quickly booted in order to provide additional execution environments and associated resources to new applications. The resources available to the guest operating system are efficiently partitioned among the containers provided by the OSL-virtualization layer 874. Many of the powerful and flexible features of the traditional virtualization technology can be applied to containers running above guest operating systems including live migration from one host computer to another, various types of high-availability and distributed resource sharing, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtualization layer provides flexible and easy scaling and a simple approach to operating-system upgrades and patches. Thus, the use of OSL virtualization above traditional virtualization, as illustrated in FIG. 8D, provides much of the advantages of both a traditional virtualization layer and the advantages of OSL virtualization. Note that, although only a single guest operating system and OSL virtualization layer as shown in FIG. 8D, a single virtualized host system can run multiple different guest operating systems within multiple virtual machines, each of which supports one or more containers.

In FIGS. 8A-D, the layers are somewhat simplified for clarity of illustration. For example, portions of the virtualization layer 850 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 9:
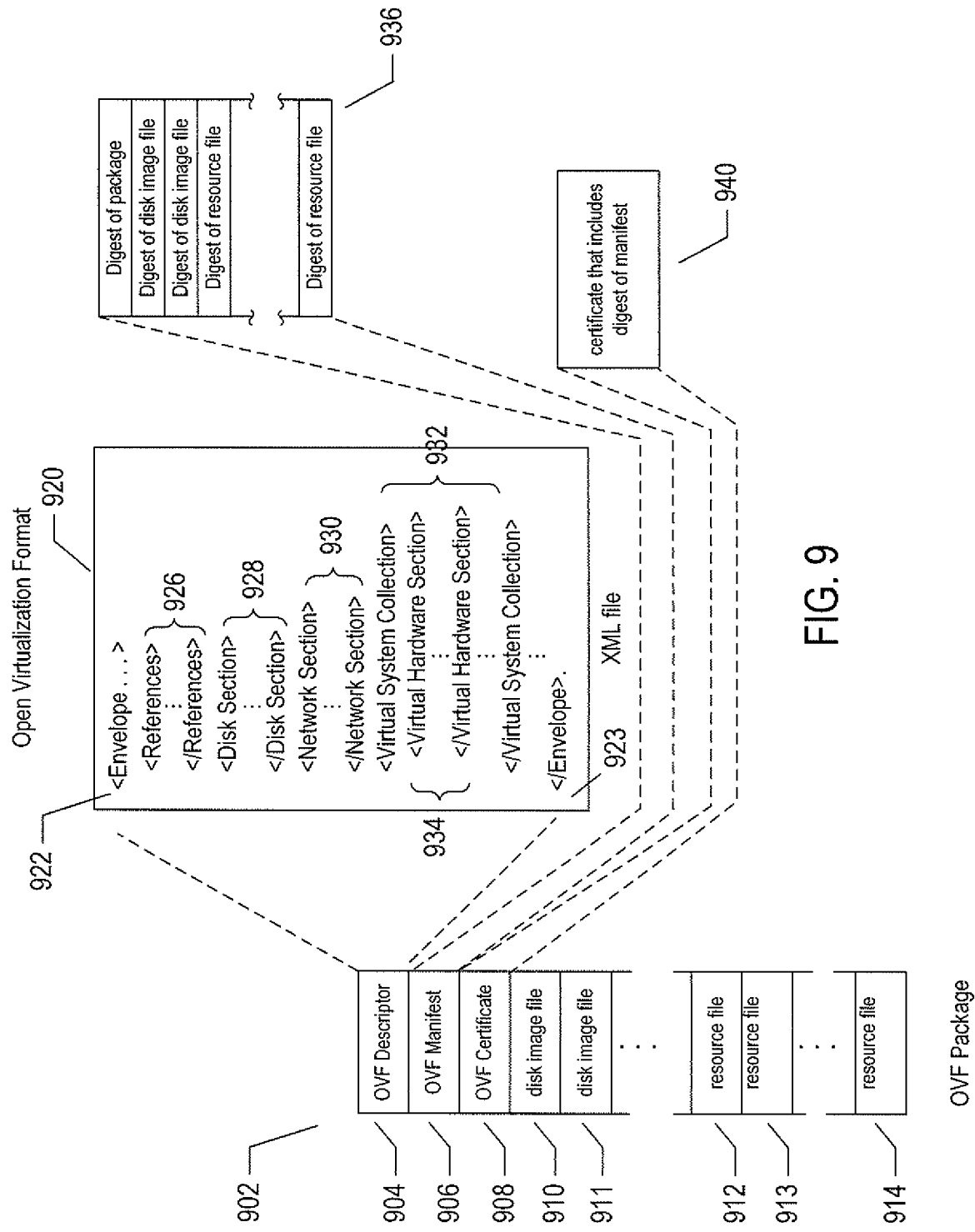
FIG. 9 illustrates an OVF package.

A virtual machine or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a virtual machine within one or more data files. FIG. 9 illustrates an OVF package. An OVF package 902 includes an OVF descriptor 904, an OVF manifest 906, an OVF certificate 908, one or more disk-image files 910-911, and one or more resource files 912-914. The OVF package can be encoded and stored as a single file or as a set of files. The OVF descriptor 904 is an XML document 920 that includes a hierarchical set of elements, each demarcated by a beginning tag and an ending tag. The outermost, or highest-level, element is the envelope element, demarcated by tags 922 and 923. The next-level element includes a reference element 926 that includes references to all files that are part of the OVF package, a disk section 928 that contains meta information about all of the virtual disks included in the OVF package, a networks section 930 that includes meta information about all of the logical networks included in the OVF package, and a collection of virtual-machine configurations 932 which further includes hardware descriptions of each virtual machine 934. There are many additional hierarchical levels and elements within a typical OVF descriptor. The OVF descriptor is thus a self-describing XML file that describes the contents of an OVF package. The OVF manifest 906 is a list of cryptographic-hash-function-generated digests 936 of the entire OVF package and of the various components of the OVF package. The OVF certificate 908 is an authentication certificate 940 that includes a digest of the manifest and that is cryptographically signed. Disk image files, such as disk image file 910, are digital encodings of the contents of virtual disks and resource files 912 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 10:
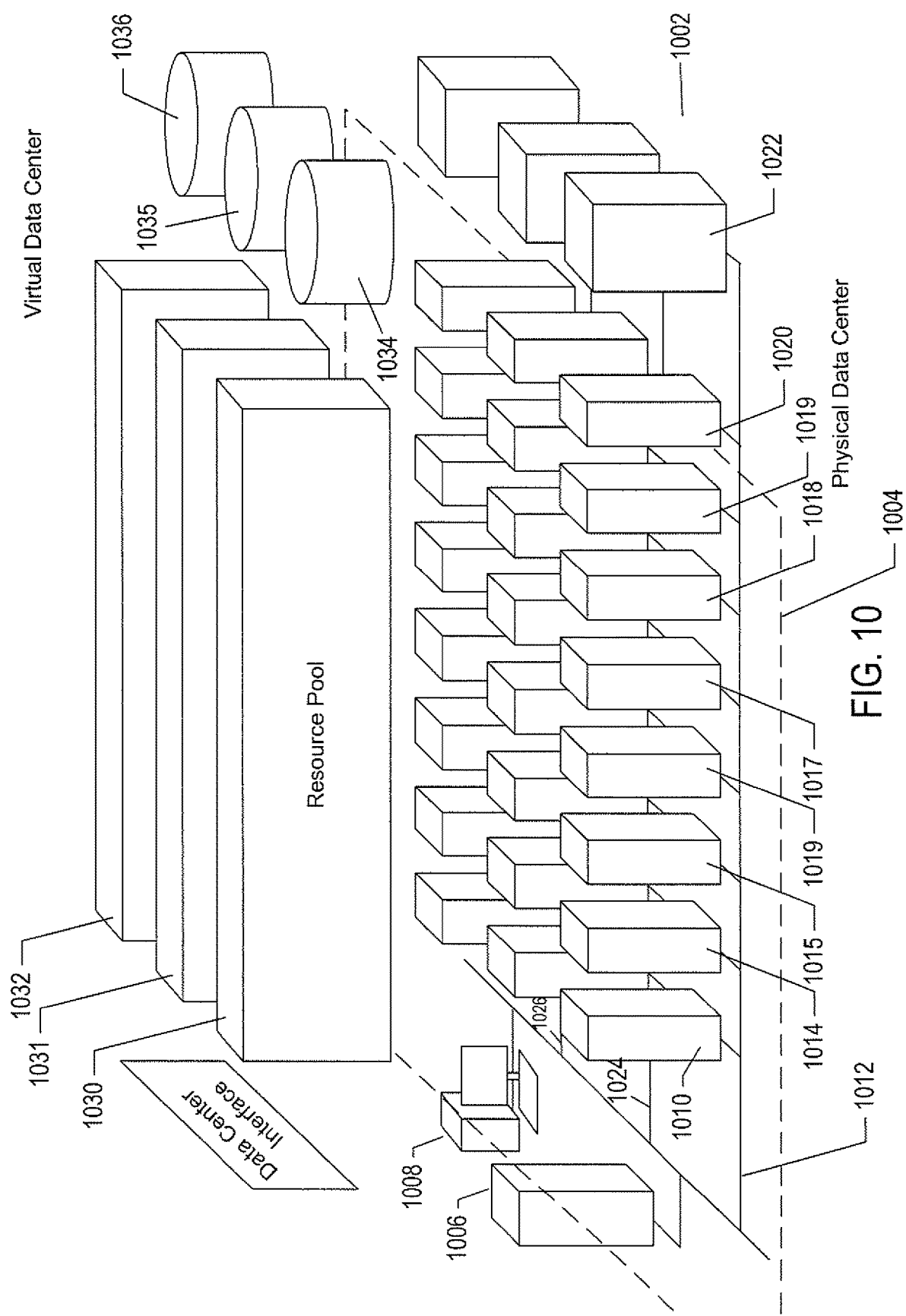
FIG. 10 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers running on many different types of computer hardware. A next level of abstraction, referred to as virtual data centers which are one example of a broader virtual-infrastructure category, provide a data-center interface to virtual data centers computationally constructed within physical data centers. FIG. 10 illustrates virtual data centers provided as an abstraction of underlying physical-data-center hardware components. In FIG. 10, a physical data center 1002 is shown below a virtual-interface plane 1004. The physical data center consists of a virtual-infrastructure management server ("VI-management-server") 1006 and any of various different computers, such as PCs 1008, on which a virtual-data-c enter management interface may be displayed to system administrators and other users. The physical data center additionally includes generally large numbers of server computers, such as server computer 1010, that are coupled together by local area networks, such as local area network 1012 that directly interconnects server computer 1010 and 1014-1020 and a mass-storage array 1022. The physical data center shown in FIG. 10 includes three local area networks 1012, 1024, and 1026 that each directly interconnects a bank of eight servers and a mass-storage array. The individual server computers, such as server computer 1010, each includes a virtualization layer and runs multiple virtual machines. Different physical data centers may include many different types of computers, networks, data-storage systems and devices connected according to many different types of connection topologies. The virtual-data-center abstraction layer 1004, a logical abstraction layer shown by a plane in FIG. 10, abstracts the physical data center to a virtual data center comprising one or more resource pools, such as resource pools 1030-1032, one or more virtual data stores, such as virtual data stores 1034-1036, and one or more virtual networks. In certain implementations, the resource pools abstract banks of physical servers directly interconnected by a local area network.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the VI-management-server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability.

Figure 11:
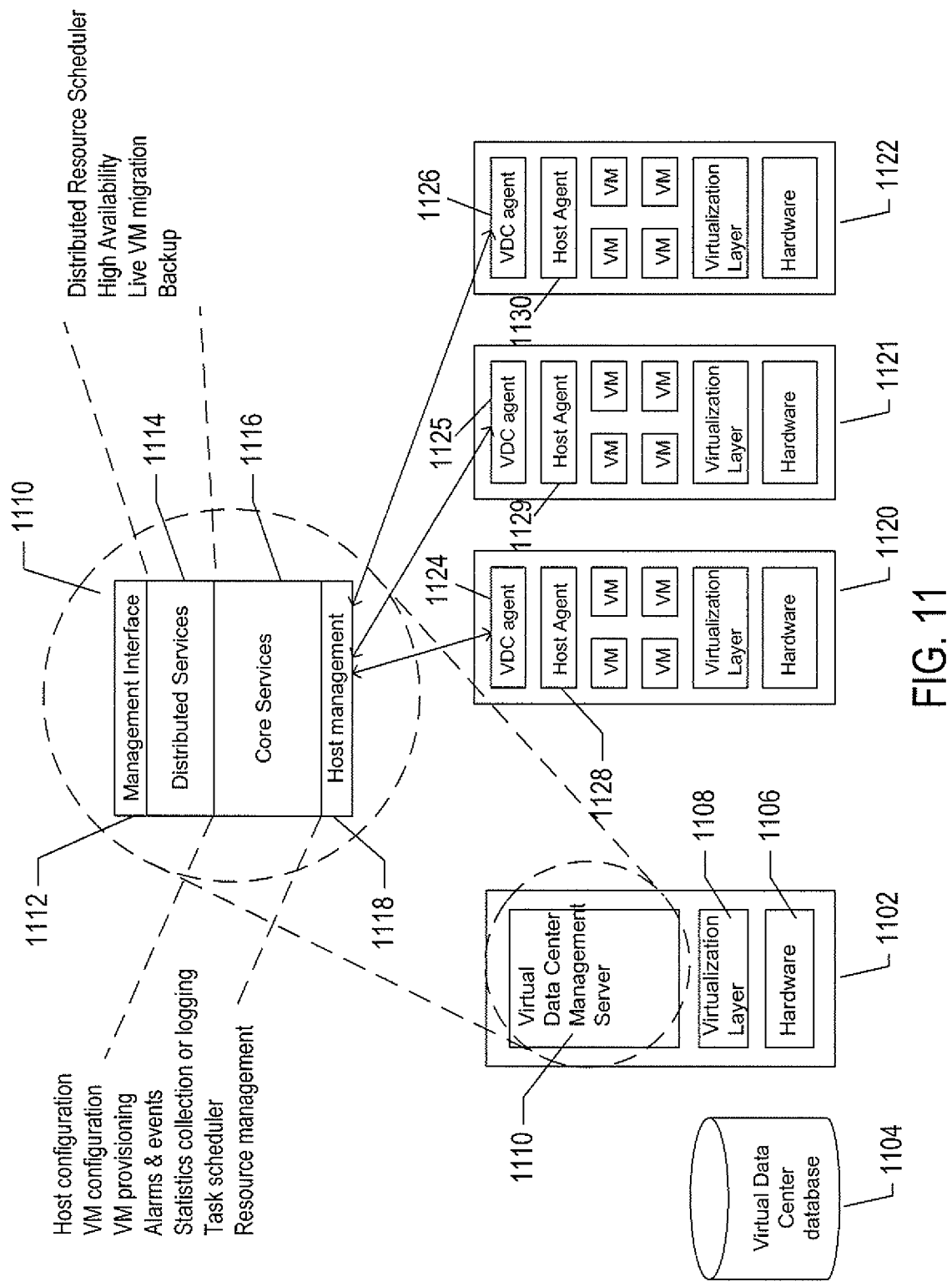
FIG. 11 illustrates virtual-machine components of a VI-management-server and physical servers of a physical data center above which a virtual-data-center interface is provided by the VI-management server.

FIG. 11 illustrates virtual-machine components of a VI-management-server and physical servers of a physical data center above which a virtual-data-center interface is provided by the VI-management-server. The VI-management-server 1102 and a virtual-data-center database 1104 comprise the physical components of the management component of the virtual data center. The VI-management-server 1102 includes a hardware layer 1106 and virtualization layer 1108, and runs a virtual-data-center management-server virtual machine 1110 above the virtualization layer. Although shown as a single server in FIG. 11, the VI-management-server ("VI management server") may include two or more physical server computers that support multiple VI-management-server virtual appliances. The virtual machine 1110 includes a management-interface component 1112, distributed services 1114, core services 1116, and a host-management interface 1118. The management interface is accessed from any of various computers, such as the PC 1008 shown in FIG. 10. The management interface allows the virtual-data-center administrator to configure a virtual data center, provision virtual machines, collect statistics and view log files for the virtual data center, and to carry out other, similar management tasks. The host-management interface 1118 interfaces to virtual-data-center agents 1124, 1125, and 1126 that execute as virtual machines within each of the physical servers of the physical data center that is abstracted to a virtual data center by the VI management server.

The distributed services 1114 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an OVF package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VI management server include host configuration, virtual-machine configuration, virtual-machine provisioning, generation of virtual-data-center alarms and events, ongoing event logging and statistics collection, a task scheduler, and a resource-management module. Each physical server 1120-1122 also includes a host-agent virtual machine 1128-1130 through which the virtualization layer can be accessed via a virtual-infrastructure application programming interface ("API"). This interface allows a remote administrator or user to manage an individual server through the infrastructure API. The virtual-data-center agents 1124-1126 access virtualization-layer server information through the host agents. The virtual-data-center agents are primarily responsible for offloading certain of the virtual-data-center management-server functions specific to a particular physical server to that physical server. The virtual-data-center agents relay and enforce resource allocations made by the VI management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions virtual data centers ("VDCs") into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (608 in FIG.

6) exposes a virtual-data-center management interface that abstracts the physical data center.

Figure 12:
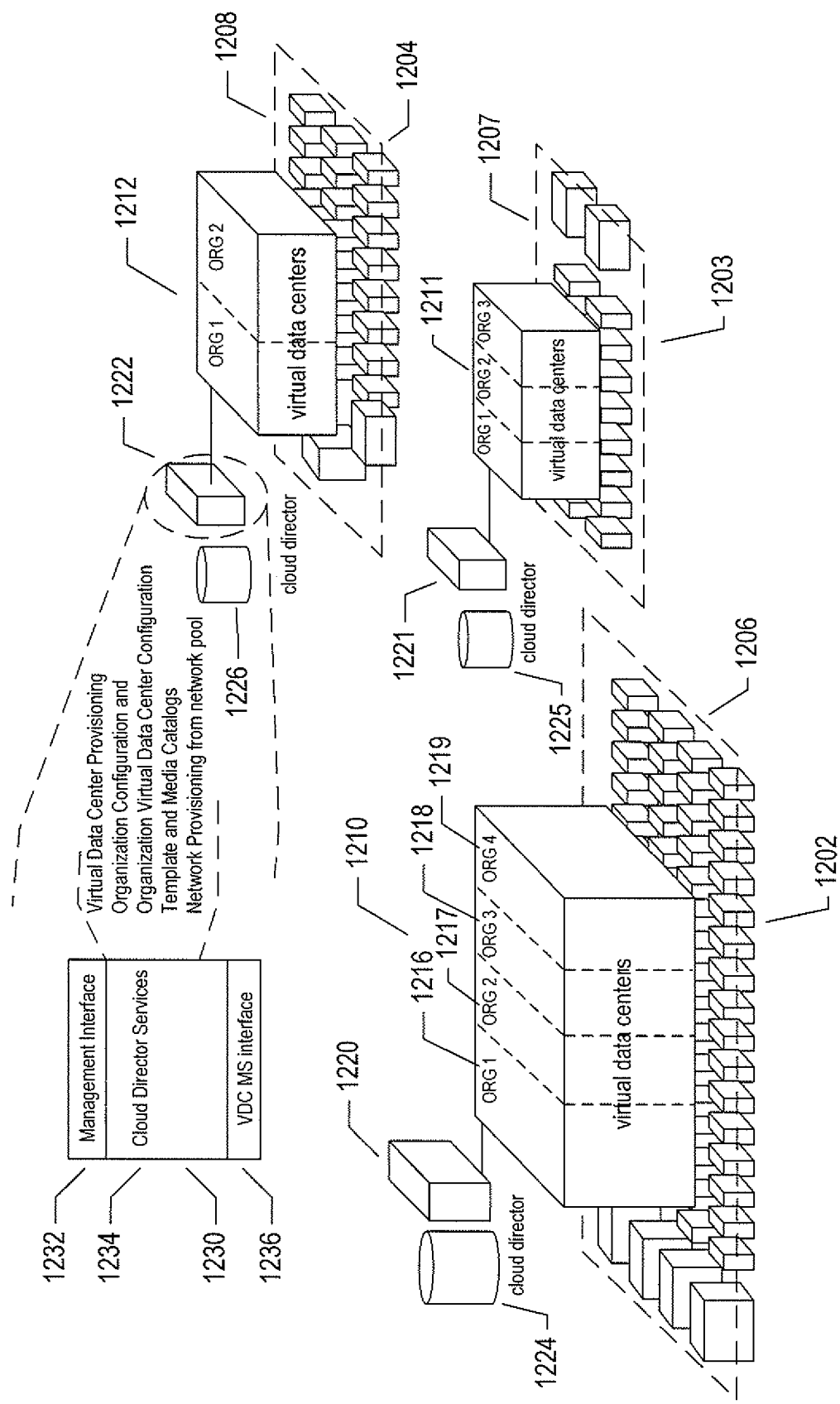
FIG. 12 illustrates a cloud-director level of abstraction.

FIG. 12 illustrates a cloud-director level of abstraction. In FIG. 12, three different physical data centers 1202-1204 are shown below planes representing the cloud-director layer of abstraction 1206-1208. Above the planes representing the cloud-director level of abstraction, multi-tenant virtual data centers 1210-1212 are shown. The resources of these multi-tenant virtual data centers are securely partitioned in order to provide secure virtual data centers to multiple tenants, or cloud-services-accessing organizations. For example, a cloud-services-provider virtual data center 1210 is partitioned into four different tenant-associated virtual-data centers within a multi-tenant virtual data center for four different tenants 1216-1219. Each multi-tenant virtual data center is managed by a cloud director comprising one or more cloud-director servers 1220-1222 and associated cloud-director databases 1224-1226. Each cloud-director server or servers runs a cloud-director virtual appliance 1230 that includes a cloud-director management interface 1232, a set of cloud-director services 1234, and a virtual-data-center management-server interface 1236. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 10 and 12, the VI management server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 13:
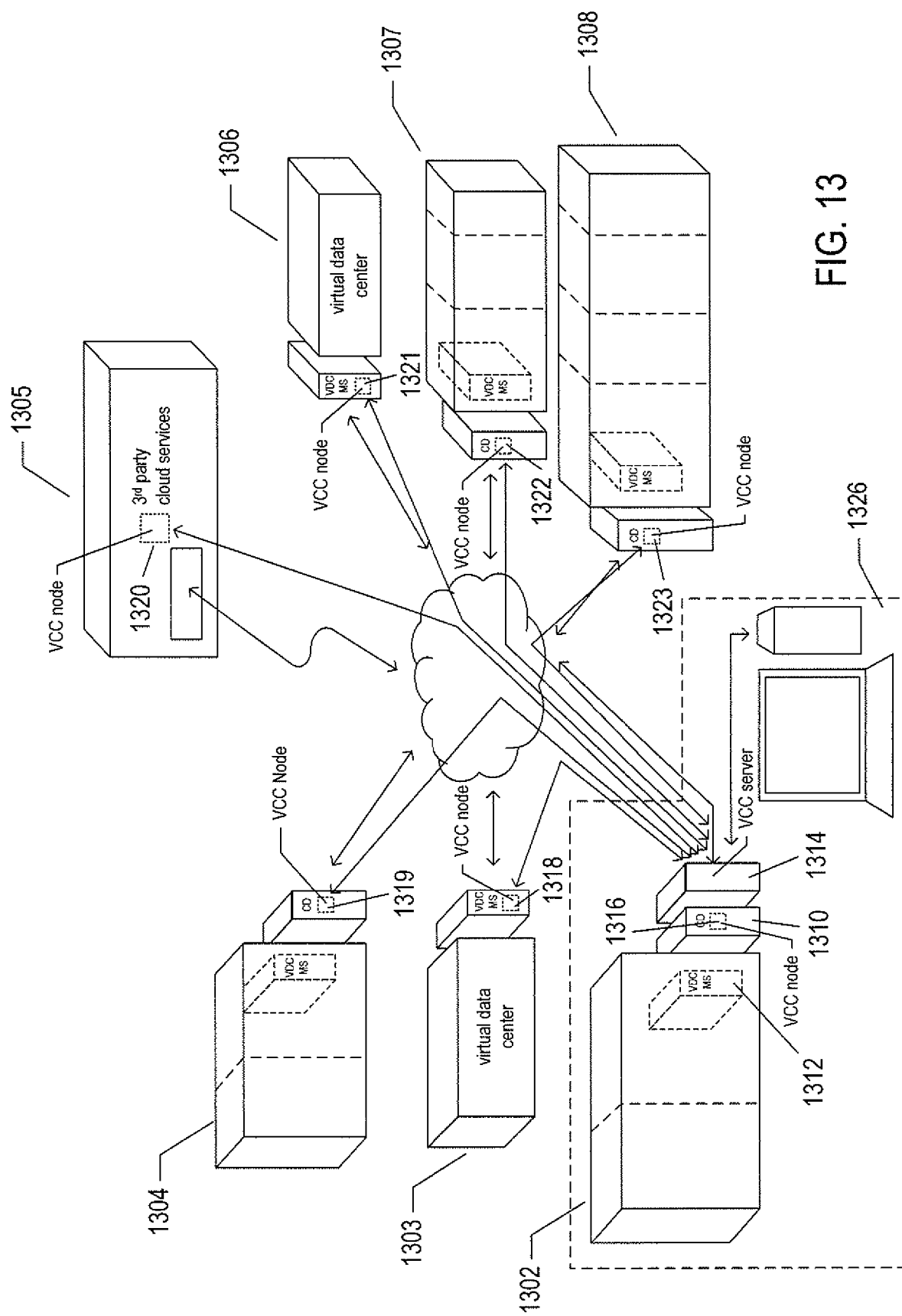
FIG. 13 illustrates virtual-cloud-connector nodes ("VCC nodes") and a VCC server, components of a distributed system that provide multi-cloud aggregation and that include a cloud-connector server and cloud-connector nodes that cooperate to provide services that are distributed across multiple clouds.

FIG. 13 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 13, seven different cloud-computing facilities are illustrated 1302-1308. Cloud-computing facility 1302 is a private multi-tenant cloud with a cloud director 1310 that interfaces to a VI management server 1312 to provide a multi-tenant private cloud comprising multiple tenant-associated virtual data centers. The remaining cloud-computing facilities 1303-1308 may be either public or private cloud-computing facilities and may be single-tenant virtual data centers, such as virtual data centers 1303 and 1306, multi-tenant virtual data centers, such as multi-tenant virtual data centers 1304 and 1307-1308, or any of various different kinds of third-party cloud-services facilities, such as third-party cloud-services facility 1305. An additional component, the VCC server 1314, acting as a controller is included in the private cloud-computing facility 1302 and interfaces to a VCC node 1316 that runs as a virtual appliance within the cloud director 1310. A VCC server may also run as a virtual appliance within a VI management server that manages a single-tenant private cloud. The VCC server 1314 additionally interfaces, through the Internet, to VCC node virtual appliances executing within remote VI management servers, remote cloud directors, or within the third-party cloud services 1318-1323. The VCC server provides a VCC server interface that can be displayed on a local or remote terminal, PC, or other computer system 1326 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Frequency-Domain-Analysis Methods And Systems to Which the Current Document is Directed As mentioned above, the current document is directed to methods and systems for frequency-domain analysis of operational and performance metrics that accumulate within a computer system over time. In general, frequency-domain analysis may be undertaken on any computed quantity or observed quantity, the current value of which is repeatedly sampled, over time, within the distributed computing system and that is reflective of the operational state, performance, behavior, and/or operational characteristics of the computer system. In the following discussion, these computed and/or observed quantities, useful for a wide variety of system administration and management tasks and operations, are referred to as "metrics." A time sequence of samples, or current values, of a metric are referred to as "metric values." Frequency-domain analysis reveals patterns, periodicities, and other information within the data set that provide a basis for a wide variety of administrative and management tasks and operations. These range from identifying current workloads, discovering various types of relationships between components and computational resources within a distributed computing system, identifying opportunities for tuning and increasing the performance of a distributed computing system, identifying and ameliorating anomalies, problems, and other undesirable conditions and component behaviors, and planning for upgrades and enhancements to meet well-defined performance goals. These are but a few examples of the many uses that can be made, by automated and semi-automated administrative and management components of a computer system, of the results of frequency-domain analysis.

Figure 14A:
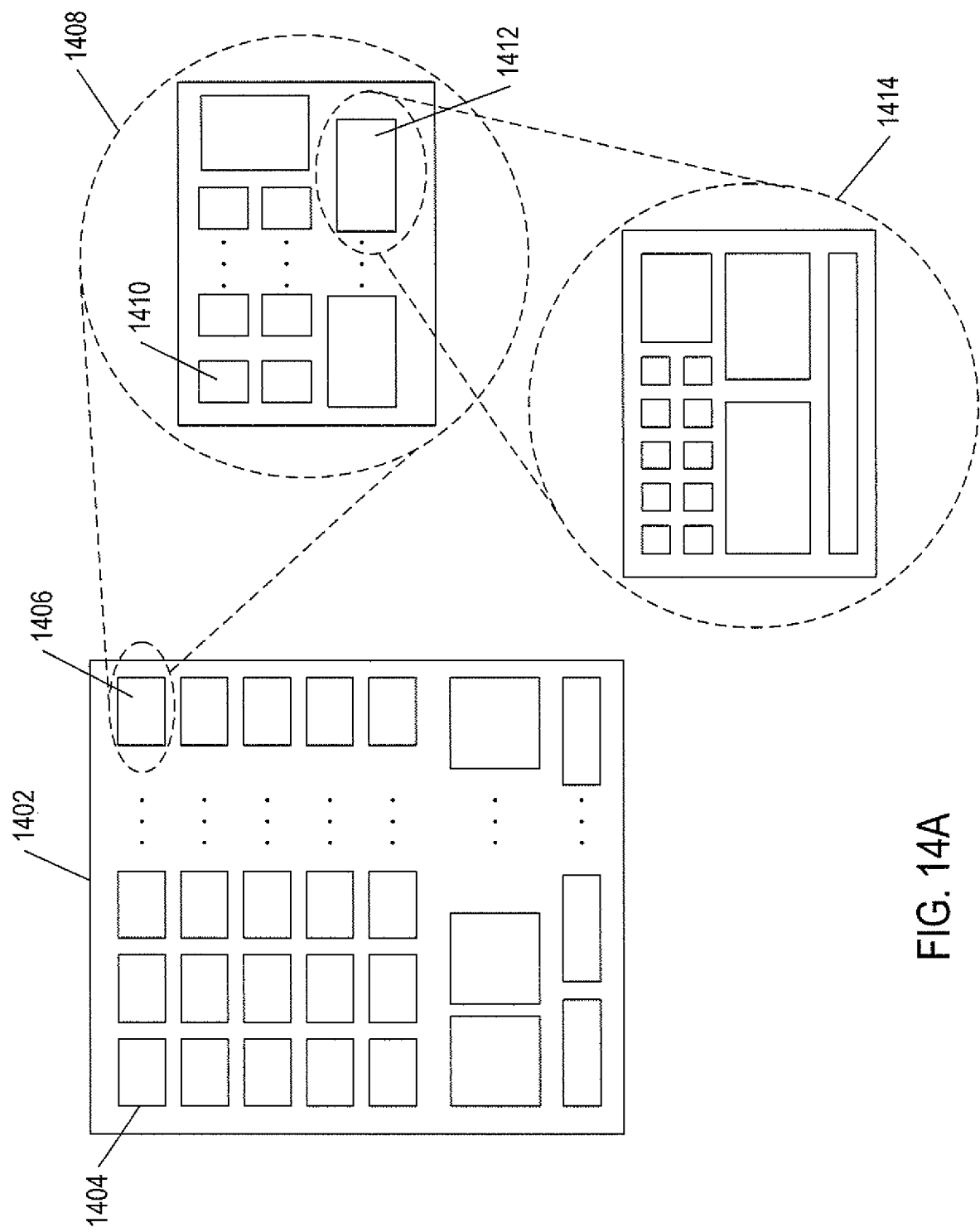

FIGS. 14A-H illustrate metric-value data sets and generation of metric surfaces in frequency-time-amplitude space. FIG. 14A illustrates an abstract conceptualization of a complex system, such as a distributed computing system or virtualized data center. As shown in FIG. 14A, the system, represented by rectangle 1402, generally includes a large number of different types of components. The components of system 1402 are represented by rectangles of various sizes and shapes, such as rectangle 1404. As one example, the system 1402 may be a data center and small rectangles, such as rectangle 1404, may be servers. On the other hand, the system 1402 may be a very large distributed computing system and the smaller rectangles, such as rectangle 1404, may be data centers located in different geographic locations. Whatever system rectangle 1402 describes, and whatever the highest-level internal components of the system, those components are generally themselves complex systems that include many internal components. Thus, as shown in FIG. 14A, system component 1406, when viewed at a greater level of detail, as shown in inset 1408, includes many different internal components, such as internal component 1410. As one example, if component 1406 is a server within a data center, then internal component 1410 may be a multi-processor chip set and motherboard. Alternatively, component 1410 may be one core of a multi processor. Of course, the internal components of component 1406, such as internal component 1412, may also be made up of many subcomponents, as shown by inset 1414. This hierarchical nesting of components, subcomponents, and lower levels of subcomponents may involve many tens of hierarchical layers, and span huge, geographically distributed computing systems down to individual blocks of stored data and even executable routines and network packets. As mentioned above, not only do the components of a complex system span many orders of magnitude in size, complexity, and behavioral characteristics, but may show time-dependent operational characteristics and behaviors that span many different orders of time periods. A complex distributed computing system may literally have billions, tens of billions, or more components each characterized by multiple sets of metric vales generated by sampling at a variety of different time intervals, from millisecond and even sub-millisecond time intervals to seconds, hours, days, and even longer time intervals. As a result, the amount and complexity of the metric-value data sets, including performance data, operational data, and other data accumulated within large distributed computing systems, may vastly exceed the amount of data that can be processed and used for administration and management purposes by even fully automated management and administrative control components of distributed computing systems.

Figure 14B:
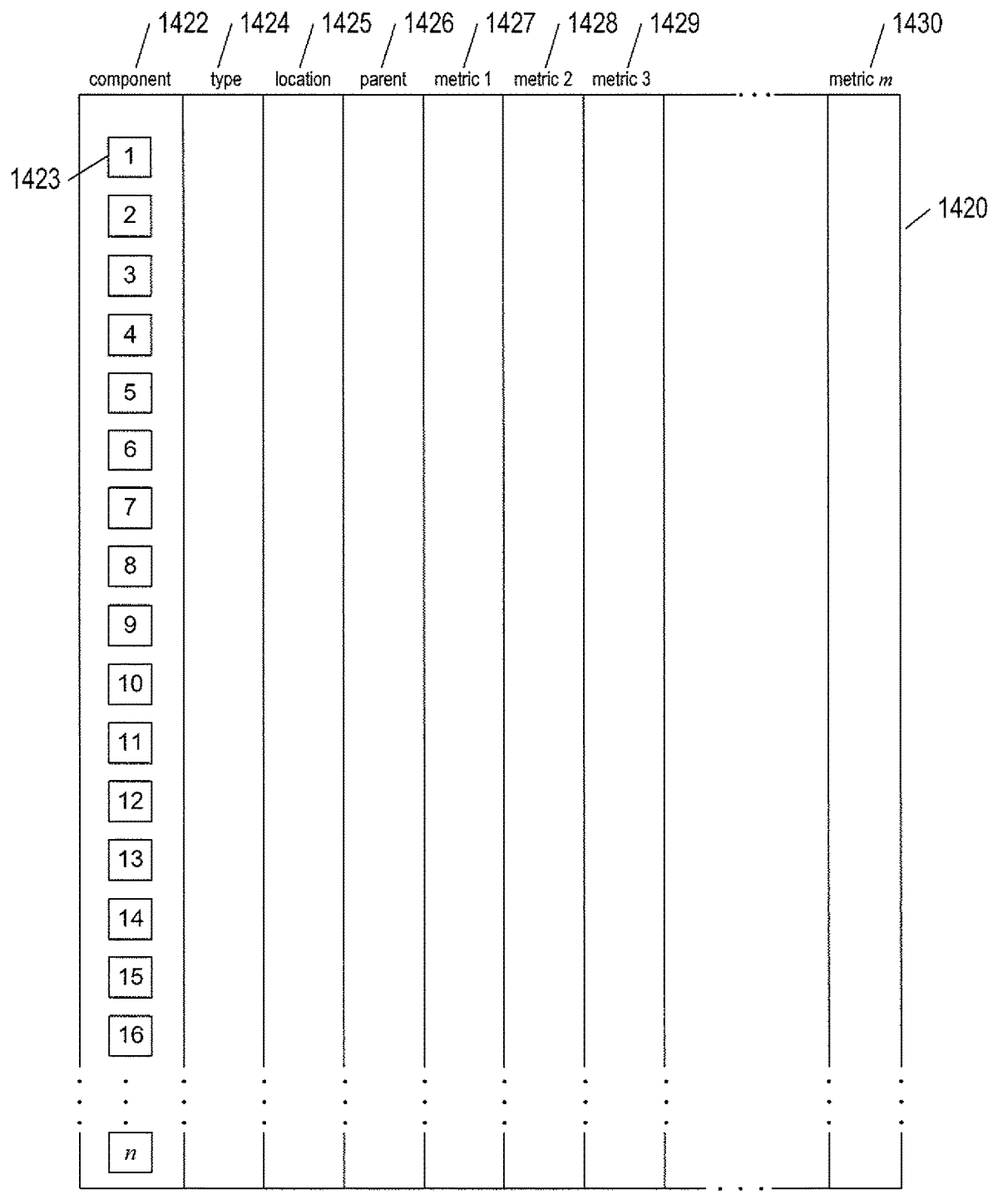

FIG. 14B illustrates a generalized data set generated within a distributed computing system. The data set is generalized as a two-dimensional table 1420 in which each row corresponds to a component at one of the various hierarchical component levels within a computing system and each column represents a field within a data record corresponding to the component. Note that the actual data for the field values and rows is not shown in FIG. 14B, but that FIG. 14B indicates only how the data is organized. The first column 1422 includes a unique identifier for the component. In FIG. 14B, this identifier is represented by a number contained within a rectangle, such as rectangle 1423. In an actual data set, the identifier may be an alphanumeric string, multiple alphanumeric strings, a path name, or other types of identifiers that can be uniquely assigned to each of the components and subcomponents in the many different hierarchical levels of a computer system. A second field 1424 includes an indication of the type of the component. A third field 1425 includes an indication of the location of the component within the computer system. The location may be a complex, multi-field value in the case of a distributed computer system. A fourth field 1426 indicates the parent component of the component, such as a higher-hierarchical-level component within which the component is a subcomponent. Finally, there are numerous fields 1427-1430, each of which stores sampled metric data for each of numerous different metrics. Certain of the metrics may be specific to certain component types, while other metrics may more broadly apply to multiple different types of components. In an actual data set, each component would likely reference a linked list of metric data for each of the metrics relevant to the component, since a table representation would be unwieldy and inefficient and since a given component would likely be characterized by only a tiny fraction of the many types of metrics employed for the system, as a whole. In the more abstract case shown in FIG. 14B, the value for a metric field for a metric not relevant to a particular component is blank. Thus, the two-dimensional representation shown in FIG. 14B would be sparse, since only a few metrics are likely to be relevant to any particular component. It should be noted that components may include any of the many different components of a standalone computer system, data center, geographically dispersed distributed computer system, or other types of systems discussed in the preceding subsection, or components and subcomponents of these components. Components may also be abstractions that represent metrics that involve averages or other aggregations over multiple components.

Figure 14D:
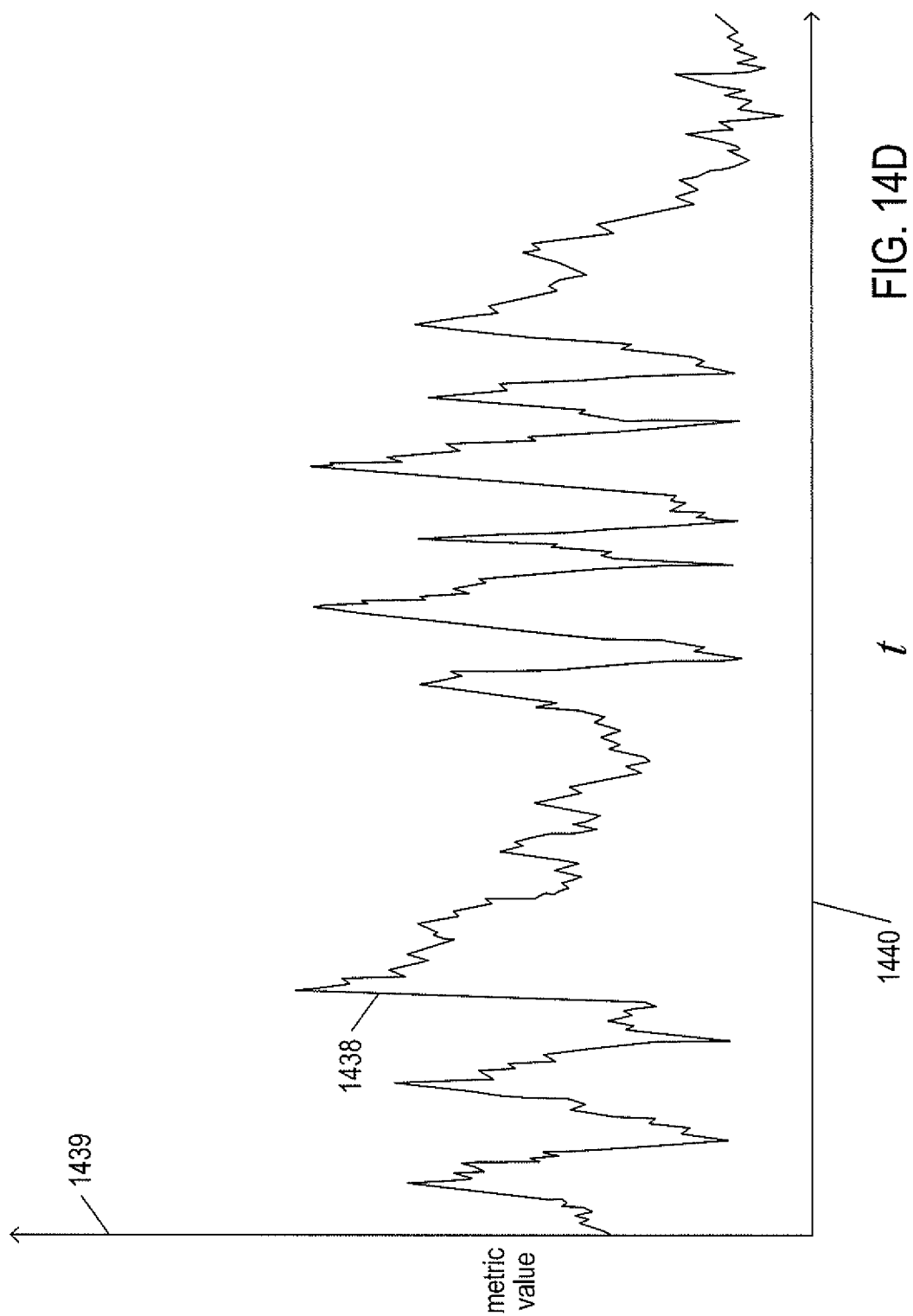

FIG. 14C illustrates sampled data, collected over time, for a particular metric. As shown in FIG. 14C, a plot of the sampled data is discrete, with the value of the metric, plotted with respect to the vertical axis 1434, and each sample plotted with respect to both the vertical 1434 and the time 1436 axes. Although metric values are sampled in time, and the metric-value data sets are discrete, they are often depicted as continuous functions, which can be generated from sample data by various types of interpolation, including linear interpolation, spline interpolation, quadratic interpolation, and other types of interpolation that fit continuous curves to discrete sampled data. FIG. 14D shows a continuous representation of a metric value where a continuous curve 1438 is plotted with respect to the vertical metric-value axis 1439 and the horizontal time axis 1440.

One implementation of the methods and systems to which the current document is directed generates metric surfaces for the sampled metric values for all or a subset of the metrics with respect to which values are collected and stored, over time, within a computer system. It should be noted that certain metrics, including high-level performance and capacity metrics, may be representative of an entire distributed computing system, as a whole. These types of metrics would be associated, in the two-dimensional representation shown in FIG. 14B, with a highest-level component corresponding to the distributed computing system. Other metrics may be averaged values representative of the characteristics of particular types of components, such as a metric that represents the average available data-storage capacity of particular types of data-storage devices or components within a distributed computing system. In this case, the sampled metric data would be associated with a collective or aggregate component that represents many data devices or data appliances of the relevant type. More particular metrics may be representative of the operational or performance characteristics of particular components, such as the amount of data transmitted through a particular network-connection device. Thus, sampled data corresponding to the values of metrics over time generally characterizes a wide variety of different types of components and component aggregations that are monitored within a distributed computing system, from metrics related to operational characteristics and performance of the system, as a whole, to metrics that reflect the operational characteristics in performance of very fine-grained, particular subcomponents.

Figure 14E:
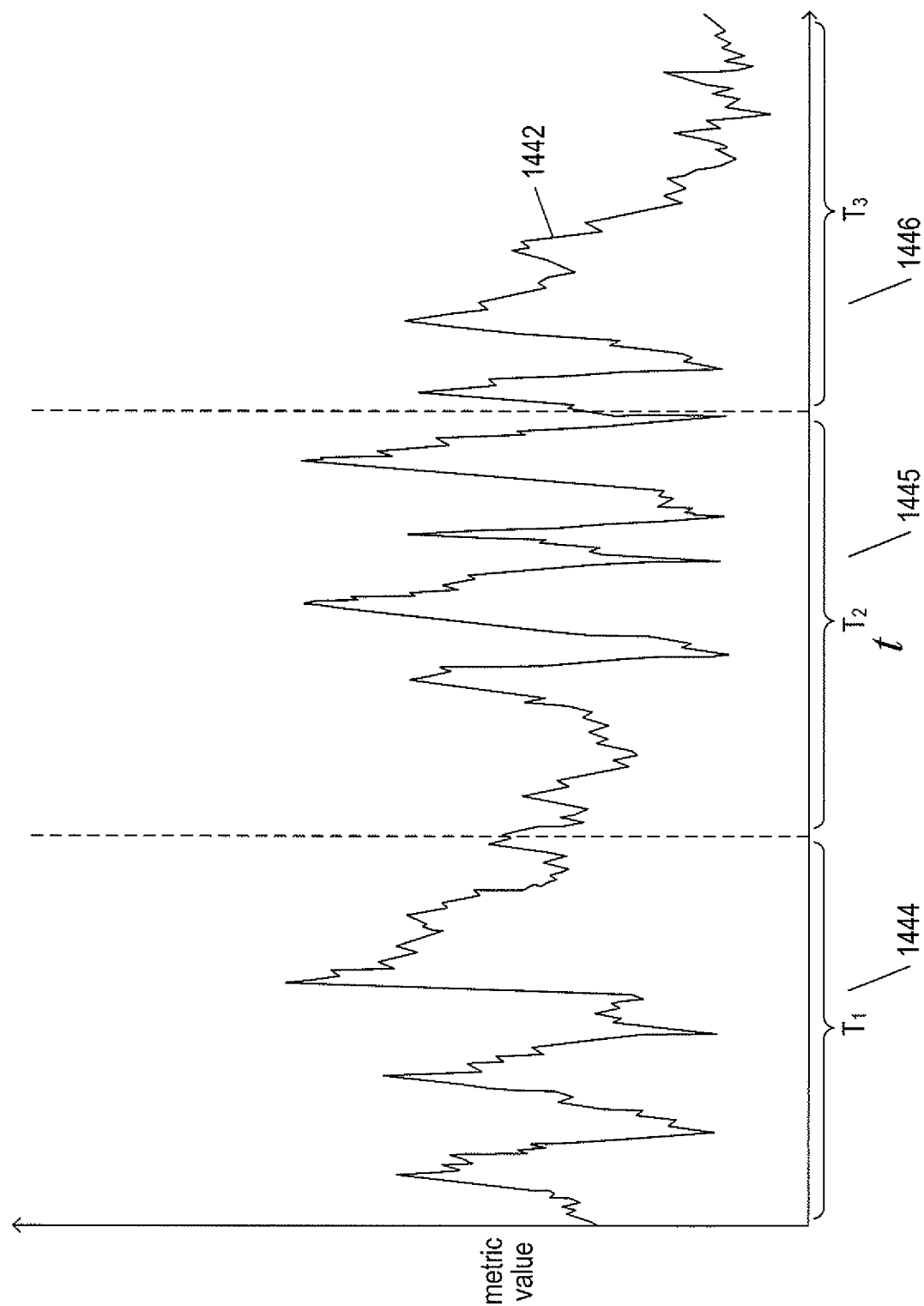
Figure 14F:
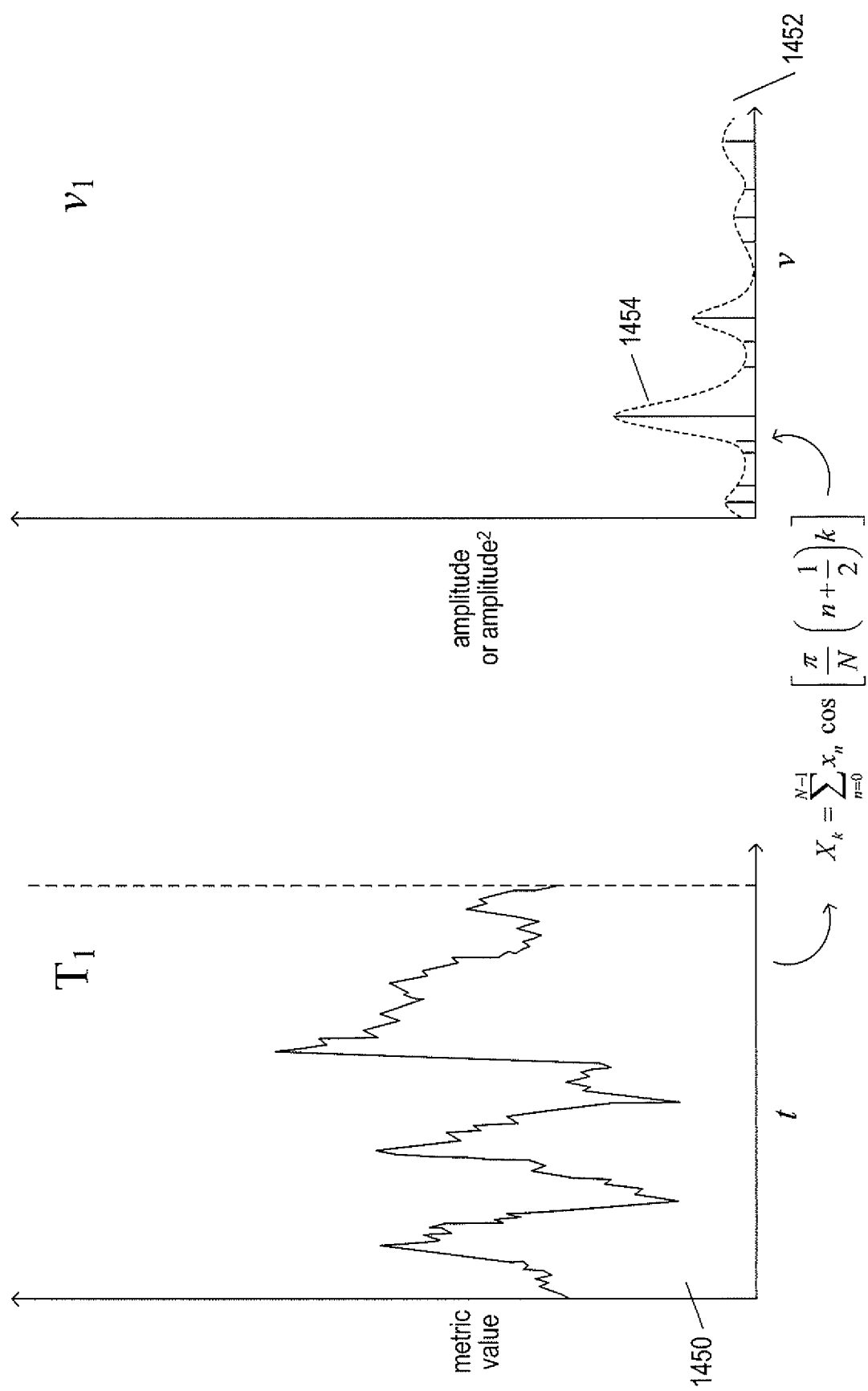

FIG. 14E illustrates a first step in the generation of a metric surface from a data set of metric values sampled over time. As in FIG. 14D, the sampled metric values are represented as a continuous curve 1442 in FIG. 14E. In the first step, the sampled metric data is partitioned into time periods of equal length. For example, in FIG. 14E, the sampled data is partitioned into at least the three time periods $T_1$, $T_2$, and $T_3$ (1444-1446 in FIG. 14E). Next, as shown in FIG. 14F, the time-domain sampled data within each time period is transformed, using a discrete Fourier transform, into corresponding frequency-domain data. For example, in FIG. 14F, the sampled metric-value data for time period $T_1$ 1450 is transformed into a corresponding frequency-domain data 1452. In FIG. 14F, a continuous interpolation of the frequency-domain data is shown by dashed curve 1454. Note that the continuous dashed curve is used, in certain implementations, only for subsequent surface-construction steps, and does not necessarily have any meaning with respect to the metric-values data set or transformed data set. As mentioned above, there are many different, alternative processes, in addition to various types of discrete Fourier transforms, for transforming time-domain data into different domains in which the data is more conducive to the types of analysis needed for system administration and management purposes.

Figure 14G:
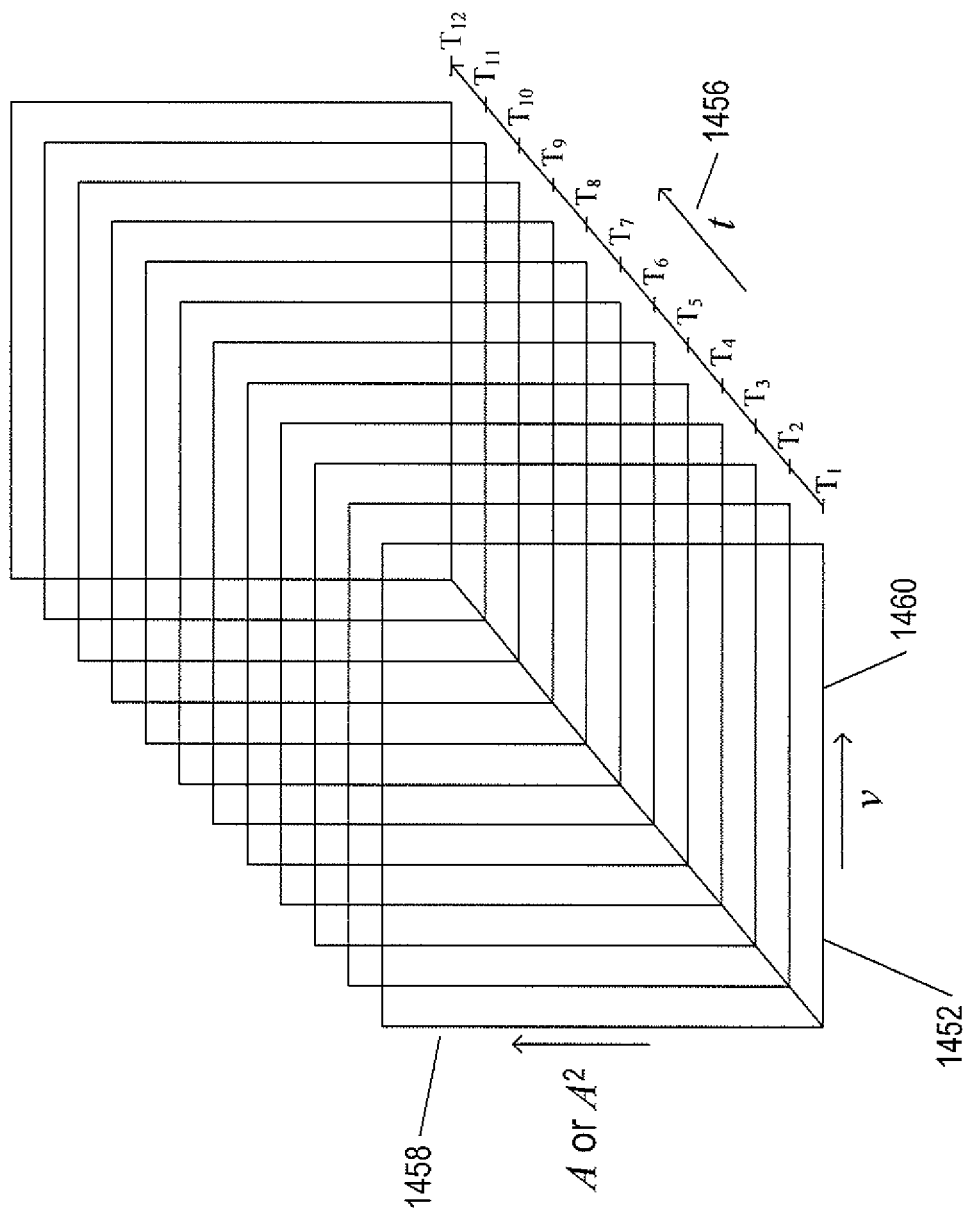
Figure 14H:
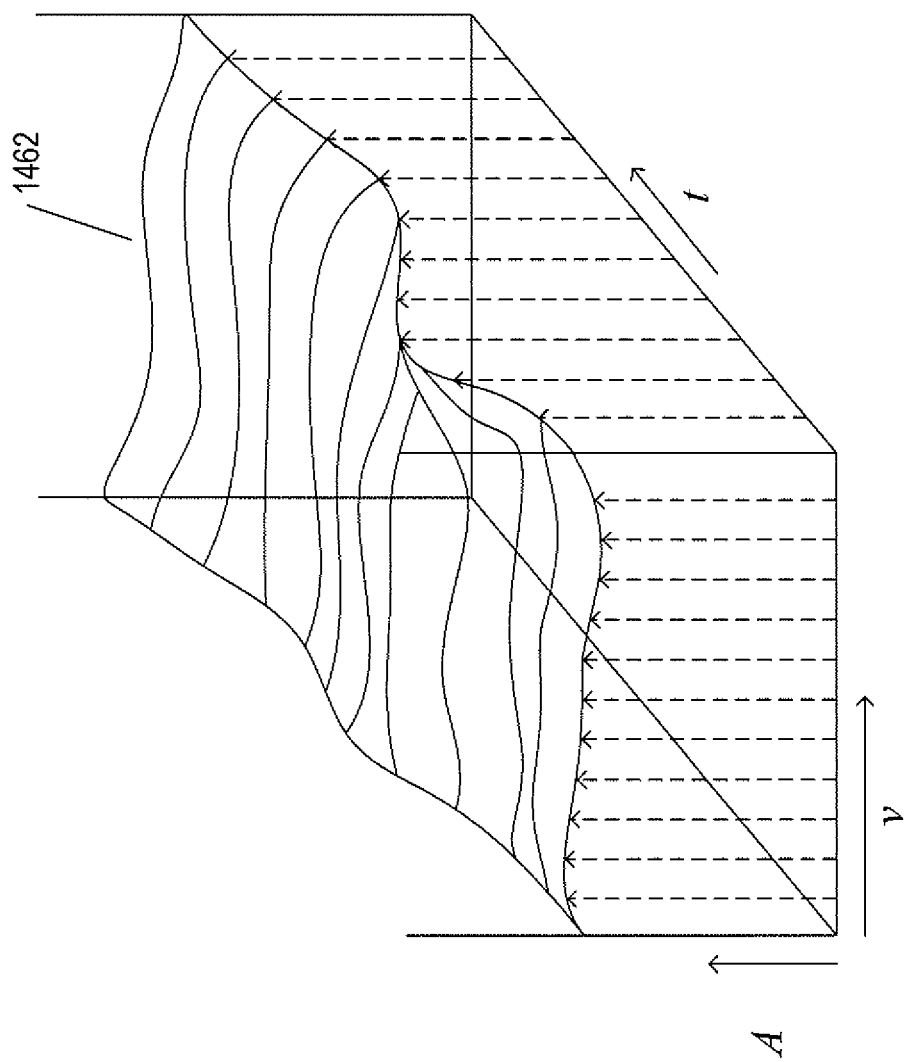

Next, as shown in FIG. 14G, the set of frequency-domain data corresponding to each of the multiple time periods are stacked together with respect to time. For example, in FIG. 14G, the frequency-domain data 1452 corresponding to the time-domain data of the first time interval 1450, illustrated in FIG. 14F, is placed at the beginning of the stack, with respect to a time axis 1456. The frequency-domain data for each successive time interval is stacked at successive corresponding points along the time axis. Thus, the initial two-dimensional data for the metric, shown in FIG. 14E, is now transformed into a three-dimensional space with a vertical axis corresponding to amplitude or the square of amplitude 1458, a horizontal axis 1460 corresponding to frequency, and a third axis 1456 corresponding to time. Finally, as shown in FIG. 14H, a frequency-time-amplitude surface 1462 is obtained from the collection of amplitude or squared amplitude values for each of the frequencies. In other words, a continualization of the frequency-domain amplitude values, as represented by dashed curve 1454 in FIG. 14F, is considered to be a cross-section or slice of the metric surface 1462 at a point in time representative of the time period. The time points $T_1$, $T_2$, ..., by which the time axis 1456 is incremented, in FIG. 14G, may be the starting point, ending point, mid point, or other defined, arbitrary time point within each time interval. The metric surface 1462 is a largely frequency-domain representation of the metric values sampled, in time, for a particular metric. It is, however, a mixed time-domain and frequency-domain representation, since the data is initially partitioned into time intervals and the partitioning is preserved in the three-dimensional data set illustrated in FIGS. 14G and H. The method may use either continuous or discrete representations of the amplitude vs. frequency data in each slice. In the following discussion, a frequency-time-amplitude surface generated by the above-discussed method from time-ordered metric-value data is referred to as a "metric surface."

Figure 15A:
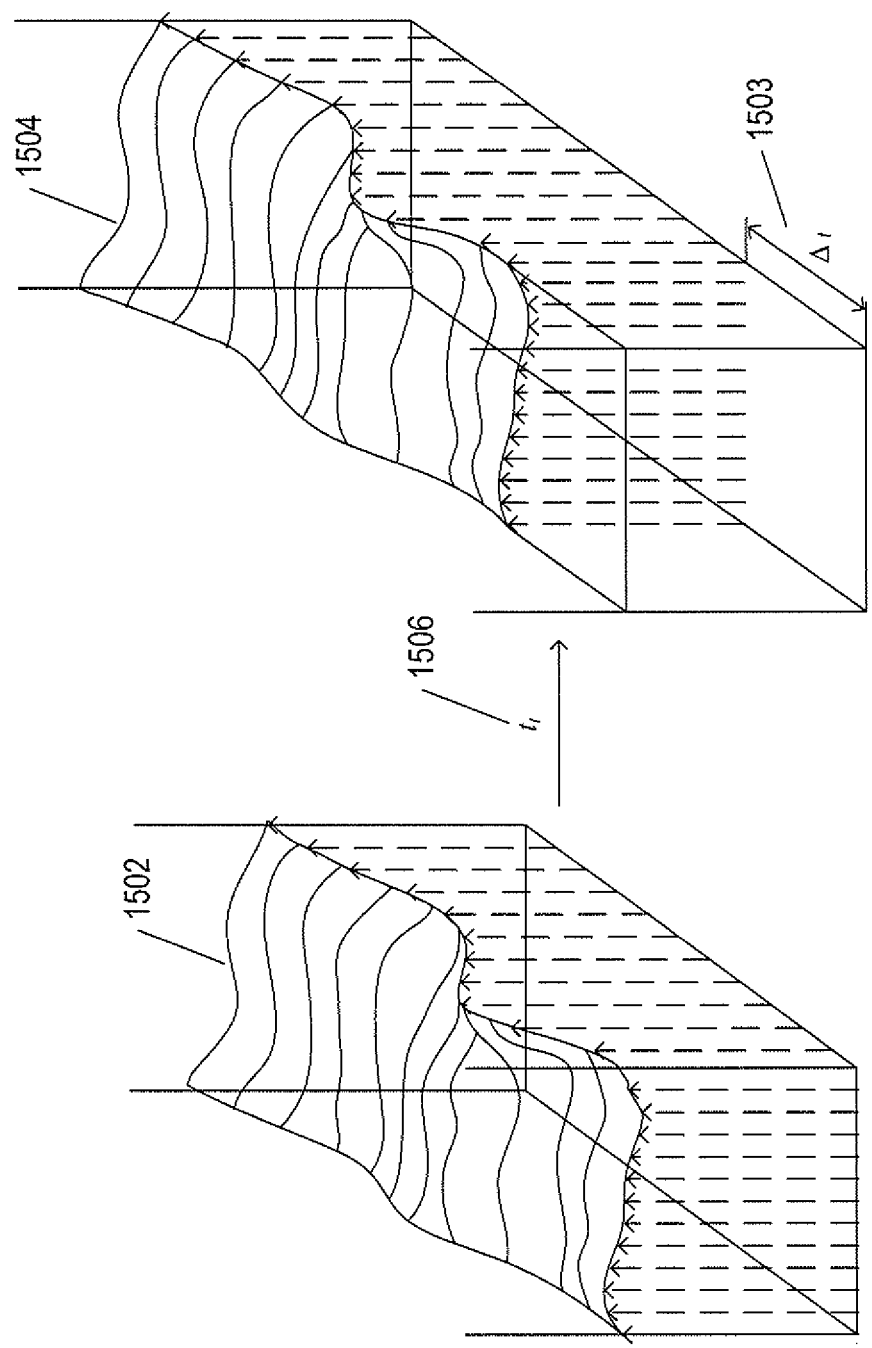
Figure 15B:
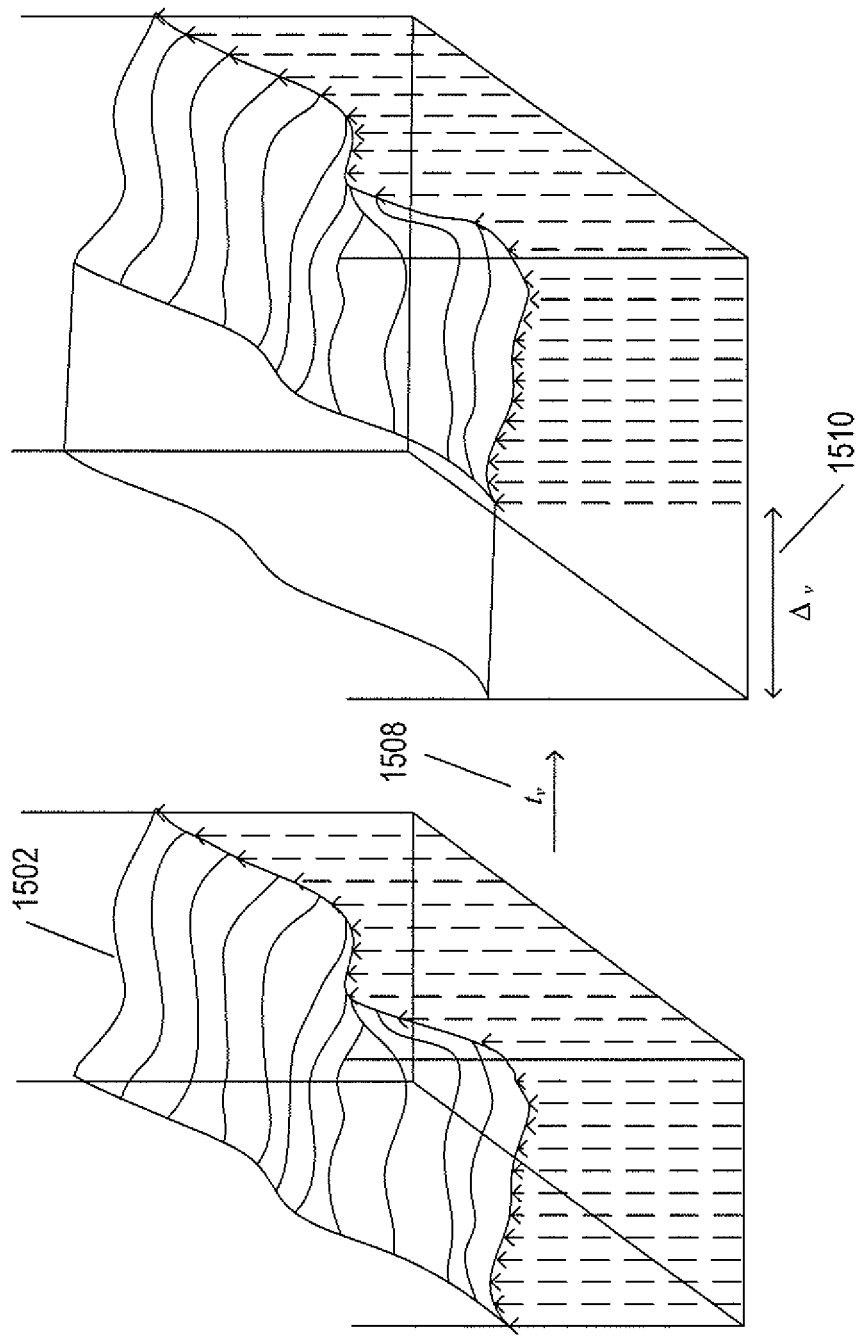
Figure 15C:
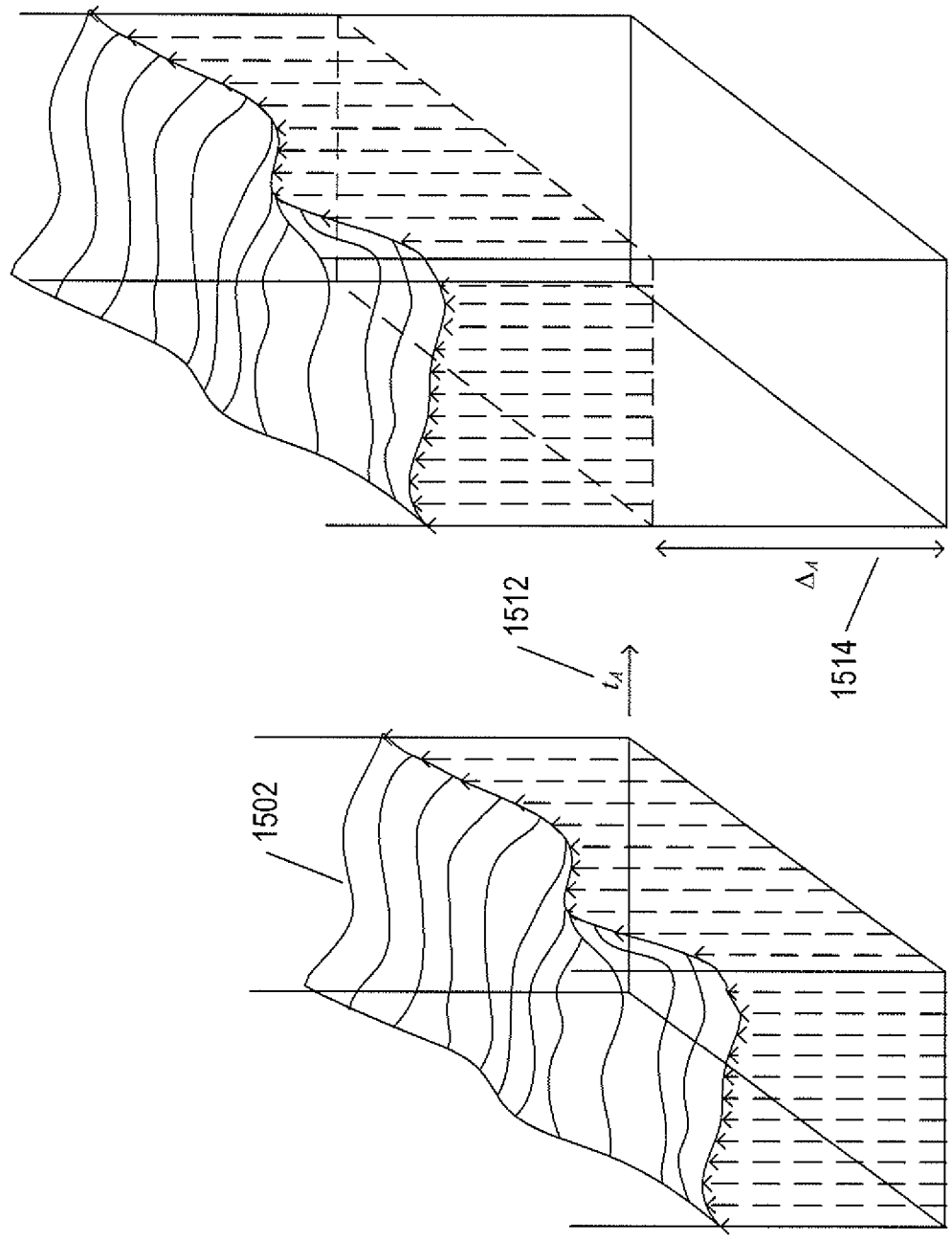

FIGS. 15A-F illustrate several types of operations that are carried out on metric surfaces. FIGS. 15A-C illustrate translations in the three different coordinate-axis directions for the three-dimensional space inhabited by metric surfaces, discussed above with reference to FIG. 14H. In FIG. 15A, a metric surface 1502 is translated in a positive direction along the time axis 1503 over a distance $\Delta_t$ to produce a new, time-translated metric surface 1504. The translation operation is referred to as $t_t$ 1506 to indicate a translation in the time-axis direction. FIG. 15B shows a translation, $t_v$ 1508 that translates the metric surface 1502 by a distance $\Delta_v$ 1510 in the positive v-axis direction. FIG. 15C shows a translation in the amplitude-axis direction, $t_A$ 1512 that shifts the metric surface 1502 by a distance $\Delta_A$ 1514 in the amplitude-axis direction. Of course, translations may occur both in positive and negative directions and translations in any arbitrary direction can be achieved by combinations of translations in the coordinate-axis directions.

Figure 15D:
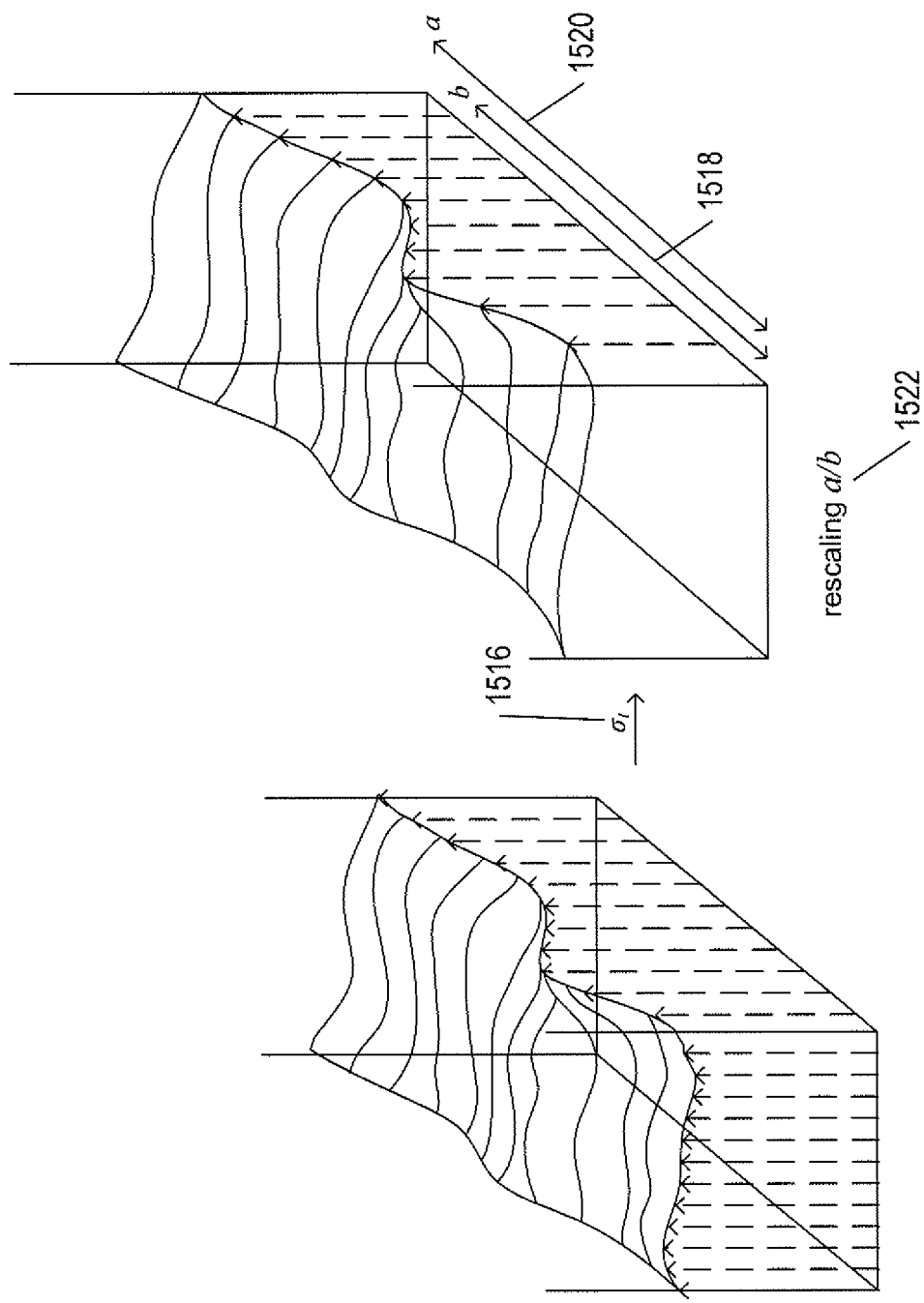
Figure 15F:
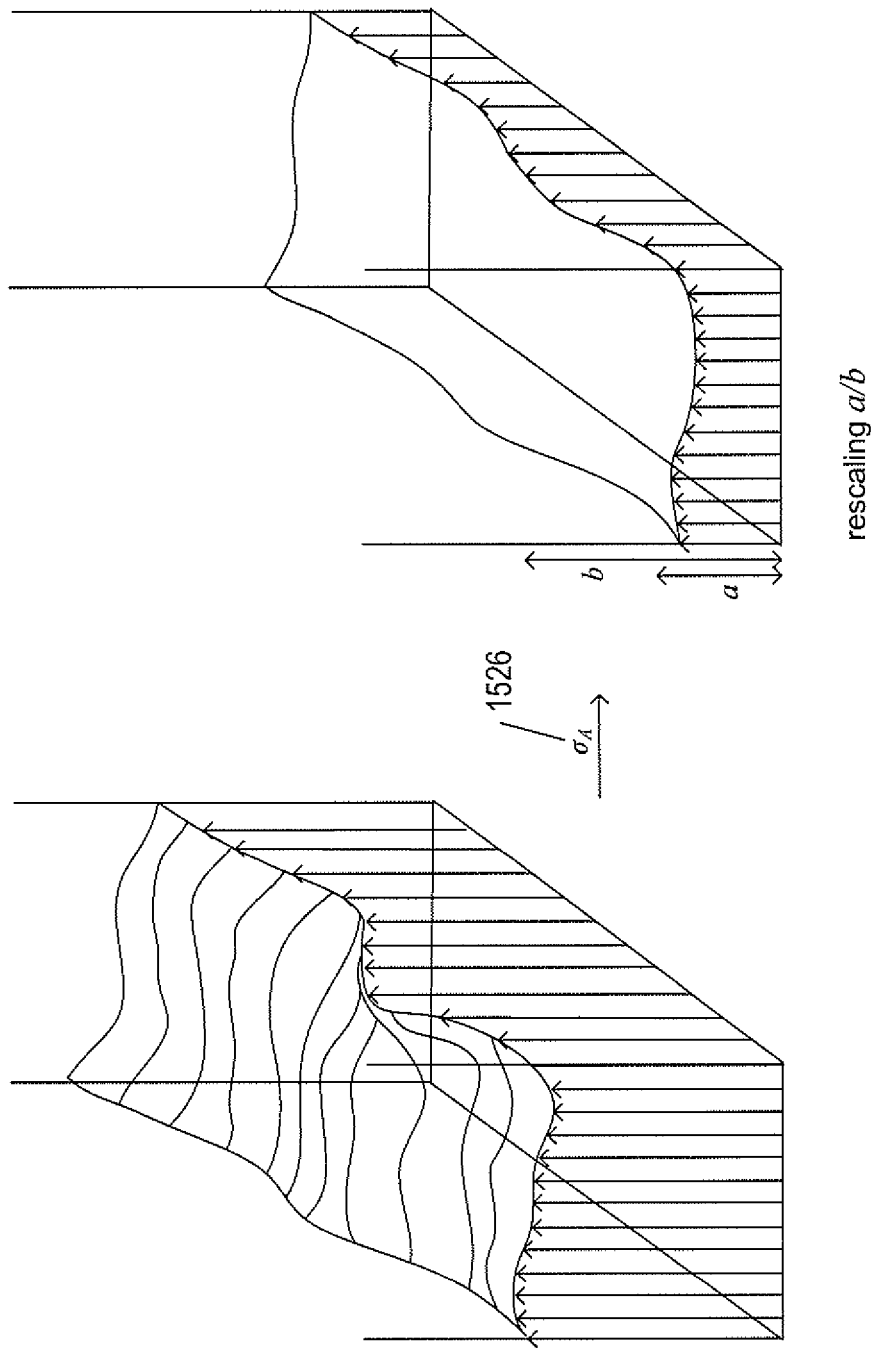

FIGS. 15D-F show three different resealing operations with respect to the three coordinate-axis directions. In FIG. 15D, a resealing operation in the time-axis direction, $\sigma_t$ 1516 increases the length, in time, of the metric surface from the original length b 1518 to a new, resealed length a 1520, achieving a resealing of $$\frac{a}{b}$$

1522. FIG. 15E shows a resealing operation in the v coordinate-axis direction that narrows the metric surface 1524, resulting in a resealing factor of $$\frac{a}{b}.$$

Finally, FIG. 15F shows a resealing operation σA 1526 that rescales the amplitude-direction for a metric surface to achieve a resealing of $$\frac{a}{b}.$$

Of course, rescaling operations can either increase or decrease the length or height of a metric surface in one of the three coordinate-axis directions. As with translation operations, resealing operations can be combined to rescale in two or more dimensions.

Translation and resealing operations are but two of many possible operations that can be applied to metric surfaces. Additional types of operations include rotations and non-linear stretching operations.

Figure 16B:
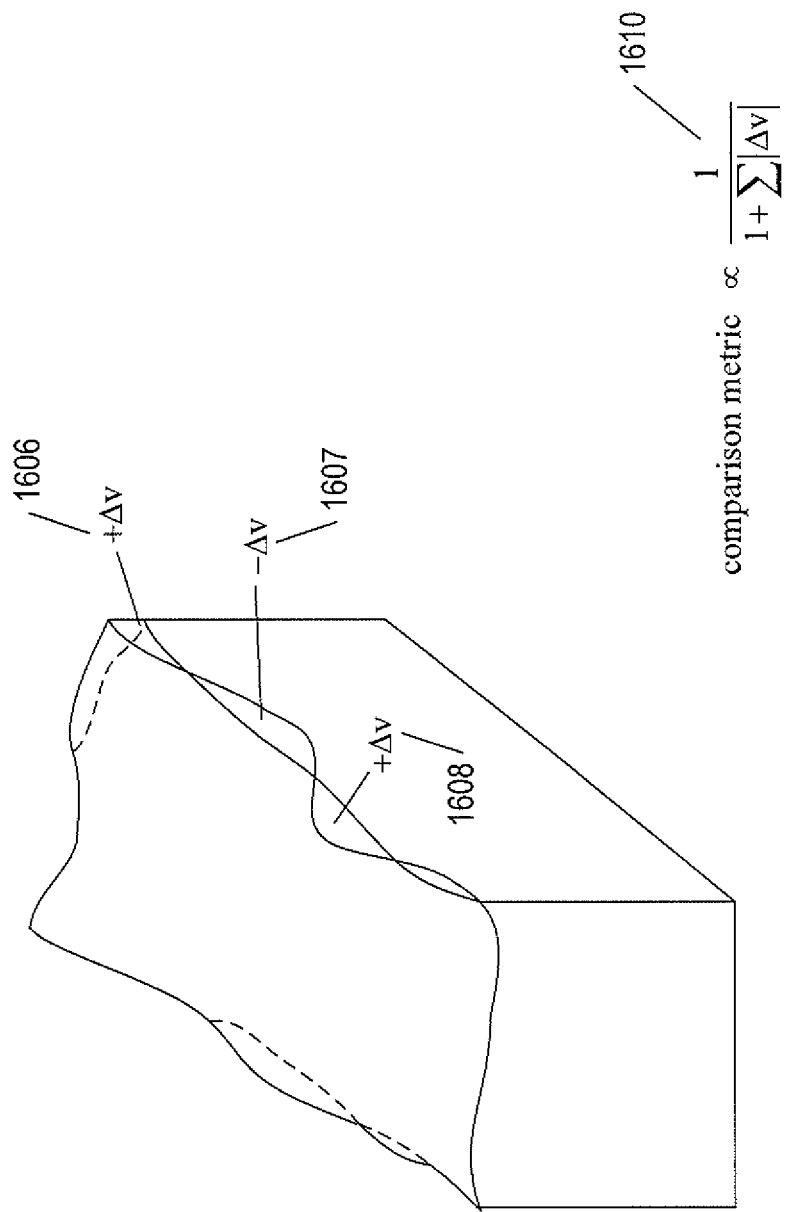
Figure 16C:
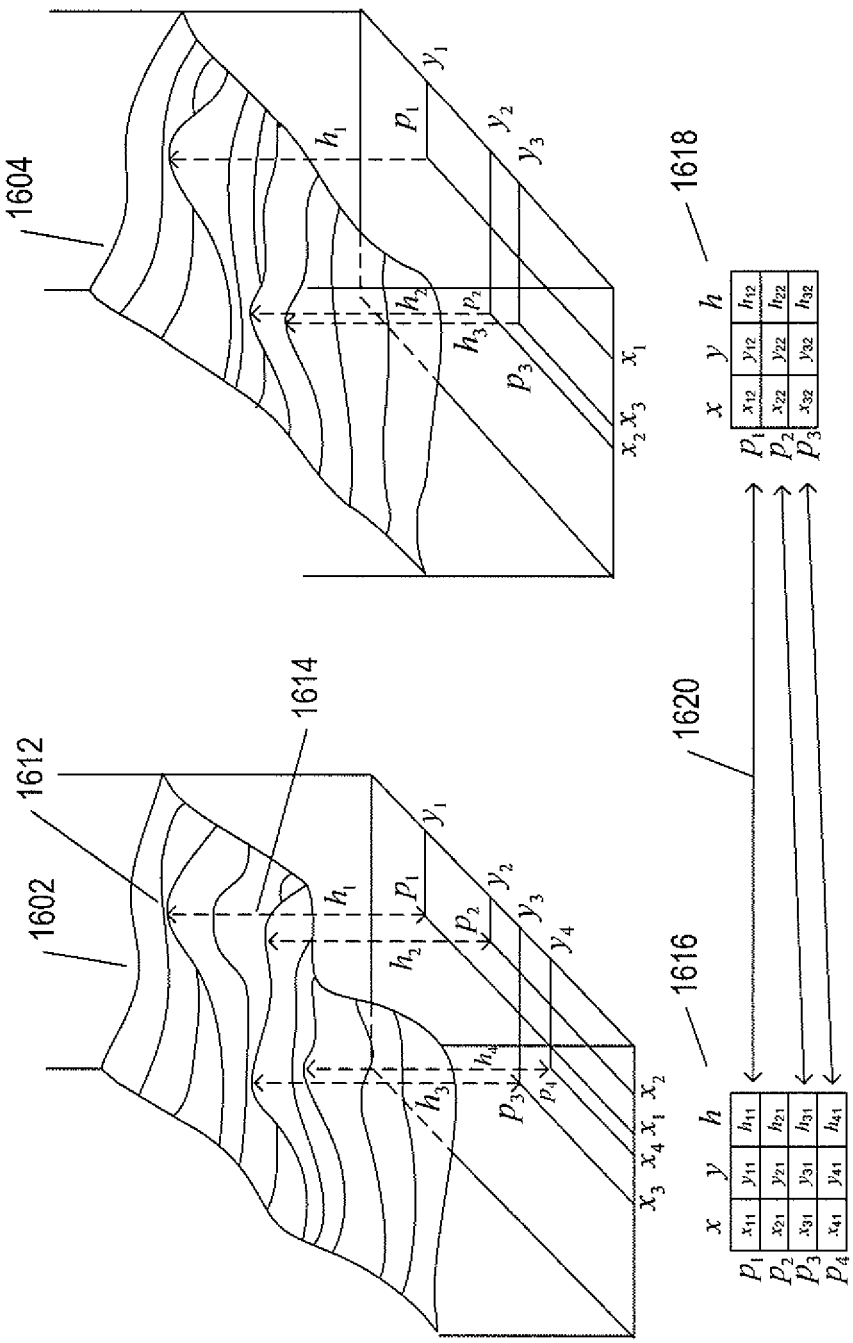

A fundamental operation applied to metric surfaces is a comparison operation that compares two metric surfaces in order to determine how closely the two metric surfaces correspond to one another. The closer two metric surfaces correspond to one another, the more likely that the metrics from which the two metric surfaces are generated are themselves related with one another. As further discussed below, graphs generated from metric-value data sets based on the relatedness of different metrics can provide the starting point for many different types of distributed-computer-system analyses, including analyses that determine causal links between different types of components and associated component behaviors and operational characteristics and recognition of various different types of states or substates within a distributed computer system. FIGS. 16A-C illustrate two of many possible approaches to computing a relatedness value, or comparison metric, between two metric surfaces.

FIG. 16A shows two metric surfaces 1602 and 1604 that have been aligned with respect to one another in the time and frequency dimensions. This alignment can be carried out using various operations, including the translation and scaling operations discussed above with reference to FIGS. 15A-F. Next, as shown in FIG. 16B, the two surfaces have been translated in the amplitude direction relative to one another in order to position the two metric surfaces so that the total volume of the volume elements between the two metric surfaces is minimized. In the following discussion, the placing of two metric surfaces together to minimize the differences between the two surfaces is referred to as "aligning" the two metric surfaces. In FIG. 16B, several of the small volume areas between the two metric surfaces are shown with $+\Delta v$ and $-\Delta v$ labels 1606-1608. A computed comparison metric for the two metric surfaces is then proportional to the inverse of the sum of the absolute value of these small volume elements plus 1, as shown by expression 1610 in the lower portion of FIG. 16B.

FIG. 16C shows an alternative approach to computing a comparison metric for two metric surfaces. In this approach, the two metric surfaces 1602 and 1604 are analyzed in order to determine the prominent peaks within the surface. Alternatively, both prominent peaks and valleys may be used. The metric surface, for example, has four prominent peaks indicated by dashed vertical areas, including peak 1612 indicated by dashed vertical arrow 1614. The coordinates of the peaks are then collected into tables 1616 and 1618 associated with metric surfaces 1602 and 1604, respectively. A correspondence between the peaks and the tables is then obtained, indicated in FIG. 16C by double-headed arrows, such as double-headed arrow 1620, by minimizing the disparities in the x and y coordinates for peak pairs selected from the two tables. Note that, in FIG. 16C, x, y, and h coordinates are used rather than v, t, and A coordinates for the three-dimensional space in which metric surfaces reside, discussed above with reference to FIG. 14H. Finally, as shown by the pair of expressions 1622, a peak similarity value is computed for each corresponding pair of peaks and a comparison metric is generated that is proportional to the sum of the peak_similarity values for the corresponding peaks minus a constant times the number of peaks that are not shared between the two metric surfaces. The peak_similarity value computed for two corresponding peaks is proportional to the inverse of the sum of the distance between the two peaks in the x, y plane and the absolute value of the difference of the heights of the two peaks. Of course, there are many different possible alternative ways to compute peak similarity or peak-and-valley similarity for the two metric surfaces. The two comparison metrics discussed with reference to FIGS. 16B and 16C are but two of many possible comparison metrics that can be used to represent the degree of similarity between two metric surfaces.

Figure 17A:
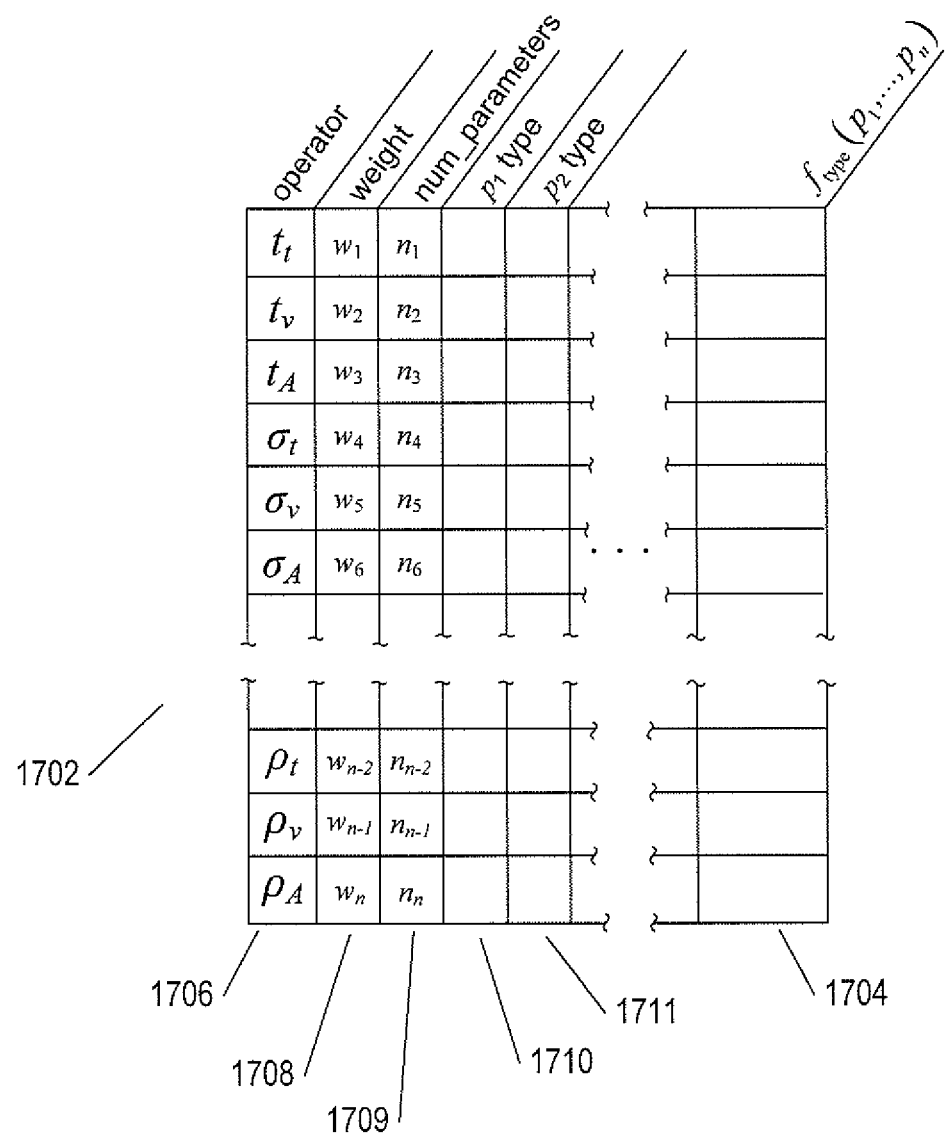
FIGS. 17A-B illustrate the overall comparison of two metric surfaces.
Figure 17B:
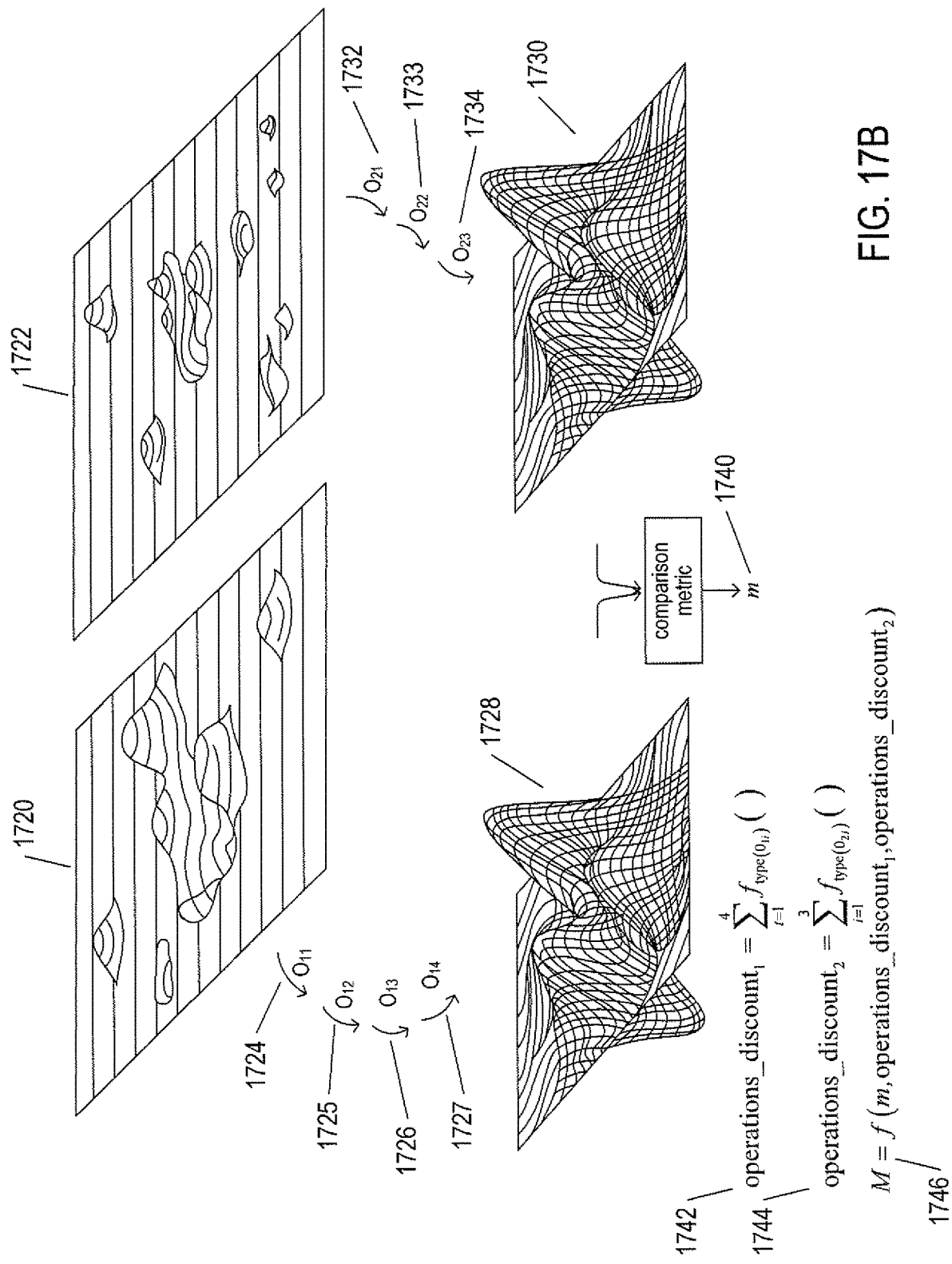

In order to compute a final value for the comparison of two metric surfaces, the number and type of operations used to align the two metric surfaces in three-dimensional space need to be considered. FIGS. 17A-B illustrate the overall comparison of two metric surfaces. FIG. 17A shows a table 1702 that includes, in a final column 1704, functions that return discount values for each of the possible operators, shown in the first column 1706, depending on the parameters supplied to the operation as well as on weights assigned to the operations, listed in columns 1708-1711 and additional parameter columns not shown in FIG. 17A. In other words, the discount applied for each operator used during the alignment process depends on the type of operator, a weight assigned to the operator, and the parameter values for the operation. As one example, in the described implementation, a translation in the time axis operator $t_t$ is associated with a weight $w_t$ and one parameter, which is the absolute value of the distance, along the time axis, which a metric surface is moved by the operation.

FIG. 17B illustrates the overall comparison-metric computation. The comparison starts with two metric surfaces 1720 and 1722. A series of one or more operations 1724-1727 are applied to the first metric surface 1720 to produce a resultant metric surface 1728 that is optimally aligned with the original second metric surface 1722 or with a resultant metric surface 1730 produced from the second metric surface 1722 by application of a different series of one or more operations 1732-1734. Note that, in addition to the operations discussed above with reference to FIGS. 15A-F, additional operations may trim or cut metric surfaces. Next, the two optimally aligned metric surfaces 1728 and 1730 are compared by one of the methods discussed above with reference to FIGS. 16A-C, or another such comparison method, to produce an initial comparison value m 1740. Then, discount values 1742 and 1744 are computed for metric surfaces 1720 and 1722, respectively, as the sum of the discounts computed for each of the operations applied during the alignment process. The functions that compute the discounts are those discussed above with reference to FIG. 17A. Finally, as indicated by expression 1746, the overall comparison metric M is computed as a function of the comparison metric m and the two sums of operation discounts. The method for computing overall comparison metrics for two metric surface, discussed with reference to FIGS. 17A-B, is only one example of many different possible overall metrics that can be produced by comparing two metric surfaces. In alternative methods, rather than sums of discounts, the discount functions may be computed as a non-linear function of the entire series of operations, such as operations 1724-1727, applied to an initial metric surface during the alignment process.

It should be noted that the number and types of transformation operations applied to a given metric surface during the comparison-metric computation for two initial metric surfaces may be constrained, so that computed comparison metrics are reflective of the similarity the two metric surfaces rather than how closely they can be fit to one another by application of translation, resealing, and other operations. The constraints may specify a total number of operations that can be applied as well as the allowed combinations of different types of operations. Of course, because the computed final metric takes into account the computed discounts, even without constraints on the number and types of operations, the more operations applied, the lower the computed comparison-metric value.

Figure 17C:
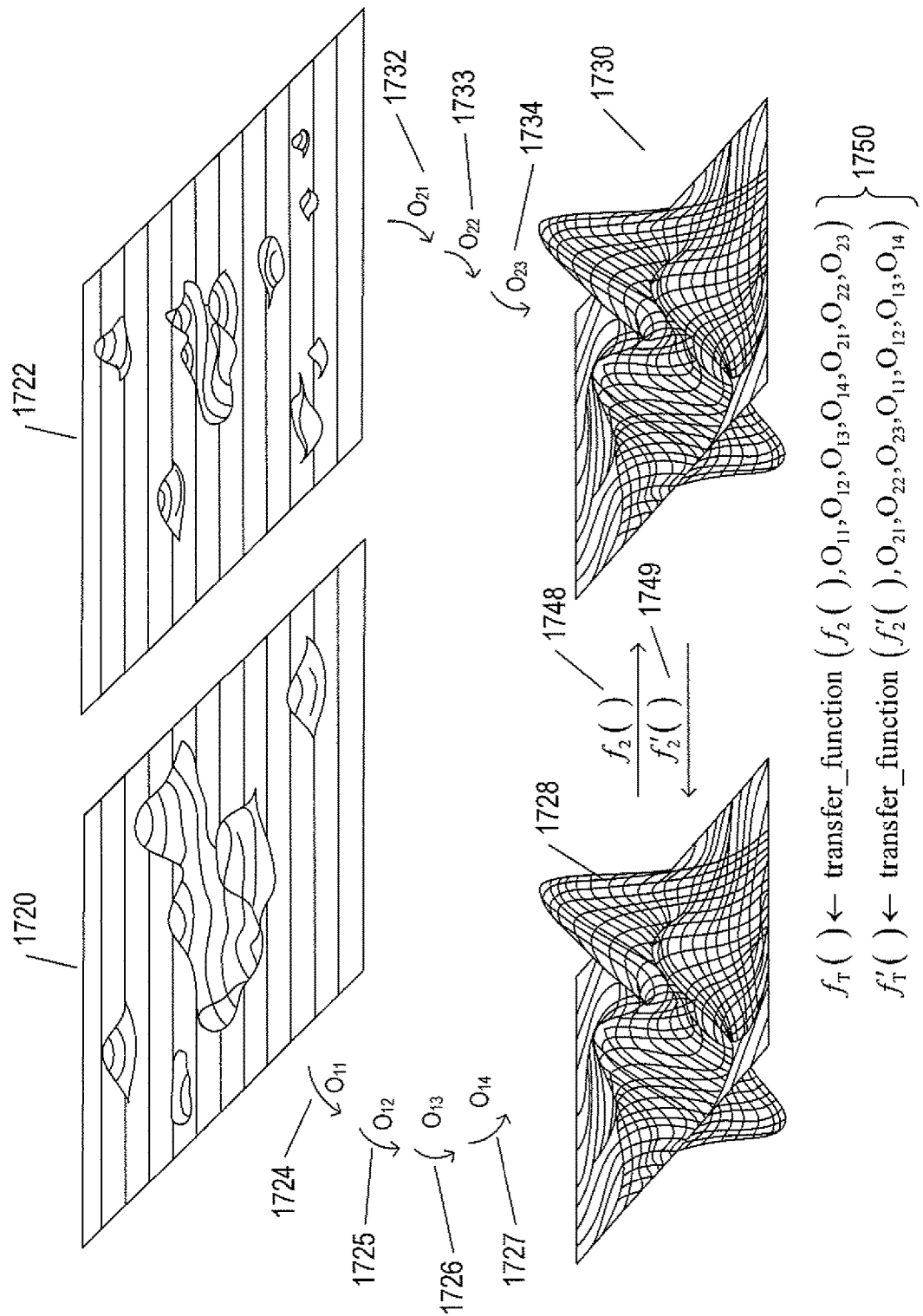
FIGS. 17C-D illustrate generation of a component graph based on frequency-time-amplitude-surface-comparison metrics and frequency-time-amplitude-surface transfer functions.
Figure 17D:
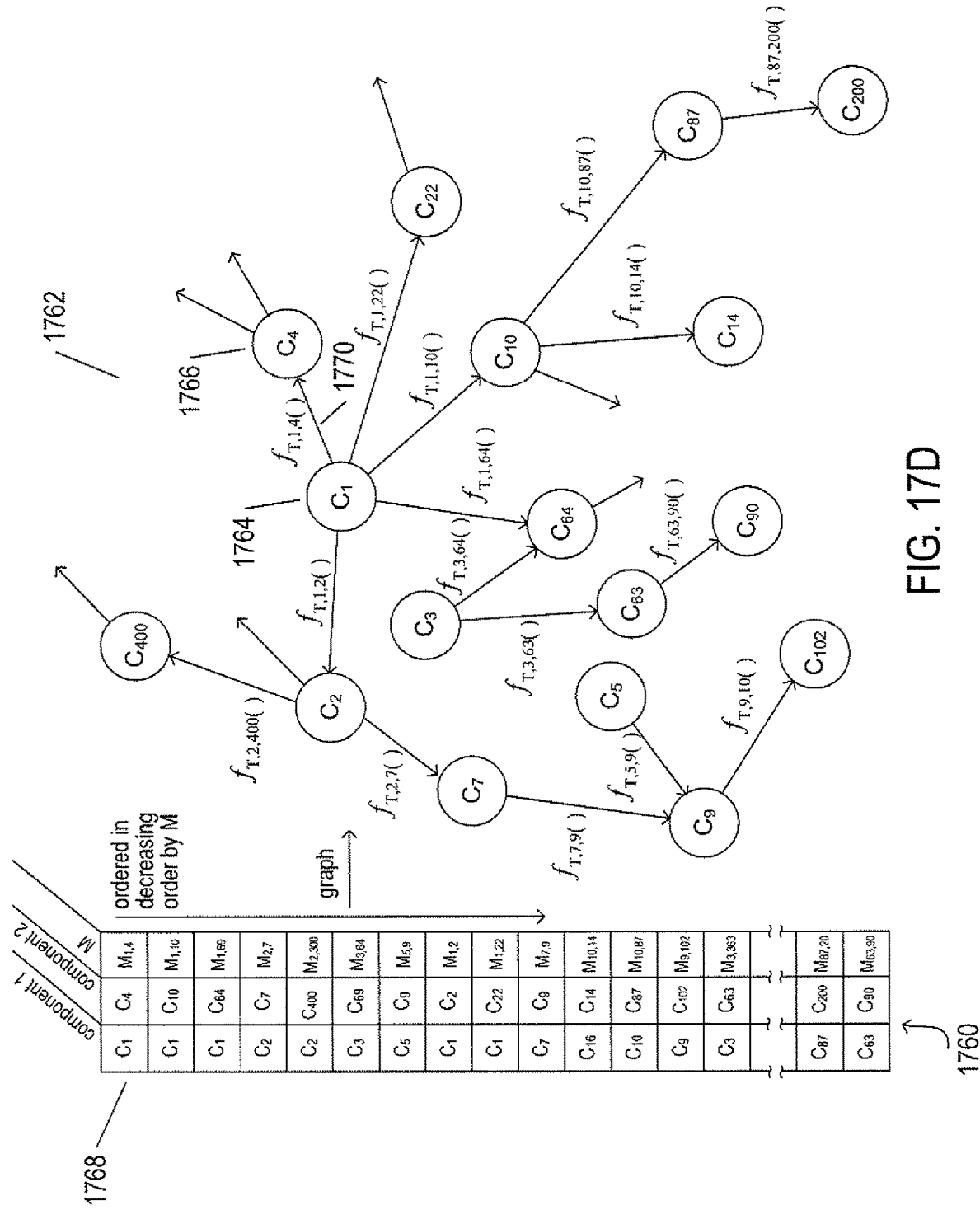

FIGS. 17C-D illustrate generation of a component graph based on frequency-time-amplitude-surface-comparison metrics and frequency-time-amplitude-surface transfer functions. FIG. 17C illustrates frequency-time-amplitude-surface transfer functions. FIG. 17C shows the same original metric surfaces 1720 and 1722 and transformed metric surfaces 1728 and 1730, shown in FIG. 17B, obtained by the respective series of operations 1724-1727 and 1732-1734. The two transformed metric surfaces 1728 and 1730 are related by a forward transfer function 1748 and an inverse transfer 1749. In other words, there are two functions, one of which transforms metric surface 1728 to metric surface 1730 and one of which transforms metric surface 1730 to metric surface 1728. The two transfer functions may involve various types of surface-reshaping functions that, in the aggregate, alter the topology of the surface to which they are applied in order to bring that surface into conformance with another surface. A comprehensive set of transfer functions 1750 can be prepared to express transformations between metric surfaces 1720 and 1722. As shown in the expressions 1750, these transfer functions are generated from the transfer-function pairs 1748 and 1749 as well as the operations 1724-1727 and 1732-1734. The first of these transfer functions, when applied to metric surface 1720, generates metric surface 1722 and the second of these two transfer functions, when applied to metric surface 1722, generates metric surface 1720. These transfer functions contain information about the relationship between two metric surfaces and between the underlying metrics from which the metric surfaces are generated. As a simple example, when two metric surfaces are related primarily by a translation in the time-axis direction, it can be inferred that the underlying metrics may be related through a time lag, or time-propagation delay. For example, a metric related to remaining storage capacity of a data-storage appliance may show a non-linear approach to zero-remaining capacity and a similar metric related to remaining storage capacity of a second data-storage appliance may show the same type of curve offset in time from the first data-storage appliance. The two data-storage appliances may be related in that the second data-storage appliance begins to receive data-storage requests as the first data-storage appliance becomes full, or saturated, and then the second data-storage device subsequently becomes saturated Other examples may include relationships between the remaining capacity of a data-storage appliance and the percentage of communications bandwidths used by a local area network, indicative of a server or some other computational entity preferentially storing data locally, but, when the local data-storage device is saturated, sending storage requests via the local network to remote data-storage devices. There are myriad different potential relationships between various components and sets of components within a distributed computing system. Often, these relationships are obscured by the sheer magnitude of data collected for administrative and maintenance purposes and by large amounts of noise in time-domain data sets. As discussed above, transformation of the data sets to the frequency domain can often reveal underlying relationships, from which causal relationships can be inferred.

FIG. 17D illustrates generation of an initial single-metric-based component graph from frequency-time-amplitude-surface comparison values generated by the frequency-time-amplitude-surface comparison methods discussed above with reference to FIGS. 17A-B. In a first step, metric surfaces are prepared, by the methods discussed with reference to FIGS. 14E-H, for a large set of components $C_1$, $C_2$, ..., $C_n$ of a computer system with respect to a first metric. Comparison values $M_{i,j}$ are then computed, by the frequency-time-amplitude-surface comparison methods discussed above with reference to FIGS. 16A-17B, for the possible pairs of metric surfaces generated for the set of components. In FIG. 17D, these pairs of components and corresponding frequency-time-amplitude-surface comparison metrics are arranged in a table 1760 in decreasing order with respect to the magnitude of the frequency-time-amplitude-surface comparison values $M_{i,j}$. Then, a graph 1762 is prepared from these tabulated data in which the nodes correspond to components and the edges are labeled with one or both of the transfer functions, discussed above with reference to FIG. 17C, for the metric surfaces generated with respect to the two components corresponding to the nodes interconnected by the edge. In general, the graph is constructed by selecting a subset of the data with frequency-time-amplitude-surface comparison values of greatest magnitude. For example, in the graph 1762 shown in FIG. 17D, the node pair 1764 and 1766 is first created because of the large-magnitude relationship between components $C_1$ and $C_4$ indicated by the first row 1768 in table 1760. In FIG. 17D, the edge 1770 connecting these two initial nodes is labeled with a transfer function for transforming the metric surface corresponding to node $C_1$ to the metric surface corresponding to node $C_4$. The graph-generation method then proceeds downward, creating nodes and edges for the remaining relationships down to a frequency-time-amplitude comparison-metric cutoff threshold.

Separate initial component graphs may be generated for each metric of a set of metrics relevant to the components, or subsets of the components, and these graphs may then be combined to generate a composite graph. The composite graph may include edges that each represent a relationship derived from two or more metrics relevant to the components connected by the edge that were each represented by an edge in two initial component graphs. Alternatively, multiple tables, such as table 1760, can be prepared for each of multiple metrics, and a composite component graph can be prepared from a merged table. In the composite component graph, an edge may be labeled with indications of the one or more metrics, and the transfer functions associated with each metric, that provide a basis for the relationship between the two component nodes. In yet a different alternative method, the initial component graphs may be maintained separately, and considered together during various types of analysis.

A component graph or composite component graph generated from the metric surfaces and comparison values contains a large amount of information about the operational-characteristics-and-performance relationships between components of a distributed computing system. Component graphs are powerful tools for identifying problems and anomalies in the operational behavior of a distributed computing system and for devising plans and procedures for ameliorating these problems and anomalies. In addition, a component graph may serve as a type of fingerprint or pattern for particular types of operational behaviors. The component graphs generated in real time can be compared to stored component graphs associated with attributes in order to quickly determine the general state of all or particular subsets of components within a distributed computing system. Component graphs may also be used for predicting future operational characteristics and performance based on the current state of a distributed computing system. Thus, generation of component graphs from frequency-time-amplitude-surface comparison values is a fundamental step in the analysis of operational-characteristics-and-performance data collected within a distributed computing system that leads to a variety of higher-level automated analyses that may be used in automated administration and management subsystems.

Figure 18A:
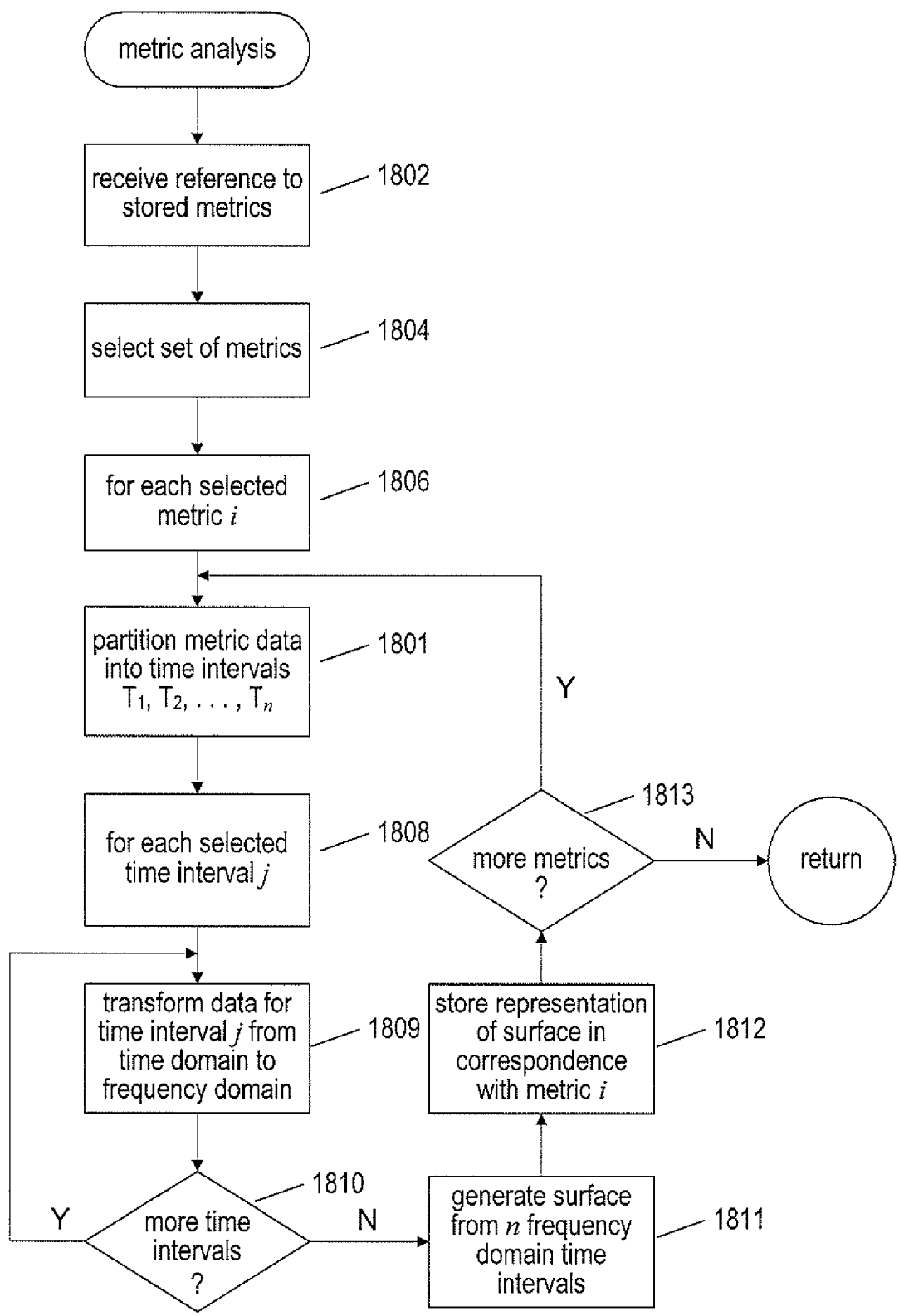
FIGS. 18A-B provide control-flow diagrams to illustrate one implementation of an automated metric-analysis subsystem within an automated administration and management subsystem of a distributed computing system.
Figure 18B:
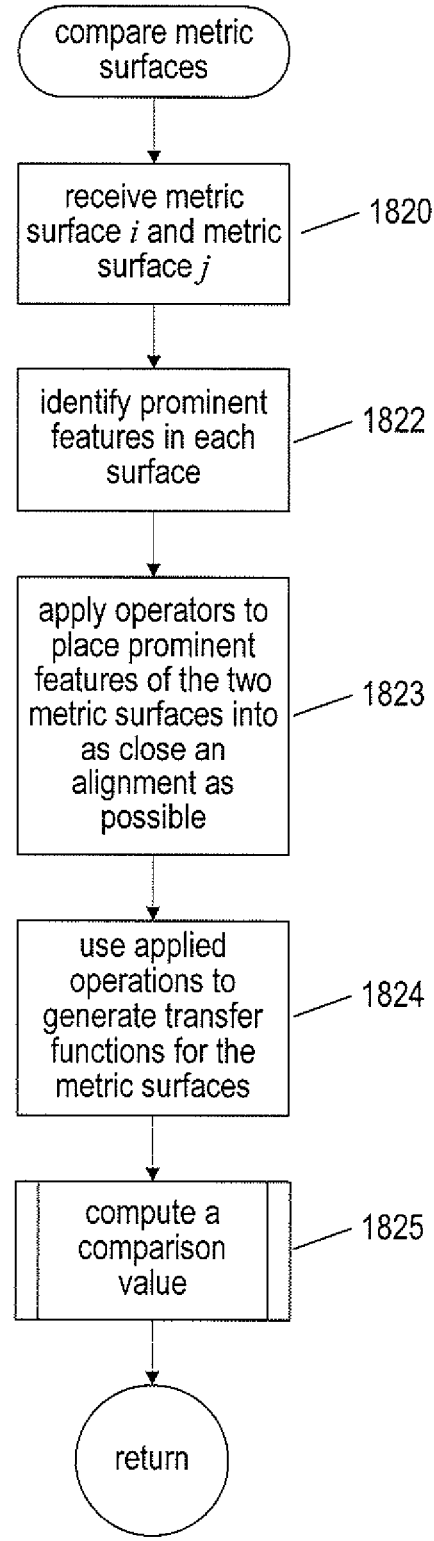

FIGS. 18A-B provide control-flow diagrams to illustrate one implementation of an automated metric-analysis subsystem within an automated administration and management subsystem of a distributed computing system. FIG. 18A shows a control-flow diagram for an automated metrics-analysis routine. In step 1802, the routine receives one or more references to stored metric data. The stored metric data is discussed above, with reference to FIG. 14B. In step 1804, a set of metrics is selected for analysis. Selection of metrics may involve selecting metrics from particular levels of the hierarchical component structure of a distributed computing system, selecting particular metrics that have been previously discovered to be useful for various types of classification and fingerprinting, or selecting metrics based on many other types of considerations. Then, in the outer for-loop of steps 1806-1813, each of the selected metrics is considered. In step 1807, the sampled data for the currently considered metric is partitioned into time intervals, as discussed above with reference to FIG. 14E. In the inner for-loop of steps 1808-1810, the sample data for each time interval is transformed from the time domain to the frequency domain, as discussed above with reference to FIG. 14F. In step 1811, a metric surface is then generated from the frequency-domain data for the time intervals, as discussed above with reference to FIGS. 14G-H. In step 1812, a representation of the metric surface is stored in memory and/or a mass-storage device or appliance for further use.

FIG. 18B shows a control-flow diagram for a frequency-time-amplitude-surface comparison routine. In step 1820, the comparison routine receives two metric surfaces i and j. In step 1822, prominent features are identified in each of the two metric surfaces. In step 1823, operators are applied to the two metric surfaces to place the two metric surfaces into as close an alignment as possible, as discussed above with reference to FIGS. 16A-17B. In step 1824, the applied operations are used to generate transfer functions for the two metric surfaces, as discussed above with reference to FIG. 17C. Finally, in step 1825, a comparison value is generated for the two metric surfaces by one of the two methods discussed above with reference to FIGS. 16A-C or by any of many other possible comparison methods.

FIG. 19 illustrates one approach to using frequency-domain data for classification. As discussed above with reference to FIG. 17D, a component graph 1902 can be generated from sampled metric data. The component graph can be used for analysis of relationships between components of a computer system in order to generate a list of secondary metrics 1904 that serve as fingerprints for various different types of operational or performance states of the computer system. Characteristic values or value ranges for these metrics can then be generated by collecting data from the distributed computing system when the distributed computing system occupies certain well-defined operational or performance states of interest. These sets of characteristic metric values 1906-1909 represent the fingerprints for the operational or performance states of interest. Subsequently, during operation of the computer system, values for the fingerprint metrics can be collected 1910 and input to a classifier 1912 which compares the generated metric values to the sets of fingerprint metric values 1906-1909 to select an operational or performance state that best matches the collected metric values in order to classify the current operational or performance state of the distributed computing system. This is but one example of how a component graph 1902 can be used to generate additional automated analysis tools to facilitate automated administration and management of a distributed computing system.

Examples of particular uses for the methods and systems to which the current document is directed include automated tools for characterizing the work load currently executing within a particular server, collection of servers, or distributed computing system, as a whole. In addition, component graphs and metric surfaces, as well as metrics derived from component graphs and metric surfaces, can be used for monitoring operational characteristics of a distributed computing system, identifying anomalies and problem states, identifying administration and management measures that can be taken to ameliorate identified problem states and anomalies, identifying opportunities for improving the performance of a distributed computing system, and many other analyses and analysis-based operations that can be incorporated within an automated administration and management subsystem to facilitate automated administration and management of distributed computing systems.

Although the present invention has been described in terms of particular embodiments, it is not intended that the invention be limited to these embodiments. Modifications within the spirit of the invention will be apparent to those skilled in the art. For example, many different design and implementation parameters may be varied in order to produce alternative implementations of the above-described methods and systems, including hardware platforms, operating systems, virtualization systems, programming languages, control structures, data structures, modular organization, and other such design and implementation parameters. As mentioned above, transformation of data sets from the time domain to the frequency domain can be accomplished by a variety of different transformation methods, including the above-discussed Fourier-transform methods. Various different methodologies may be used to produce alternative types of metric surfaces, frequency-time-amplitude-surface-comparison methods, and analytical tools based on metric surfaces and frequency-time-amplitude-surface-comparison methods.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A method, carried out in a computer system having one or more processors, one or more memories, and one or more mass-storage devices, that compares a first sequence of time-ordered metric values for a particular metric generated by a first component of a computer system to a second sequence of time-ordered metric values for the particular metric generated by a second component of the computer system to produce a comparison metric that reflects the similarity of the operational behaviors of the different components of the computer system, the method comprising:
   selecting a total time span that includes a sequence of pairs of time-aligned metric values, each pair included a first metric value selected from the first sequence of metric values and a second metric value selected from the second sequence of metric values;
   dividing the total time span into multiple time intervals;
   for each time interval of the multiple time intervals,
      generating, from a portion the first sequence of time-ordered metric values within the time interval, representing time-domain data, a set of frequency-domain data points for the time interval, and
      generating, from a portion the second sequence of time-ordered metric values within the time interval, representing two-dimensional time-domain data with time and metric-value axes, a set of frequency-domain data points for the time interval, representing two-dimensional frequency-domain data with frequency and amplitude axes;
   stacking the sets of frequency-domain data points generated from portions of the first sequence of time-ordered metric values along a time axis to create a first three-dimensional volume with frequency, time, and amplitude axes;

stacking the sets of frequency-domain data points generated from portions of the second sequence of time-ordered metric values along a time axis to create a second three-dimensional volume with frequency, time, and amplitude axes;

interpolating a first three-dimensional metric surface from the first three-dimensional volume which represents mixed time-domain and frequency-domain data;

interpolating a second three-dimensional metric surface from the first three-dimensional volume which represents mixed time-domain and frequency-domain data;

aligning the first and second metric surfaces in three dimensions using a set of one or more surface-modifying operations:

generating the comparison metric from the aligned first and second metric surfaces; and using the comparison metric to diagnose and ameliorate problematic operational states of the computer system and/or to tuning the computer system to increase performance of the computer system.

2. The method of claim 1 wherein generating the comparison metric from the aligned first and second metric surfaces further comprises:

generating an initial comparison metric value in; and generating the comparison metric as a function of m and weighted sums of discount values associated with each of the surface-modifying operations used to align the first and second metric surfaces.

3. The method of claim 2 wherein the initial comparison metric value m is generated by one of:

summing the volumes of volume elements between the aligned first and second metric surfaces; and comparing metrics associated with common features of the first and second metric surfaces.

4. The method of claim 1 wherein the first and second sequences of time-ordered metric values each comprises time/metric-value data points that represent sampled values of the particular metric; and wherein the particular metric is selected from among a performance metric, an operational-characteristic metric, and an operational-behavior metric for the computer system.

5. The method of claim 1 wherein the particular metric is related to the performance, operational characteristics, or operational behavior of one of:

the computer system;

a single component or subcomponent of the computer system; and an aggregation of multiple components and/or subcomponents of the computer system.

6. The method of claim 1 wherein the particular metric is related to values computed from one or more sets of time-ordered metric values related to the performance, operational characteristics, or operational behavior of one of:

the computer system;

a single component or subcomponent of the computer system; and an aggregation of multiple components and/or subcomponents of the computer system.

7. The method of claim 1 wherein the computer system is one of:

a personal computer;

a server;

a workstation;

a multi-computer-system data center;

a distributed computer system;

a virtual data center;

a geographically distributed computer system; and and aggregation of geographically distributed data centers.

8. The method of claim 1 wherein a set of frequency-domain data points for the time interval are generated from a portion of a sequence of time-ordered metric values within the time interval by application of a discrete Fourier transform.

9. The method of claim 1 wherein the surface-modifying operations used to align the first and second metric surfaces in three dimensions are selected from among:

translations;

rescaling operations;

rotation operations;

stretching operations;

trimming operations; and cutting operations.

10. The method of claim 1 wherein aligning the first and second metric surfaces in three dimensions using the set of one or more surface-modifying operations further comprises:

successively applying surface-modifying operations to one or both of the first and second metric surfaces to minimize the volume between the first and second metric surfaces.

11. An automated system comprising:

one or more processors;

one or more memories;

one or more mass-storage devices; and computer instructions stored in one or more of the one or more memories that, when retrieved from memory and executed by one or more of the one or more processors, control the automated system to compare a first sequence of time-ordered metric values for a particular metric generated by a first component of a computer system to a second sequence of time-ordered metric values for the particular metric generated by a second component of the computer system to produce a comparison metric that reflects the similarity of the operational behaviors of the different components of the computer system by:

selecting a total time span that includes a sequence of pairs of time-aligned metric values, each pair included a first metric value selected from the first sequence of metric values and a second metric value selected from the second sequence of metric values, dividing the total time span into multiple time intervals, for each time interval of the multiple time intervals, generating, from a portion the first sequence of time-ordered metric values within the time interval, representing time-domain data, a set of frequency-domain data points for the time interval, and generating, from a portion the second sequence of time-ordered metric values within the time interval, representing two-dimensional time-domain data with time and metric-value axes, a set of frequency-domain data points for the time interval, representing two-dimensional frequency-domain data with frequency and amplitude axes, stacking the sets of frequency-domain data points generated from portions of the first sequence of time-ordered metric values along a time axis to create a first three-dimensional volume with frequency, time, and amplitude axes, stacking the sets of frequency-domain data points generated from portions of the second sequence of time-ordered metric values along a time axis to create a second three-dimensional volume with frequency, time, and amplitude axes, interpolating a first three-dimensional metric surface from the first three-dimensional volume which represents mixed time-domain and frequency-domain data, interpolating a second three-dimensional metric surface from the first three-dimensional volume which represents mixed time-domain and frequency-domain data, aligning the first and second metric surfaces in three dimensions using a set of one or more surface-modifying operations, generating the comparison metric from the aligned first and second metric surfaces, and using the comparison metric to diagnose and ameliorate problematic operational states of the computer system and/or to tuning the computer system to increase performance of the computer system.

12. The automated system of claim 11 wherein generating the comparison metric from the aligned first and second metric surfaces further comprises:

generating an initial comparison metric value m; and generating the comparison metric as a function of m and weighted sums of discount values associated with each of the surface-modifying operations used to align the first and second metric surfaces.

13. The automated system of claim 12 wherein the initial comparison metric value m is generated by one of:

summing the volumes of volume elements between the aligned first and second metric surfaces; and comparing metrics associated with common features of the first and second metric surfaces.

14. The automated system of claim 11 wherein the first and second sequences of time-ordered metric values each comprises time/metric-value data points that represent sampled values of the particular metric; and wherein the particular metric is selected from among a performance metric, an operational-characteristic metric, and an operational-behavior metric for the computer system.

15. The automated system of claim 11 wherein the particular metric is related to the performance, operational characteristics, or operational behavior of one of:

the computer system:

a single component or subcomponent of the computer system; and an aggregation of multiple components and/or subcomponents of the computer system.

16. The automated system of claim 11 wherein the particular metric is related to values computed from one or more sets of time-ordered metric values related to the performance, operational characteristics, or operational behavior of one of:

the computer system;

a single component or subcomponent of the computer system: and an aggregation of multiple components and/or subcomponents of the computer system.

17. The automated system of claim 11 wherein the computer system is one of:

a personal computer;

a server;

a workstation;

a multi-computer-system data center;

a distributed computer system;

a virtual data center;

a geographically distributed computer system; and and aggregation of geographically distributed data centers.

18. The automated system of claim 11 wherein a set of frequency-domain data points for the time interval are generated from a portion of a sequence of time-ordered metric values within the time interval by application of a discrete Fourier transform.

19. The automated system of claim 11 wherein the surface-modifying operations used to align the first and second metric surfaces in three dimensions are selected from among:

translations;

resealing operations;

rotation operations;

stretching operations;

trimming operations; and cutting operations.

20. The automated system of claim 11 wherein aligning the first and second metric surfaces in three dimensions using the set of one or more surface-modifying operations further comprises:

successively applying surface-modifying operations to one or both of the first and second metric surfaces to minimize the volume between the first and second metric surfaces.

* * * * *